United States Patent [19]
Povilus

[11] Patent Number: 5,740,425
[45] Date of Patent: Apr. 14, 1998

[54] DATA STRUCTURE AND METHOD FOR PUBLISHING ELECTRONIC AND PRINTED PRODUCT CATALOGS

[76] Inventor: David S. Povilus, 1723 Johnston St. SE, Grand Rapids, Mich. 49506

[21] Appl. No.: 534,055

[22] Filed: Sep. 26, 1995

[51] Int. Cl.$^6$ .................................................. G06F 17/30
[52] U.S. Cl. ...................... 395/611; 395/226; 395/227; 395/228; 395/229; 395/751; 395/794; 395/6
[58] Field of Search ........................... 395/226, 227, 395/228, 229, 600, 794, 751

[56] References Cited

U.S. PATENT DOCUMENTS

| | | | |
|---|---|---|---|
| 4,949,256 | 8/1990 | Humble | 364/401 |
| 5,067,070 | 11/1991 | Miyao et al. | 395/803 |
| 5,165,015 | 11/1992 | Coggins | 395/155 |
| 5,231,566 | 7/1993 | Blutinger et al. | 364/401 |
| 5,307,266 | 4/1994 | Hayashi et al. | 395/793 |
| 5,309,359 | 5/1994 | Katz et al. | 395/613 |
| 5,319,542 | 6/1994 | King et al. | 364/401 |
| 5,363,310 | 11/1994 | Haj et al. | 364/478 |
| 5,367,622 | 11/1994 | Coggins | 395/155 |
| 5,386,556 | 1/1995 | Hedin et al. | 395/604 |
| 5,404,295 | 4/1995 | Katz et al. | 395/604 |
| 5,444,844 | 8/1995 | Inoue et al. | 395/161 |
| 5,451,998 | 9/1995 | Hamrick | 348/13 |
| 5,528,490 | 6/1996 | Hill | 364/403 |
| 5,544,040 | 8/1996 | Gerbaulet | 364/401 R |
| 5,597,307 | 1/1997 | Redford et al. | 434/118 |

OTHER PUBLICATIONS

K. Parsaye et al. "Intelligent Databases–Object Oriented, Deductive Hypermedia Technologies", Wiley pp. 320–335, Jan. 1993.
Computer Library; "Computer Select Version 3.5–Getting Started Guide", Jan. 1994.
Injection Molders Supply Co.; "35th Edition Catalog on CD–ROM—For Windows".
Grainger; "Electronic Catalog, Edition 7—User's Guide (Enhanced Windows Version)"; 1995.
Varian; "AutoCat Version 1.0—Welcome to AutoCat (Analytical Supplies Catalog on Diskette)".
Computer Library; "Computer Select Version 3.5—Getting Started Guide"; 1994.
SweetSource; "Summer 1994—User's Guide".
SweetSource; "User's Guide—Fall 1993".
Eclat; Company Brochure.
Eclat; "Times have changed. Introducing . . . the Electronic Catalog Library".
Eclat; "The Electronic Catalog Library"; Mar. 1992.
ISO; "ISO WD 740.4 Terminology Work —Principles and Methods"; Sep. 1, 1993.
K. Parsaye et al., "Intelligent Databases—Object Oriented, Deductive Hypermedia Technologies"; Wiley, pp. 320–335.

*Primary Examiner*—Wayne Amsbury
*Assistant Examiner*—Jean M. Corrielus
*Attorney, Agent, or Firm*—Price, Heneveld, Cooper, DeWitt & Litton

[57] ABSTRACT

The specification discloses a data structure and method for creating, maintaining, and publishing multiple renditions of both electronic and printed, single and multi-manufacturer catalogs using a single product database. Also disclosed is an electronic catalog created using the data structure and methodology of the present invention. The data structure includes means for creating a product database and means for creating a KnowledgeBase, which includes a concept structure for at least one product realm and a glossary. The concept structure includes at least one concept frame for defining classes of product groupings, where the concept frames include a plurality of concept nodes having relationships based upon characteristics of the products within the product realm. The product database preferably includes a listing of SKUs, each SKU corresponding to a product or a component of a product. The product database further including product information for each associated SKU, and an identification of each concept node in which each SKU can be located. The glossary is used for searching for a particular product or group of products having desired characteristics, and includes a plurality of phrases, at least one of which being a definer that links the phrase to one of the concept nodes.

41 Claims, 38 Drawing Sheets

| PHRASES | DEFINERS *(PHRASES WITH DEFINITIONS)* | | |
|---|---|---|---|
| | ULTRAPURE | LOW-DENSITY FOAM | ULTRASONIC |
| ULTRAPURE | X | | |
| LOW-DENSITY FOAM | | X | |
| PLASTIC ULTRALIGHT FOAM | | X | |
| ULTRASONIC | | | X |

....
*ELECTRICAL DEVICES*
   *SENSORS*
      *LEVEL SENSORS*
         FUNCTIONALITY FRAME
            SOLID ONLY
               ULTRASONIC

FIG. 7

....
*ELECTRICAL DEVICES*
   *SENSORS*
      *LEVEL SENSORS*
         FUNCTIONALITY FRAME
            LIQUID
               INSIDE TANK
                  MULTIPLE LEVEL
                     ULTRASONIC

FIG. 8

....
*ELECTRICAL DEVICES*
   *SENSORS*
      *LEVEL SENSORS*
         FUNCTIONALITY FRAME
            LIQUID
               INSIDE TANK
                  MULTIPLE LEVEL
                     ULTRASONIC
                        MATERIALS FRAME
                           EXPOSED TO TANK ENVIRONMENT
                              PROBE/FLOAT CONSTRAINT
                                 PLASTIC

FIG. 9

| "STANDARD COLUMNS" | | | | | "REALM COLUMNS" | | | | | | | "CUSTOM COLUMNS" | | | | |
|---|---|---|---|---|---|---|---|---|---|---|---|---|---|---|---|---|
| | | | | | R1 | | R2 | | .... | Rn | | | | | | |
| SKU (PRODUCT NO.) | NAME | LINE | REFERENCE | OPT GROUP | R1 RAW | R1 FINAL | R2 RAW | R2 FINAL | | Rn RQW | Rn FINAL | C1 | C2 | C3 | . | Cn |

FIG. 19

| PHRASES | DEFINERS *(PHRASES WITH DEFINITIONS)* | | | |
|---|---|---|---|---|
| | ULTRAPURE | LOW-DENSITY FOAM | ULTRA-SONIC | TUNING FORK |
| ULTRAPURE | X | | | |
| LOW-DENSITY FOAM | | X | | |
| PLASTIC ULTRALIGHT FOAM | | X | | |
| ULTRASONIC | | | X | |
| TUNING FORK | | | X | X |

DATA STRUCTURE AND METHOD FOR PUBLISHING ELECTRONIC AND PRINTED PRODUCT CATALOGS

BACKGROUND OF THE INVENTION

The present invention relates generally to a data structure and method for publishing electronic and printed catalogs. More specifically, the present invention relates to a data structure and method for publishing multiple renditions of electronic and printed multi-manufacturer product catalogs.

Product manufacturers, particularly those involved in providing technical goods and services, traditionally use printed materials to inform the marketplace about the functionality, features, ordering procedure, etc., needed to select and specify their products. These printed catalog materials typically can take many forms (pamphlets, brochures, price books, binders, etc.), depending on the audience and level of detail of the information to be provided. "Product binder" is a term used for a detailed catalog for such a manufacturer's products.

Recently, manufacturers have found the need to also deliver product information electronically. "Electronic catalog" is a term used for the electronic version of a product binder and other forms of product information. The basic components common to most electronic product catalogs are a listing of product objects, a descriptive content of the products, and means for navigating through the product information. Current electronic product catalogs are available that provide various levels of product information about products that may be available from a manufacturer. Each of these catalogs may present the product information in one of several different formats. For example, one catalog may present basic pamphlet type information on a particular product line available from a single manufacturer while others may present detailed operating characteristics on many types of products available from many manufacturers.

Because product catalogs and other forms of product information are used by different individuals at various levels of design, construction, or maintenance positions, these types of publications typically are produced with a particular audience in mind. For example, some electronic and printed product information materials such as that published by McGraw-Hill (Sweet's Files and SweetSource), are directed to individuals working at a conceptual level, such as lead engineers. These publications present general information about products and/or product lines such that a lead engineer may review what products, such as level sensors, for example, are generally available. However, such publications do not include certain, more specific, information about the products that may be necessary to draft a building specification or to actually order the product from the manufacturer for construction or maintenance purposes. Thus, publications directed to an audience of lead engineers, however, are typically of no value to designers or maintenance personnel who must have access to more detailed product information. Similarly, catalogs are published for an audience of individuals who must order specific products. However, such catalogs are not useful for accessing general information about a large class of products, and therefore, are of no value to lead engineers. Therefore, there exists a need for a data structure capable of publishing electronic and printed product information in multiple renditions from a single product database that present product information in the level of detail intended for each and/or all individuals involved in the design, construction, and maintenance process.

In view of the differences between the various renditions in which electronic and printed product information is published, the publishing activities of these various renditions has typically been carried out independently from one another and much of the effort in gathering and assembling product information and subsequently publishing these renditions is duplicative. In addition, it is extremely difficult to coordinate these separate activities in order to ensure consistency between the content of these two methods of delivery.

The situation described above is further complicated by the fact that specifiers of technical goods and services prefer to have access to product information that allows easy identification of products to meet any specific need without particular regard to the manufacturers of those products. In the current situation, this need is met by publishers of "generic catalogs" or "multi-manufacturer catalogs" which attempt to organize product information in a more or less standardized form according to some neutral product categorization scheme. Such generic catalogs are difficult and expensive to publish because of the need to deal with original product information materials that are developed from each particular manufacturer's point of view. The content of generic catalogs is usually different in some respects from the content of manufacturer-specific deliveries, and this introduces further inefficiencies and inconsistencies into the overall problem of delivering product information. Furthermore, generic catalogs that are delivered in both print and electronic forms suffer the same difficulties as those described above with respect to the manufacturer-specific catalogs.

Some of the electronic product catalogs merely present the same information as presented in an associated printed catalog and allow for text searching within an index or within any printed text on the pages of the catalog. Individuals often have difficulty navigating through the index of such electronic catalogs because the individual may not be familiar with the product descriptions used by a manufacturer or publisher. Thus, for example, supposing an individual were attempting to locate, in an electronic catalog, level sensors that use ultrasonic frequency signals to detect the level of a liquid within a tank and the individual did not know the precise mechanism by which the level sensor produced the ultrasonic frequencies, the individual would not be able to find any such device if the electronic catalog only identified ultrasonic level sensors as level sensors with tuning forks. Therefore, there exists a need for a data structure for creating and maintaining an electronic catalog that will guide a user in a user friendly manner to specific products regardless of the manner in which the manufacturer or publisher indexes the products in the catalog.

Manufacturers' textual and media product descriptions, indexing, prices, and product offerings are constantly changing. However, conventional data structures used to maintain existing catalogs are not easily modified to accommodate such changes—particularly in product descriptions and content.

Most electronic catalogs provide for navigation by utilizing proximity key word searching within the actual textual product descriptions. However, because the terminology used in one manufacturer's product textual descriptions may differ from that of another, and because a user may not be aware of all the alternative phraseology used to describe a product for which the user is searching, conventional navigation techniques typically lead to "dead ends." Other navigational approaches force navigation through a single predefined hierarchical structure where there is only one path that may be taken to locate a particular product. However, with such an approach, the user must be able to predetermine, if possible, which path to take in order to reach the product. Furthermore, this approach provides no assistance to the user in finding alternative products that may be classified or indexed elsewhere.

SUMMARY OF THE INVENTION

Accordingly, the present invention has been made to overcome the above problems. Specifically, one aspect of the present invention is to provide a data structure for creating an electronic product catalog that links product content to a concept structure having at least one concept frame for defining classes of product groupings. Another aspect of the present invention is to provide a data structure for creating an electronic product catalog that includes a concept structure for each product realm including at least one concept frame where an end user may navigate therethrough to identify product groupings of multiple manufacturers and/or specific manufacturer product SKUs. Still another aspect of the invention is to provide a data structure for publishing multiple renditions of both electronic and print multi-manufacturer product catalogs from a single product database. Yet another aspect of the present invention is to provide a method for creating an electronic catalog that implements a very user-friendly navigational approach that allows end-users to search through the content of a product database using phraseology tied to the aforementioned concept structures.

Additional features and advantages of the invention will be set forth in part in the description which follows and in part will be apparent from the description, or may be learned by practice of the invention.

To achieve these and other advantages, and in accordance with the purpose of the invention as embodied and broadly described herein, the data structure for use in publishing a print and/or an electronic catalog containing information on a plurality of products of the present invention includes means for creating a concept structure for at least one product realm wherein the concept structure includes at least one concept frame for defining classes of product groupings, the concept frames including a plurality of concept nodes having relationships based upon characteristics of the products within the product realm, means for creating a product database including a listing of SKUs, each SKU corresponding to a product or a component of a product, the product database further including product information for each associated SKU, and an identification of each concept node in which each SKU can be located, and means for creating a glossary to be used for searching for a particular product or group of products having desired characteristics, said glossary including a plurality of phrases, at least one of the phrases being a definer that links the at least one phrase to one or more of the concept nodes.

The features and advantages of the invention may be realized and obtained by means of the instrumentalities and combinations particularly pointed out in the written description and claims hereof, as well as the appended drawings.

BRIEF DESCRIPTION OF THE DRAWINGS

The accompanying drawings, which are incorporated in, and constitute a part of, this specification illustrate several embodiments of the invention and together with the description, serve to explain the objects, advantages, and principles of the invention. In the drawings:

FIG. 7 is a pictorial view of information displayed on a computer monitor at a first stage in the navigation through the electronic catalog of the present invention;

FIG. 8 is a pictorial view of information displayed on a computer monitor at a second stage in the navigation through the electronic catalog of the present invention;

FIG. 9 is a pictorial view of information displayed on a computer monitor at a third stage in the navigation through the electronic catalog of the present invention;

FIG. 19 is a table corresponding to an exemplary SKU table constructed in accordance with the present invention;

DETAILED DESCRIPTION OF THE PREFERRED EMBODIMENTS

I. Introduction

Figure 1:
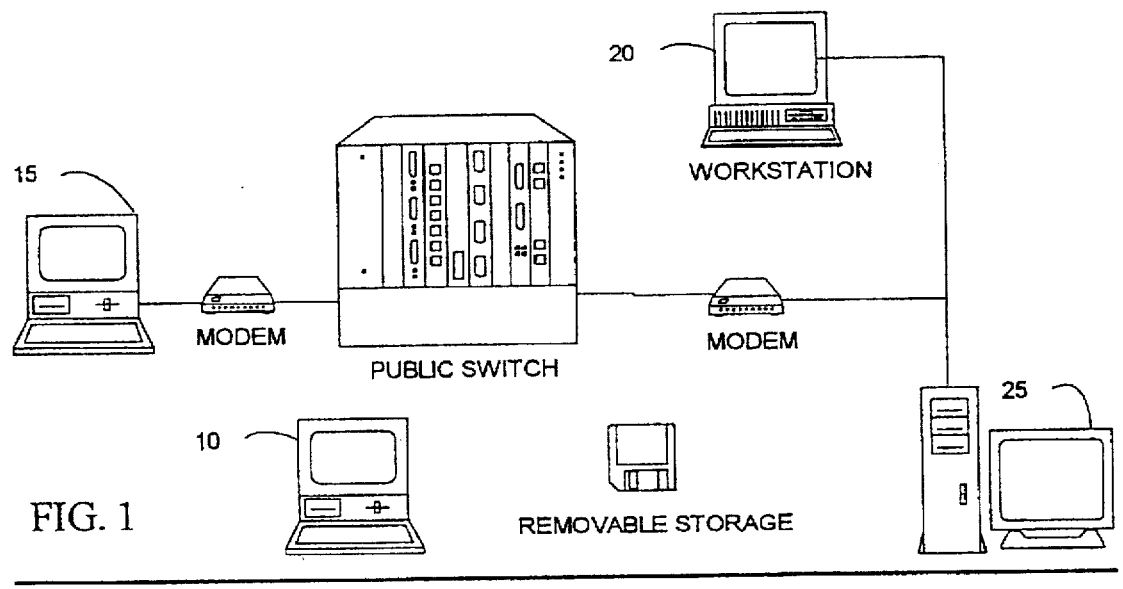
FIG. 1 is a pictorial view of an exemplary hardware system in which the present invention may be implemented.

FIG. 1 shows an example of the structural elements that may be used to store the data structures and to carry out the methodology of the embodiments described below. Specifically, the methodology of the present invention may be carried out on a single personal computer (PC) 10, which preferably includes at least 16 MB of RAM (not shown) and a Pentium or RISC processor. The methodology of the various described embodiments may also be carried out in whole or in part by other PCs 15, 20 or network servers 25 by distributing the data structure or portions thereof to these other PCs 15, 20 and servers 25.

The data structure of the present invention provides a tool for creating, maintaining, modifying, and publishing both electronic and printed product catalogs simultaneously. By utilizing the data structure of the present invention in its fullest capacity, one may create a print and/or an electronic catalog that is very user friendly and easy to navigate through. To accomplish these and other aspects, the data structure of the present invention includes means for creating a concept structure and means for creating a product database using the concept structure. The end user may access product information within the product database using a specialized glossary having a unique relationship to the concept structure.

Figure 2:
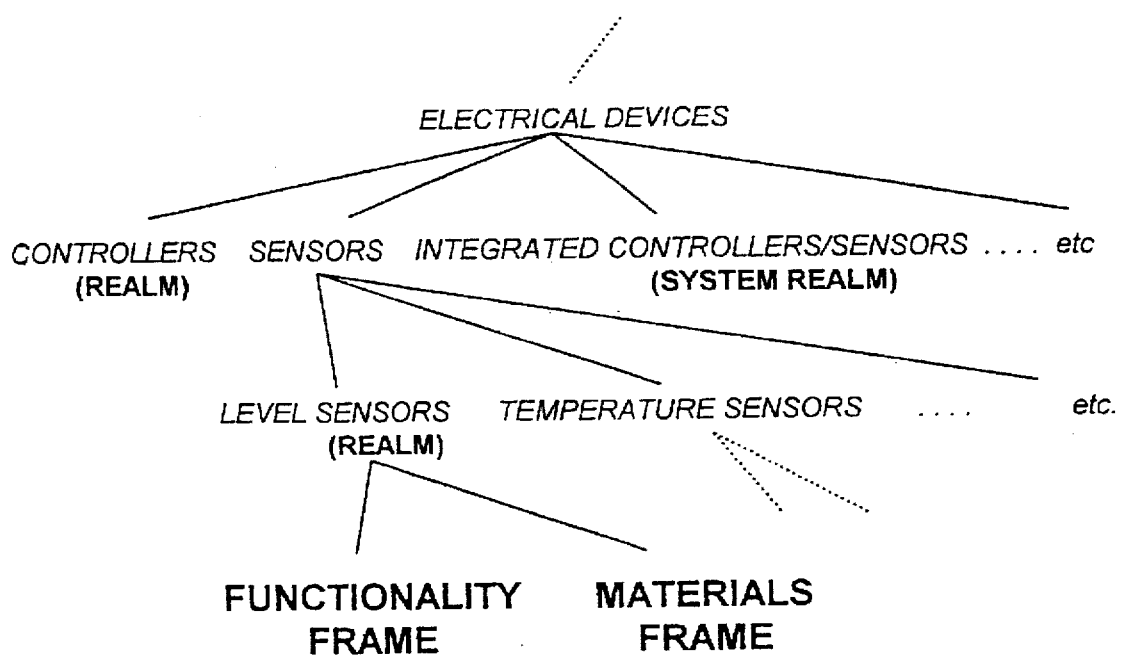
FIG. 2 is a graphic illustration of an exemplary top-level concept structure constructed in accordance with the present invention.

The concept structure is created using an object-oriented feature of the data structure of the present invention, and may establish one or more concept frames within any one product or system realm. An example of a portion of a concept structure created using the data structure of the present invention is shown in FIG. 2. As shown in FIG. 2, a product realm is a top-level description of a particular class of products, such as level sensors or, controllers, for example. A system realm is a top-level description of a particular class of systems. A system may be defined as a product that is made up of other products from the same manufacturer. In the portion of the concept structure shown in FIG. 2, a realm is identified as the node immediately above a node defining a concept frame.

A concept frame arrays product characteristics from a particular point of view (e.g., functionality, appearance, materials, etc.). Thus, for example, as shown in FIG. 2, the product realm for level sensors may be represented by a Functionality concept frame and a Materials concept frame. The purposes for providing for one or more concept frames in a product realm will be apparent from the example described in more detail below.

Figure 3:
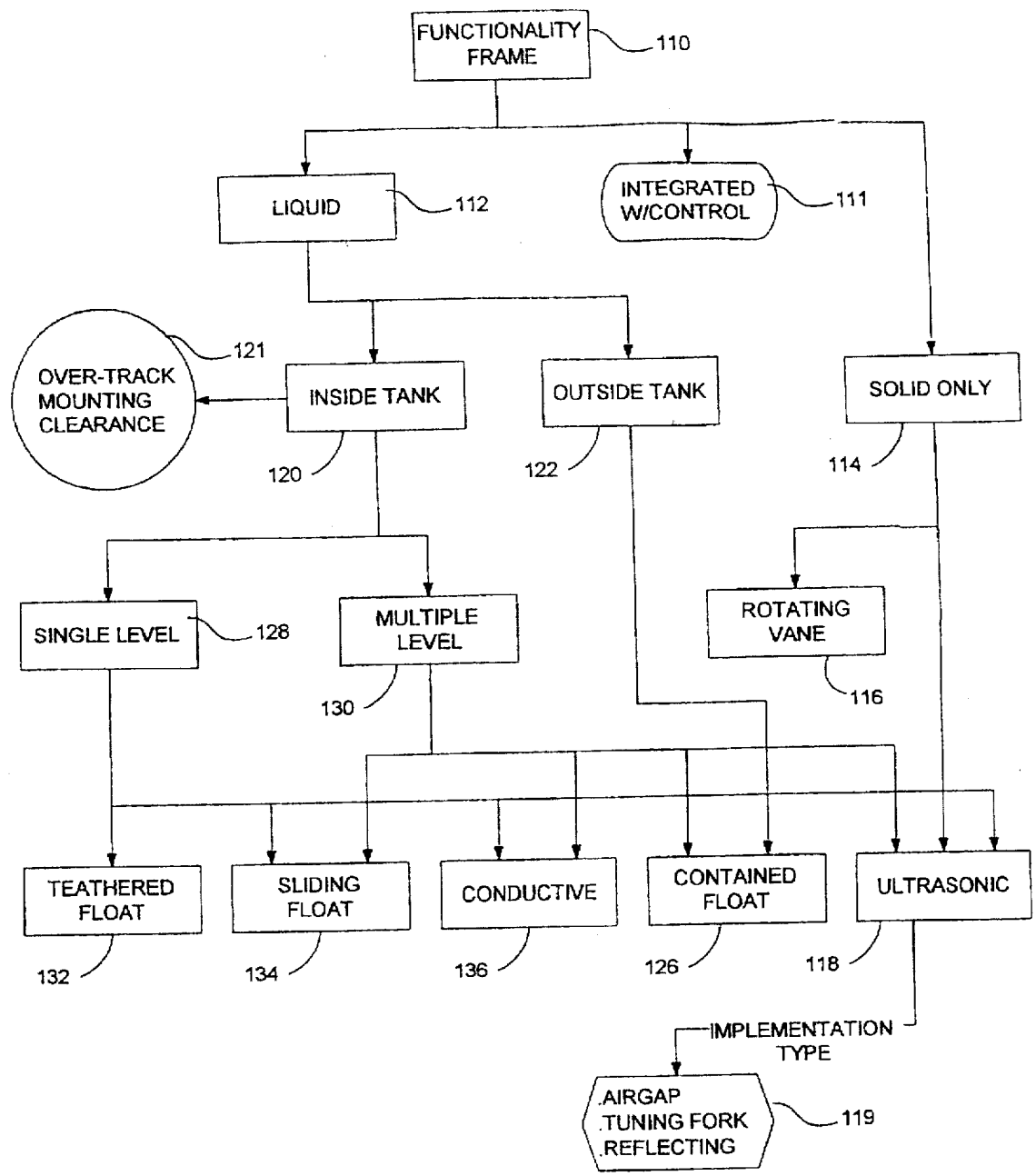
FIG. 3 is a graphic illustration of an exemplary lower-level concept structure for a Functionality concept frame constructed in accordance with the present invention.
Figure 4:
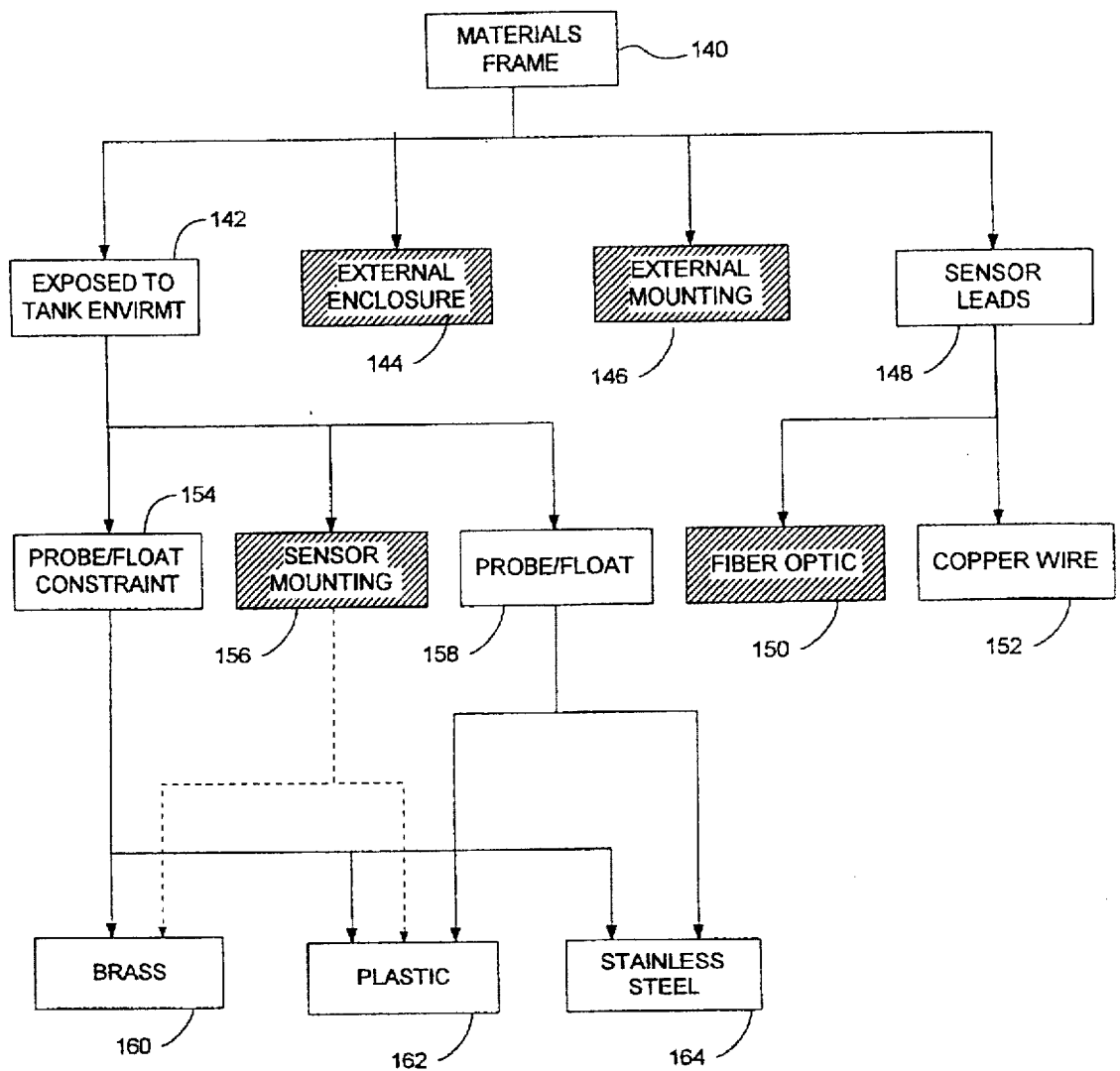
FIG. 4 is a graphic illustration of an exemplary lower-level concept structure for a Materials concept frame constructed in accordance with the present invention.

The concept structure defines various nodes representing product characteristics. The data structure of the present invention allows these characteristics to take various forms (e.g., numeric performance data, construction, operating environment, etc.). Examples of these concept structure nodes and their relationships are shown in FIGS. 3 and 4. FIG. 3 shows an example of the concept structure nodes that may be created for the Functionality concept frame within the level sensor product realm and FIG. 4 shows an example of the concept structure nodes that may be created for the Materials concept frame. An example of the utilization of the concept structures as depicted in FIGS. 2–4 will be described below following a brief description of the product database and glossary created with the data structure of the present invention.

In general, the product database includes listings of products that are available from one or more manufacturer. Preferably, such listings allow the identification of these products by their stock keeping unit (SKU) number, which is a number uniquely identifying products that the manufacturer or distributer keeps in stock. The product database also includes a media base including any product information describing each of the products. Various portions of the product information in the media base may be linked by a content tag to the product it describes and to the nodes in the concept structure for the particular product realm. Additionally, the product database includes means for linking the listed products to the nodes of the concept structure corresponding to the characteristics that the products possess. Thus, a specific level sensor product may include links to any one or more of the various nodes shown in FIGS. 3 and 4 based upon the particular characteristics possessed by the level sensor product.

To allow an end user to interact with the electronic catalog so as to obtain the level and amount of information desired, the data structure includes means for creating a glossary for the electronic catalog. The glossary includes a plurality of phrases. A "Phrase" consists of one or more words which can be searched for explicitly or using wildcard search conventions of "*" and "?". A Phrase can be related to any number of Definers, as described below. A Phrase includes data to indicate its language of expression (English, French, etc.). One purpose of a Phrase's existence is to make it easy to locate related Definer(s), given some word(s) or word fragment(s). Another purpose is to locate potentially significant words (say, in a block of text), given a particular Definer of interest.

Figures 5, 6:
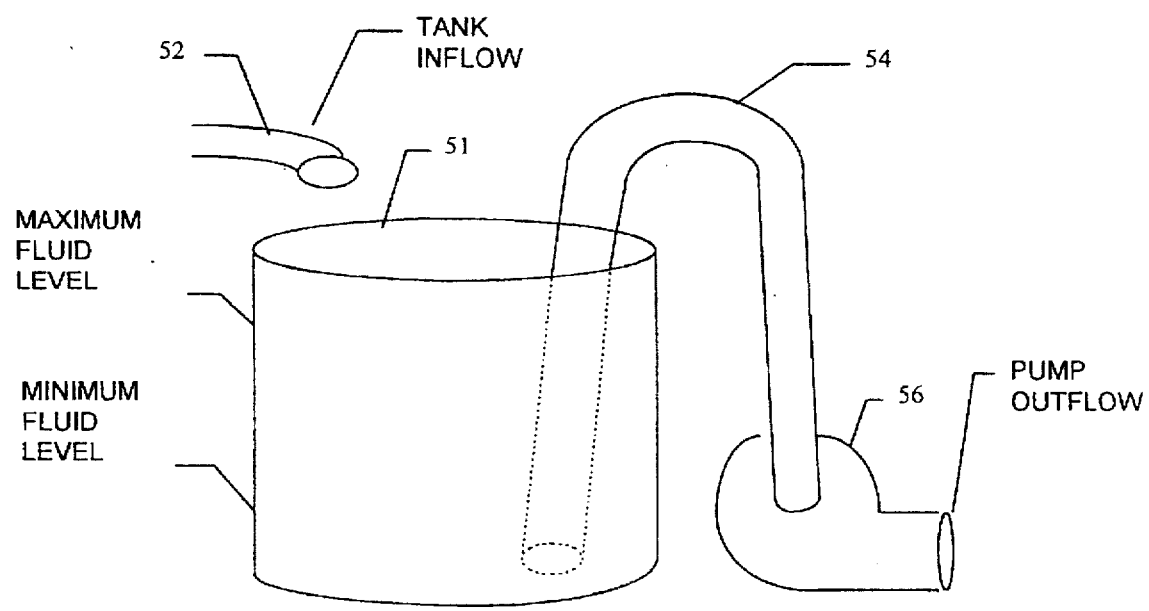
FIG. 5 is a table corresponding to an exemplary phrase table constructed in accordance with the present invention.
FIG. 6 is a pictorial view of a level management subsystem shown to illustrate certain principles of the present invention.

A "Definer" is a phrase that has exactly one definition. When a Definer is created, a synonym relationship is established with its own embodiment as a Phrase. In addition, a Definer may have any number of other synonyms, each of which is either a Phrase or the Phrase embodiment of some other Definer. The purpose of a Definer's existence is to give meaning to nodes in a concept structure. This meaning provides a bridge of understanding between the provider of products and the seeker of products that are indexed (categorized) against concept structures. The relationships between Definers and their synonyms are preferably stored in an Object-Oriented Database Management System (OODBMS), although they may be established by and displayed in the form of a table. An example of such a table is shown in FIG. 5, which will be described in more detail in the context of the examples described below.

Having provided a brief overview of the present invention, an example including several scenarios is provided below to explain how an end user would benefit from product information published using the data structure of the present invention and to introduce the various features and functionalities of the data structure. Following the example, a more detailed explanation of the present invention is provided.

II. End-User Example

The following scenarios all revolve around a single facility's installation of componentry to manage the level of fluid in an open tank that has an uncontrolled in-flow. Taken together, this componentry comprises a "level management subsystem," which is shown in FIG. 6. Generally, the level management subsystem includes a tank 51, an in-flow conduit 52, an out-flow conduit 54, a motorized pump 56, a level sensor (not shown), and controller (not shown). When the tank level reaches a predetermined level, as sensed by the level sensor, the controller actuates the motorized pump to increase the outflow rate.

The four scenarios described below each relate to different product information needs that could arise during the lifecycle of this subsystem as it goes from the facility's conceptual design stage, through it's detailed design and construction, and into the operational maintenance phase of the facility. In some different situation, the scenarios might be different; for blood analysis equipment in a hospital's medical lab, for example, the parties involved might be the chief medical officer, the doctor in charge of the lab, the hospital's facility manager, and the medical technician in charge of lab equipment. Thus, it should be understood that the following scenarios are described in order to facilitate the reader's understanding of the various needs and purposes which are satisfied by the various elements of the data structure of the present invention.

A. Lead Engineer Scenario

This first scenario illustrates how a lead engineer would utilize and benefit from product information published and maintained by the data structure of the present invention. Assume, for example, that the lead engineer for the facility mentioned above, recalls seeing a possibly relevant product in a printed pamphlet, that was referred to as a dual point ultrasonic level controller. Further assume that the lead engineer cannot recall any other details about this particular product. To obtain additional information about this product, the lead engineer would place into a computer, a compact disc (CD) or other computer-readable medium having an electronic product brochure (a publishable version of the electronic catalog of the present invention) for the chemical industry. The lead engineer could then enter a word search option such as "*ultra*", meaning the search result should include any phrase with the segment "ultra" embedded anywhere within it. (In this example, "*" is used as a wildcard character.) In this case, the computer may respond with the following three choices:

highest (ultrapure) [Distillation Systems]
low-density foam [Insulation]
    plastic ultralight foam
ultrasonic [Level Sensors]

These choices highlight the integrated glossary function of the present invention, which is illustrated in FIG. 5. The portion of the listed choices in brackets represents the product realm in which the listed term(s) are utilized to describe product characteristics. Any word appearing in parenthesis is a Definer used to define the immediately preceding term. As described above, a "Definer" is a Phrase that has a definition and a unique association to a node in the concept structure for a product realm. Thus, the first choice listed above represents the fact that a product characteristic labelled "highest" in the Distillation Systems product realm uses the Definer "ultrapure" for its definition. The second choice represents the fact that a product characteristic labelled "low-density foam" in the Insulation product realm uses a Definer (not listed) that has a synonymous phrase "plastic ultralight foam." The third choice represents the fact that "ultrasonic" is both the label and the related Definer for a product characteristic in the Level Sensors product realm. As shown in FIG. 5, where and "x" indicates a synonym relationship, the glossary may include Phrases that are not Definers, but are synonyms to the Definers. Although not illustrated in FIG. 5, the Phrase embodiment of a definer may also serve as a synonym to some other definers(s). The data structure maintains the relationship of synonym(s) to Definer(s) in a data class structure such as that shown in FIG. 13. By providing for search phrases in the glossary that are synonyms to the Definers, the data structure expands the number of terms that may be keyed in by the user and permits the end users to use search phrases that they are familiar with rather than requiring them to use the exact terminology employed by the manufacturer or publisher to describe the product characteristics. Further, by tying the search phrases to Definers associated with particular concept nodes in a product realm, the data structure provides for much freer use of search phraseology and does not limit navigation by proximity key word searching within the actual textual product descriptions.

In selecting one of the three choices, the lead engineer will indicate which product realm is of interest thus enabling the system to further interact with the lead engineer in terms of the product characteristics associated with that realm. As alluded to above, within each realm, product characteristics are arranged into tree structures in one or more "concept frames", that is, points of view. At this point, the lead engineer may press a key associated with a "help" function in order to see the definitions related to the product characteristics or the definitions related to their product realms.

When the lead engineer selects one of the displayed choices, the computer displays the path through the product realm hierarchy that leads to the product realm associated with the selected option. Thus, if the lead engineer selects the "ultrasonic" option, the computer will display the path in the product realm hierarchy leading to the Level Sensors product realm and indicate that there exists two concept frames for this realm, in accordance with the structure shown in FIG. 2. The computer will also display an arbitrarily selected path within the concept frame having a node corresponding to the selected Definer. In this case, the computer would display a path to the node associated with the Definer "ultrasonic" in the Functionality concept frame. An example of such a display is shown in FIG. 7. This display would indicate, for example, that the Level Sensor product realm is within the Sensors realm of the Electrical Devices realm. Additionally, this display would inform the lead engineer that there are ultrasonic level sensors within the Functionality concept frame of the Level Sensors product realm and that there are ultrasonic level sensors that sense the level of a solid only. By indicating to the user that he can click a mouse on the "solid only" item, this display would also imply that there may be ultrasonic level sensors that sense the level of something other than a solid, such as a liquid.

The path selected by the computer will correspond to a path in the concept structure for the Functionality concept frame. FIG. 3 shows an example of such a concept structure. As shown in FIG. 3, the concept structure for the Functionality concept frame first divides the level sensors into those used to sense the level of a liquid and those used to sense only the level of a solid. Thus, below a node 110 designating the Functionality concept frame, there are two nodes 112 and 114 representing "liquid" and "solid only," respectively. Further, the concept structure shows that level sensors for solids are either a rotating vane type or the ultrasonic type, as apparent from nodes 116 and 118. For level sensors for liquids there are two implementations as designated by nodes 120 and 122, one for mounting inside the tank, and another for mounting outside the tank. For the type mounted outside the tank, node 126 represents that such level sensors may use a contained float. For the type mounted inside the tank, nodes 128 and 130 represent that such level sensors may either detect a single level of liquid in the tank or multiple levels of liquid. The concept structure shows that the single level liquid level sensors may have a tethered float (node 132), a sliding float (node 134), a conductive element (node 136), or ultrasonic sensing (node 118). The concept structure also shows that the multiple level liquid level sensors may have a sliding float (node 134), a conductive element (node 136), ultrasonic sensing (node 118), or a contained float (node 126).

As apparent from the foregoing description of an exemplary concept structure, such concept structures are useful for defining various navigational paths through product characteristics of existing products. Further, it can be seen that certain product characteristics, such as ultrasonic, may be shared by different types of products and/or by products having different characteristics. Thus, the concept structure provides for multiple paths through the concept structure to these shared product characteristics. Most conventional electronic catalogs either provide only a single navigational path to any one characteristic or do not break products down by such characteristics.

By choosing an arbitrary path to the ultrasonic node 118, the computer has assumed that the user is looking for a level sensor for sensing solids. Such an assumption may be completely arbitrary or may be selected by the computer based upon which path has the greatest number of available products. In this example, it is assumed that a level sensor for liquids is desired. By clicking a mouse on the "solid only" entry in the display shown in FIG. 7, the lead engineer causes the computer to display any alternative options that are available at that level, such as liquid. When the lead engineer subsequently selects "liquid," the computer selects and displays another arbitrary path from the liquid node 112 to the "ultrasonic" node 118. An example of the display at this point in time is shown in FIG. 8. This time, the computer-selected path corresponds to that desired by the lead engineer. Particularly, the display would again indicate, for example, that the Level Sensor product realm is classified as a Sensor which, in turn, is classified as a Electrical Device. Additionally, this display would again inform the lead engineer that there are ultrasonic (node 118) level sensors within the Functionality concept frame of the Level Sensors product realm and, this time, would indicate that there are ultrasonic (node 118) level sensors that sense multiple levels (node 130) of liquid (node 112) in a tank and are mounted inside the tank (node 120). The display would also imply that there may be ultrasonic (node 118) level sensors that sense the level of a solid (node 114), and that sense only a single level (node 128) of liquid (node 112) in a tank.

Once the computer has displayed a navigational path through the concept structure identifying products with the desired combination of characteristics, the lead engineer may instruct the computer to list the available products that have these characteristics. In reviewing the available product listing, the lead engineer would be able to recognize the name of a manufacturer, X, as the manufacturer associated with the pamphlet. The lead engineer may then cause the computer to display the product description content associated with the product manufactured by Manufacturer X. If, upon reviewing the detailed product characteristics, the lead engineer discovers that this product would require an above tank mounting clearance that is not possible given the positioning of the tank in the facility, which allows only ½ inch, the lead engineer may search for similar products having a desired maximum for clearance requirement. To do this, the lead engineer finds the real number differentia characteristic for "over-tank clearance" (node 121) and enters a maximum value of 0.5 inch. A listing of such differentia characteristics are available for viewing at anytime, the contents of such listing being determined by the current path specified by the user and the attachment of such characteristics to nodes in only certain concept structure paths, as illustrated in FIG. 3. If there are no ultrasonic level sensors, from any manufacturer, that meet this requirement, the lead engineer may click on the "ultrasonic" entry of the displayed path shown in FIG. 8, and views all the choices available for level sensors used to sense multiple levels of a liquid. As apparent from FIG. 3, these options would include "sliding float" (node 134), "conductive" (node 136), "ultrasonic" (node 118), and "contained float" (node 126). The engineer may then select one of these options and determine whether there are any level sensors that have a maximum clearance under ½ inch. For purposes of example, it is assumed that the lead engineer finds a sliding float type level sensor made by Manufacturer X. The lead engineer may then save the product information to a project file.

B. Designer Scenario

The designer for the level management subsystem utilizes information provided by the lead engineer to perform the detailed design of the subsystem. The designer may insert the multi-manufacturer electronic brochure CD in a computer and access the project file furnished by the lead engineer in order to look up the selected sliding float product. In reviewing the product information for this product, the designer notices that this product will require the specification and mounting of a separate controller to interface the level sensor with the motorized pump 56 (FIG. 6). The designer also notices from the content, that the while it has plastic floats, the slider is only available in metal. Because the liquid in the tank might react with metal, the designer would then look for alternative products having similar characteristics. To locate such products, the designer selects the Materials concept frame. The concept structure associated with the Materials concept frame is preferably automatically trimmed of the characteristics nodes that do not include products having the characteristics already specified. An example of the concept structure of the Materials concept frame is shown in FIG. 4. The Materials concept structure shows that a first level of options includes "exposed to tank environment," "external enclosure," "external mounting," and "sensor leads" corresponding to nodes 142, 144, 146, and 148, respectively. Because there are no products listed under the "external enclosure" node 144 or the "external mounting" node 146 that have all the previously specified characteristics, the computer eliminates these options and displays only the remaining two options for the designer to select. Under the "sensor leads" node 148 there are two options—the "fiber optic" node 150 and the "copper wire" node 152. Again, because there are no products listed under the "fiber optic" node 150 that include the previously specified characteristics, this node is not listed as a selectable option at this point. The "exposed to tank environment" node 142 has three nodes listed under it, including a "probe/float constraint" node 154, a "sensor mounting" node 156, and a "probe/float" node 158. Here, the "sensor mounting" node 156 is eliminated because there are no products associated with this node that have the previously selected characteristics. The "probe/float constraint" node 154 includes three nodes thereunder including a "brass" node 160, a "plastic" node 162, and a "stainless steel" node 164. The "probe/float" node 158 includes the "plastic" node 162 and the "stainless steel" node 164.

When the designer selects the Materials concept frame, the computer would display the first set of available options. In this case, the designer would select the "exposed to tank environment" (node 142) option, at which point the computer would display the next level of available options. Here, the designer would select the "probe/float constraint" (node 154) option and the computer would display the next level of available options. The designer would then select the "plastic" (node 162) option and the computer display would appear as shown in FIG. 9. The designer may then cause the computer to display a listing of available products meeting all of the selected criteria. For each product listed, certain basic information would be included in the display, such as product name, manufacturer, other information sources published for the manufacturer, whether or not the product is a part of systems made by the manufacturer, etc.

If the designer finds that one of the products offered by a Manufacturer Y is available as part of a system, the designer may select an opportunity offered via a displayed option, to switch to the systems realm for Integrated Sensors/Controllers (see FIG. 2). Entering this new realm, the computer would then present as choices those system products that have the previously selected sensor product as a component. At this point, the designer finds a system product that has all exposed parts made of plastic and notes that the manufacturer of this system product has an electronic binder (catalog) on the Internet. The designer may then call that binder up without leaving the current computer session.

Upon entering Manufacturer Y's electronic binder, the paths used to locate both the sensor and the integrated sensor/controller products are communicated over the Internet. The electronic binder uses that information to automatically "open" the binder to the sections dealing with these products, possibly to the text that specifically deals with materials. Within the electronic binder, the designer has access to details on all of the available operating characteristics, dimensions and mounting instructions, optional functionalities, etc. From this information, the designer is able to generate a specification that the designer knows can be met by an off-the-shelf combination of SKUs, which represent specific part numbers. A typical specification in this scenario may indicate that the level management subsystem requirements should be met by Manufacturer Y's series 123ABC, or equivalent.

C. Contractor Scenario

The contractor who was awarded the bid on the construction of the facility must work from the specification furnished by the designer. The contractor's local equipment distributor checks his normally stocked level controllers for Manufacturer Y's series 123ABC. The distributor performs this check using a CD catalog that covers only those manufacturers that the distributor distributes. Within the same computer session, this CD ties into his own inventory system and indicates that the entire stock of manufacturer Y sensor systems is depleted. Using the path (product) characteristics of series 123ABC, the distributor is able to use his CD to identify an equivalent series from Manufacturer Y that is in stock.

D. Facility Maintainer Scenario

Assume that several years after its construction, the level management subsystem begins to perform erratically, causing a tank overflow. The facility maintainer goes to the local equipment distributor to describe a problem with one of the sensor components. The local distributor has since lost the CD version that was current when the subsystem was first purchased, but the distributor should still be able to access information on that subsystem using the Manufacturer Y's electronic binder archives. Unfortunately, the distributors communication lines are down. In the back room the distributor finds a copy of the print version of the catalog from the same period as the CD. Looking up the series in that catalog, the distributor finds the SKU of the subsystem component that needs replacing. The distributor then inputs that SKU number into the current CD catalog and is informed that the original manufacturer has gone out of business and that sensor manufacturer Z makes a functionally equivalent component.

E. End User Example-Conclusion

The scenarios described above provide a good example of the end user functionalities provided by the data structure of the present invention. Conventional data structures provide some, but not all of this functionality, and then only in a fragmented form. As a result, the different information access modes available within and between these scenarios would differ both in the language required to find products and in the information found to describe supposedly identical products. Such discrepancies in existing modes are an unavoidable consequence of having separate, uncoordinated publishing efforts using different content databases to describe the same products via print, CD, and on-line services like the Internet. The complete integration of these scenarios is possible when the present invention is applied to generate, from a single product database, all of the following: the printed pamphlet, the multi-manufacturer electronic brochure CD for the chemical industry, the manufacturer's Internet electronic binder, the equipment distributor's CD catalog, and the equipment distributor's printed catalog.

Current natural language approaches offer some integration of access and content, but they do not support navigational "browsing" as does the present invention. Thus, in those other approaches each query is processed in a more or less batch mode without feedback or the chance to easily investigate the effects of relaxing or adding to portions of the query. Existing approaches are more prone to "dead ends," where the result of the query will be that there is no such product. Furthermore, there existed no easy means for determining how the query would have to be changed to find the sub-optimal products.

Current concept frame approaches, as applied to product location, do not attempt to integrate access and content as does the present invention. With these other approaches, entry into an electronic binder from an electronic multi-manufacturer catalog cannot adjust the content presentation in the binder to take into account the access path already established using the multi-manufacturer catalog.

III. Data Structure Introduction

The data structure of the present invention includes a KnowledgeBase portion with links to a product database. The product database includes an Index Base and a Media Base. The product database is generated from product information provided by manufacturers and other sources. The KnowledgeBase is the portion of the data structure that defines generic product classes, generic optioning schemes, and generic presentation types for each product realm. The KnowledgeBase includes the glossary and the concept structures that are linked to items in the glossary.

A. KnowledgeBase

Prior to describing how to create, maintain, and publish electronic and printed product catalogs in accordance with the present invention, the KnowledgeBase portion of the data structure of the present invention will be introduced with reference to FIGS. 10–13. The drawing figures illustrating the data structure of the present invention include four different types of blocks for representing different types of data structure elements. The block having rounded corners and a horizontal bar extended therethrough, such as block 170 (FIG. 10), represents a Virtual Base Class, which is a base class (one which has no classes above it), as indicated by the horizontal bar through the block. The fact that this block has rounded corners is used to indicate that objects of this class are virtual, meaning they can only exist as embodiments of one of this class's descendant subclasses.

The block having rounded corners and without a horizontal bar extended therethrough, such as block 172 (FIG. 10), represents a Virtual Class, which is a class that is a descendant of some other class, as indicated by the absence of a horizontal bar through the symbol. Again, the fact that this symbol has rounded corners is used to indicate that objects of this class are virtual, meaning they can only exist as embodiments of one of this class's descendant subclasses.

The block having square corners with a horizontal bar through the block, such as block 174 (FIG. 10), represents a Base Class, which has no classes above it, as indicated by the horizontal bar through the block. Square corners indicate this class in not virtual; therefore, objects can be instantiated as members of this class or as members of any of this class's descendant classes.

The block having square corners with no horizontal line through the block, such as block 176 (FIG. 10), represents a Class, which is a descendant of some other class, as indicated by the absence of a horizontal bar through the symbol. Again, the square corners indicate this class in not virtual; therefore, objects can be instantiated as members of this class or as members of any of this class's descendant classes.

The lines linking the blocks represent a Relation, which links an object of one class to another object(s) of the same class, to an object(s) of a different class, or to itself (as embodied as a subclass or superclass of itself).

When two or more blocks are shown overlapping one another, this represents an Inheritance in which the underlying blocks inherit all the attributes and behaviors of the overlying block in addition to having their own. For example, in FIG. 10, blocks 172 and 178 inherit all the attributes and behaviors of block 170, in addition to having their own. Block 180 has its own attributes and behaviors, as well as those of blocks 178 and 172. Block 176 has its own attributes and behaviors, as well as those of Blocks 172 and 170. Because Blocks 170, 172, 178 and 184 are virtual, an object can only be created as within Blocks 174, 176, 180, 182, 186, 188, or 190.

1. KnowledgeBase-Structures—Concept Frames

Figure 10:
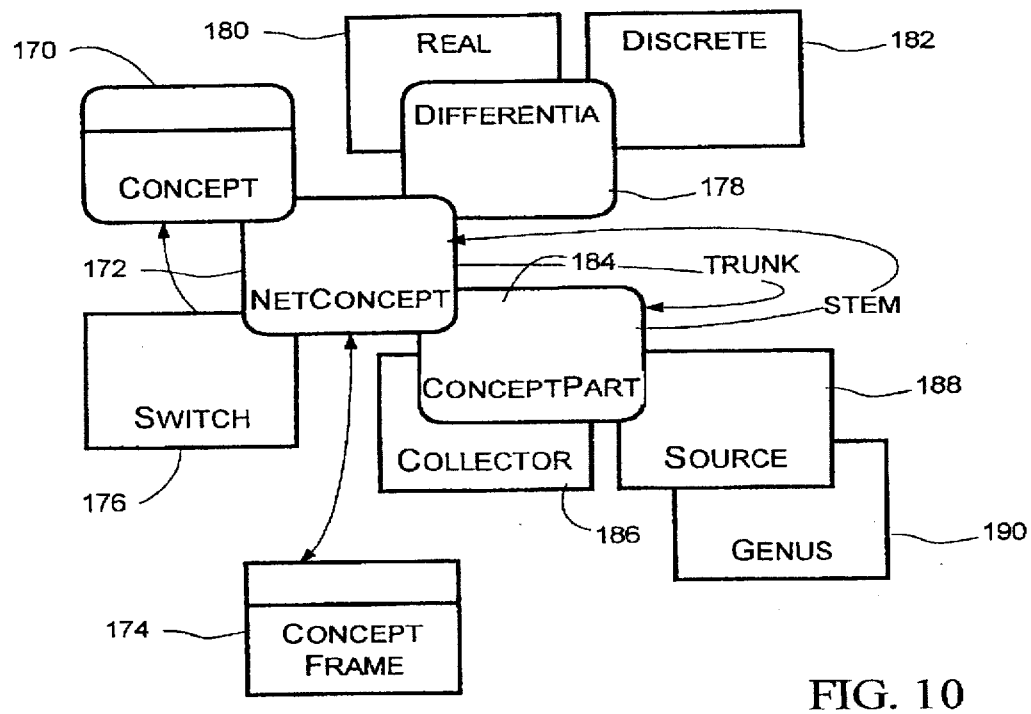
FIG. 10 is a block diagram illustrating various elements of the concept frame concept structure of the KnowledgeBase of the present invention.

The concept structure of the KnowledgeBase includes a portion relating to product classification based on Realms and a portion relating to product classification based on Industry Standards. FIG. 10 shows the portion of the KnowledgeBase relating to Realms, which includes Concept(s) 170; NetConcept(s) 172; ConceptFrame(s) 174; Switch(es) 176; Differentia 178; Real Differentia 180; Discrete Differentia 182; ConceptPart(s) 184; Collector(s) 186; Source(s) 188; and Genus 190.

As described above, a ConceptFrame 174 is a concept frame of reference which arrays product characteristics from a particular point of view (e.g., product functionality, product appearance, etc.). In the above described example, the Level Sensor product realm included a Materials concept frame and a Functionality concept frame.

A Concept 170 is a use of a Definer as employed as a Source 188, Genus 190, Collector 186, Real Differentia 180, Discrete Differentia 182, or Switch 176. A Concept 170 must be either a Hierarchy 192 (see FIG. 11) or a NetConcept 172.

A NetConcept 172 (short for network concept) is a Concept 170 that is used in exactly one concept frame; thus it has a relation to that ConceptFrame 174. A NetConcept 172 must be either a ConceptPart 184, a Differentia 178, or a Switch 176. A NetConcept 172 may be subservient to another NetConcept 172 that is a ConceptPart 184, meaning that once a ConceptPart 184 is assigned to a product, the subservient NetConcept 172 may also be assigned to that product. A trunk relationship is used to keep track of each ConceptPart 184 to which a NetConcept 172 is subservient.

A ConceptPart 184 is a NetConcept 172 that can have other NetConcepts 172 that are subservient to it (related to it as a stem). A ConceptPart 184 must be created as either a Source 188, a Genus 190, or a Collector 186.

A Source 188 is a ConceptPart 184 that can be the root of a ConceptFrame 174 (if it has no trunk). It embodies the attributes and behaviors that dictate the navigation of a concept frame over the characteristics that differentiate each class, or grouping of products from every other class of products, with respect to that ConceptFrame 174. In the above-described example, the Functionality frame (node 110) (FIG. 3) is an example of a Source 188.

A Genus 190 inherits all the behaviors of a Source 188, only it must be associated to at least one trunk. A Genus 190 differs from a Source 188 in that it is the embodiment of a single characteristic that may be possessed by products, subject to enforced navigation behaviors. A Genus 190 also differs from a Source 188 in that it can have associated Differentia 178. In the above-described example, the liquid node 112 (FIG. 3) is an example of a Genus 190.

A Collector 186 is a container for grouping related Genus 190 or related Differentia 178. Such a grouping can be employed to simplify the user navigation interface through the use of checkboxes or radio buttons, as indicated by the Collector's type. In the above-described example, the node 119 containing the items air gap, tuning fork, and reflecting is an example of a Collector 186.

A Differentia 178 is a NetConcept 172 that cannot have any subservient NetConcepts 172. A Differentia 178 embodies a characteristic that a product may possess, but which does not differentiate products of one class from those of another. A Differentia 178 must be created as either a Real 180 or a Discrete Differentia 182. In the above-described example, the types of ultrasonic level sensors shown contained within node 119 (i.e., air gap, tuning fork, and reflecting) (FIG. 3) are examples of Differentia 178.

A Real Differentia 180 is a Differentia 178 for a product characteristic that is expressed as a numeric quantity. A Real Differentia 180 keeps track of its own preferred unit(s) of measurement. This preferred unit(s), which dictates the default display for values, must be selected from among those units that are related to the Real Differentia's associated (via Concept 170) Quantity 204 (see FIG. 13). In the above-described example, the over-tank mounting clearance represented by node 121 (FIG. 3) is an example of a Real Differentia 180.

Figure 16:
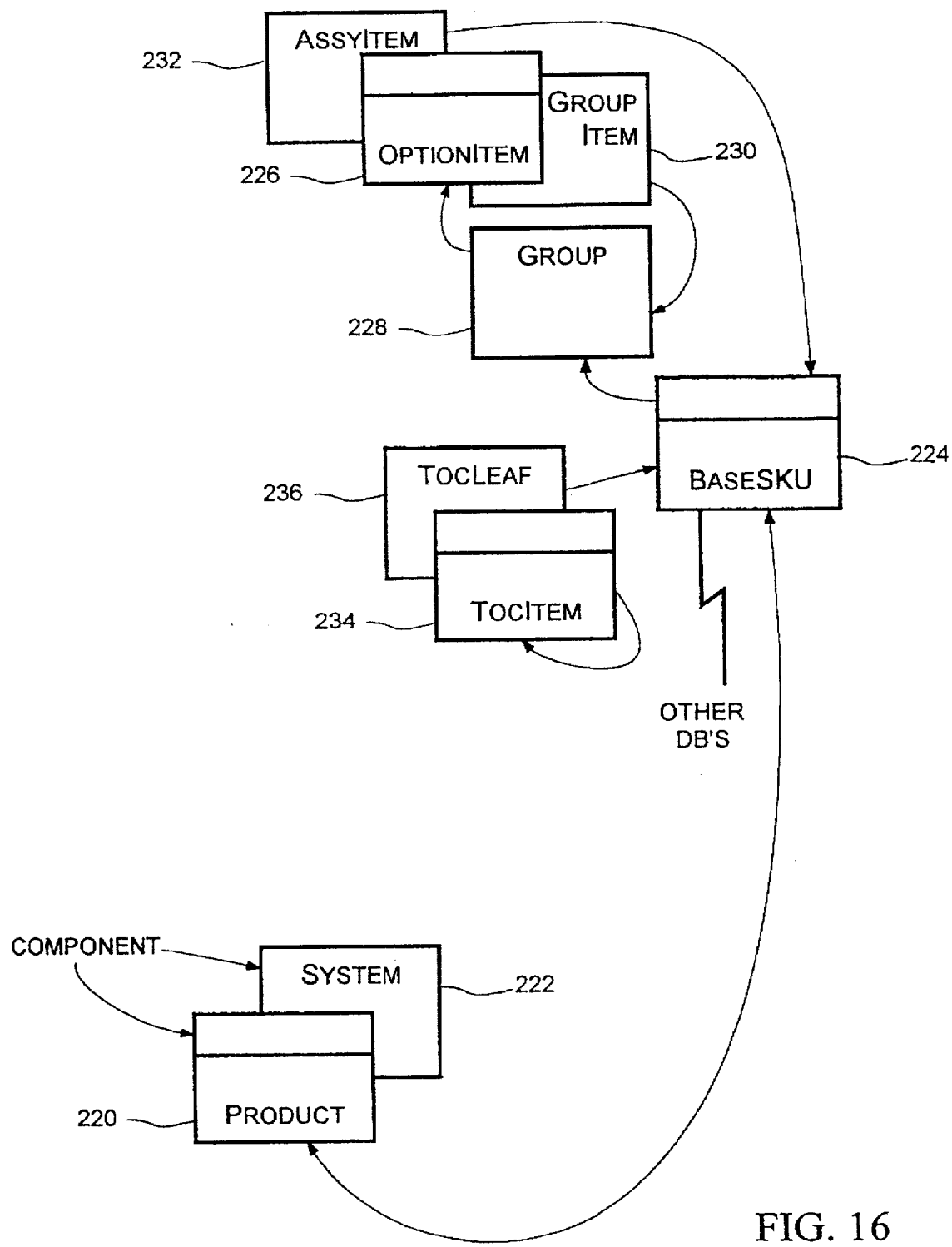
FIG. 16 is a block diagram illustrating various elements of the Index Base of the present invention.

A Discrete Differentia 182 is a Differentia 178 that represents a characteristic that is either possessed or not possessed by at least one SKU represented by a Product 220 (see FIG. 16). In the above-described example, the Differentia shown contained within node 119 (FIG. 3) are examples of Discrete Differentia 182.

A Switch 176 is a NetConcept 172 that is used to indicate a characteristic that may be associated (in the user's mind) with this NetConcept's ConceptFrame 174 (and thus, Realm); however, the characteristic actually can only be possessed by product(s) within some other realm(s) than the one the ConceptFrame 174 is related to. A Switch 176 keeps track of the Concept 170 that marks the new start point of navigation once (if) the user opts to make the "switch" out of the current Realm. In the above-described example, the integrated controllers/sensors node 111 is an example of a Switch 176.

2. KnowledgeBase-Structures—Standards

Figure 11:
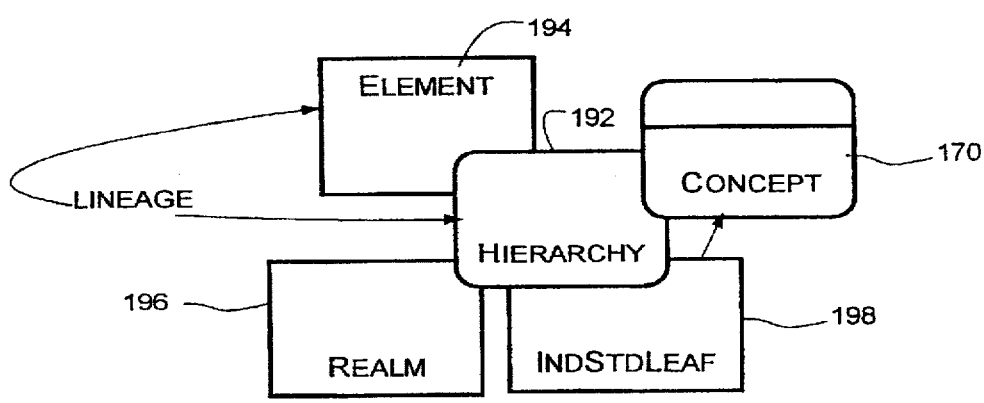
FIG. 11 is a block diagram illustrating various elements of the hierarchy concept structure of the KnowledgeBase of the present invention.

FIG. 11 shows the portion of the concept structure of the KnowledgeBase that relates to product classification based on Industry or Publisher's Standards. This portion may include Hierarchy(ies) 192; Element(s) 194; Realm(s) 196; and IndStdLeaf(s) 198.

A Hierarchy 192 is a Concept 170 whose application is limited to use in the description of a publisher's (product realm) classification scheme or an "industry-standard" classification scheme. The NAVFAC standards established by the Naval Facilities Engineering Command is an example of such a scheme. This class defines the behavior of a purely hierarchical decision-tree organization. A Hierarchy 192 must be created as either an Element 194, a Realm 196, or an IndStdLeaf 198.

An Element 194 is a Hierarchy 192 concept that can have Realm(s) 196 or IndStdLeaf(s) 198 and/or other Elements 194 as subordinate concepts. Only product realm structures have Realms 196; only industry-standard structures have IndStdLeafs 198.

A Realm 196 is a Hierarchy 192 concept that is a leaf in a product realm structure that describes the realms for the publisher's classification scheme. It is the embodiment of a general category of product classes which are characterized by the various NetConcepts 172 related to a specific set of ConceptFrames 174.

An IndStdLeaf 198 is a Hierarchy 192 concept that is a leaf in a structure that describes an industry-standard classification scheme. An IndStdLeaf 198 has a relationship to a Concept(s) 170 which constitutes the start of a path(s) to navigate characteristics beyond those provided for by the industry-standard classification scheme.

Figure 12:
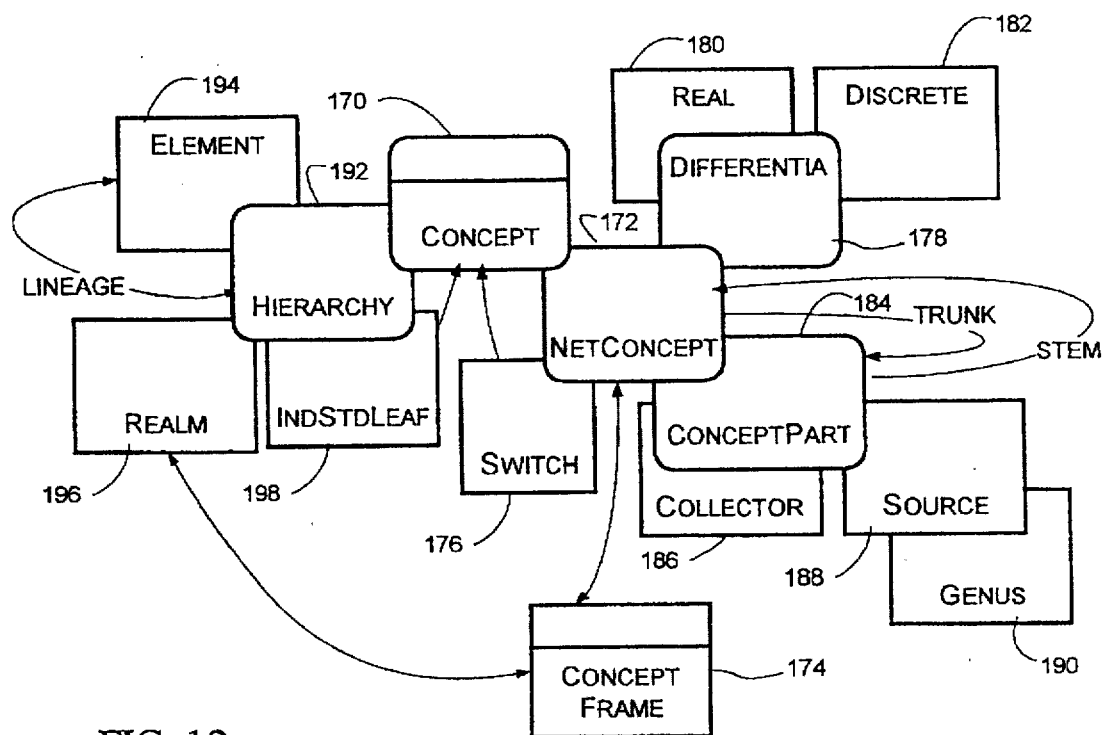
FIG. 12 is a block diagram illustrating various elements of the concept structure of the KnowledgeBase of the present invention.

FIG. 12 shows how each ConceptFrame 174 is related to its Realm 196, thus tying together the two layers of concept structures described above.

3. Knowledgebase—Glossary

Figure 13:
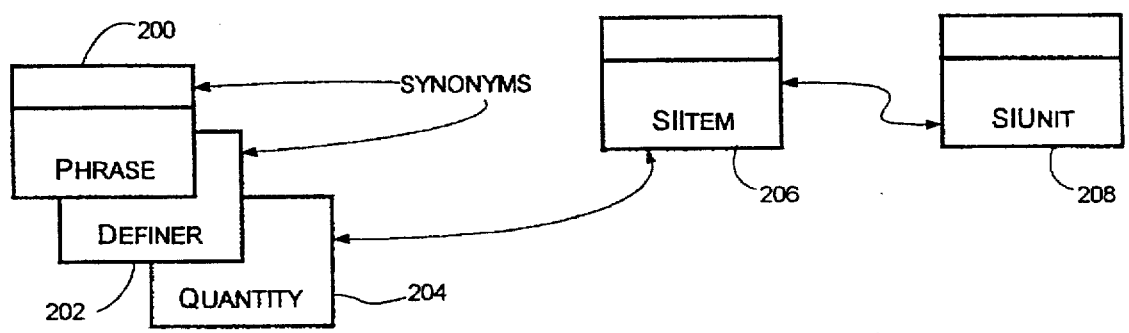
FIG. 13 is a block diagram illustrating various elements of the glossary of the KnowledgeBase of the present invention.

FIG. 13 shows the glossary portion of the Knowledge-Base. As described above, the glossary includes a plurality of Phrases 200, some of which are Definers 202, which may or may not be used as synonyms that are linked to Definers 202. A Quantity 204 is a Definer 202 that represents a numerically measurable feature of a product, like an overall height, nominal voltage, maximum capacity, etc. Each Quantity 204 is related to exactly one SIItem 206. An SIItem 206 is a generic, numerically measurable physical property, as documented in the international SI standard, ASTM E380-91a. Examples are distance, electrical potential, and fluid volume. The SI standard also dictates which units can be used to express each SIItem 206. An SIItem 206 keeps track of these units and, in particular, the unit in which product data is stored (in a Numeric 240, see FIG. 17). An SIUnit 208 is a unit of measure for a particular SIItem 206. Each SIUnit 208 knows how to convert a measurement of its type to a measurement of any other unit for the SIItem 206.

Figure 14:
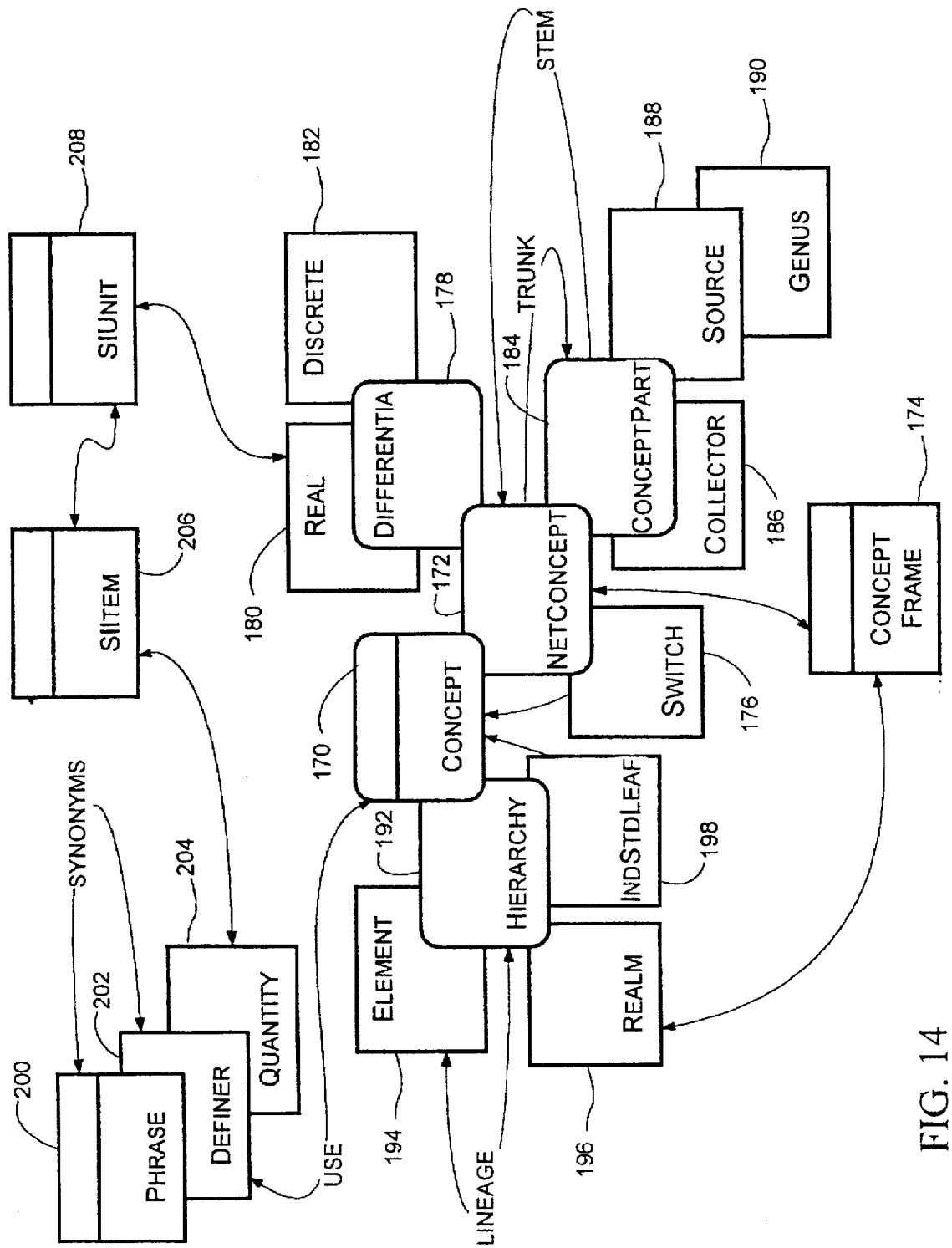
FIG. 14 is a block diagram illustrating various elements of the entire KnowledgeBase of the present invention.

FIG. 14 shows how the KnowledgeBase concept structures are related to the glossary. It includes a use relation for associating a Definer 202 with one or more Concepts 170. It also includes a relationship for relating a specific Real Differentia 180 to a specific SIUnit(s) 208.

IV. Description of First-Time Catalog Creation

Figure 15:
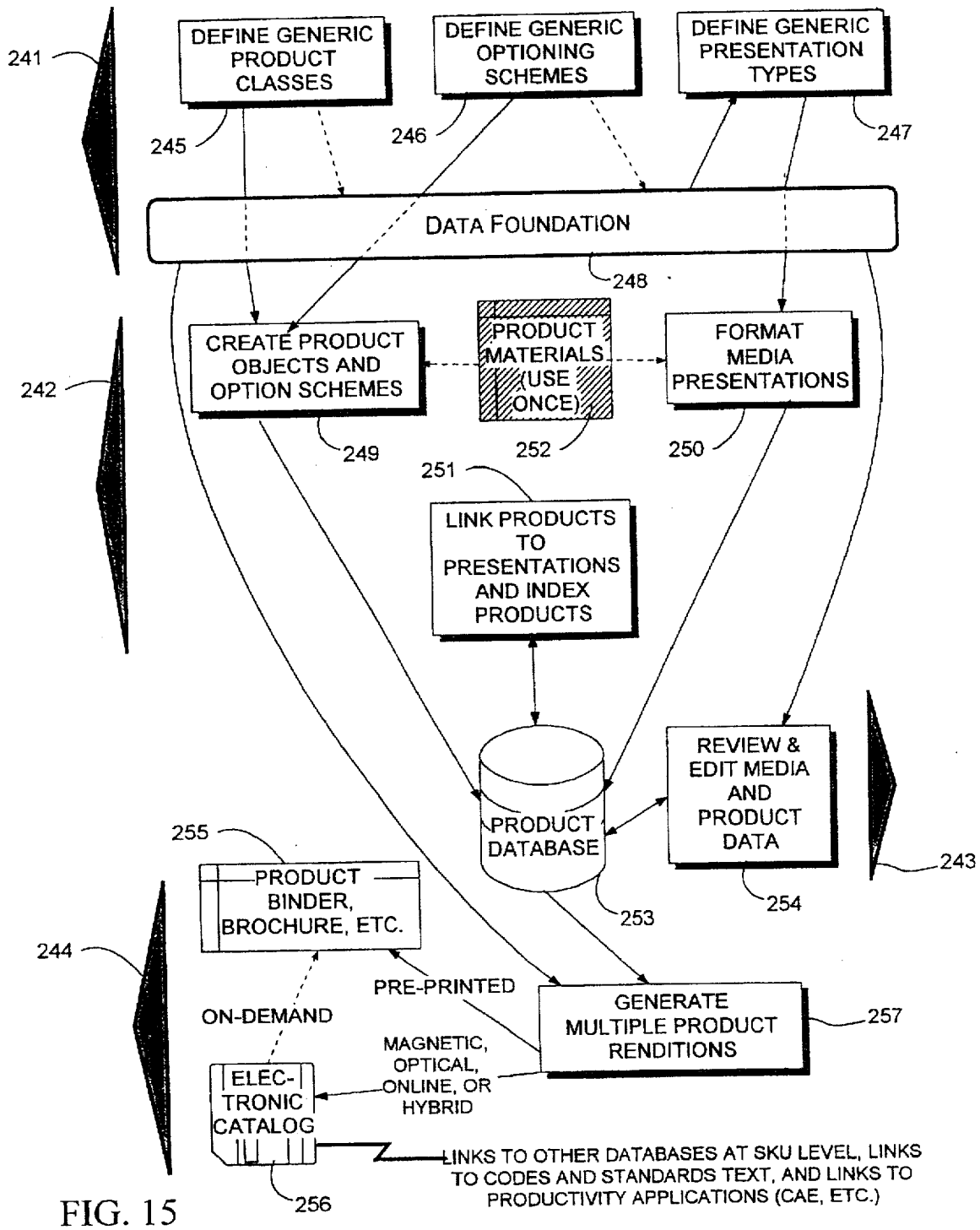
FIG. 15 is a flow diagram illustrating an overview of the first-time creation process for creating an electronic catalog in accordance with the present invention.

To create a catalog in the first instance, four general steps are performed including creating a data foundation, capturing product information, reviewing and editing product renditions, and publishing multiple renditions. The details of these general steps are described below in reverse order with reference to FIG. 15.

A. Publishing Multiple Renditions

Hard-copy manifestations of product information (255), along the lines of product pamphlets, binders, price lists, etc., can be made available either in an on-demand fashion, via an electronic delivery (256) or in pre-printed fashion, directly generated by the publishing process (257) that generates multiple product renditions. Note that the same publishing process (257) that generates pre-printed hard-copy (255) can also generate electronic catalogs (256), and that these electronic catalogs can be delivered via magnetic medium, optical medium, on-line, or a hybrid of these forms. Note also that while the publishing process (257) uses stored information as an input, it is preferably not used to change that stored information.

B. Reviewing and Editing Product Renditions

Generating product renditions by way of a single process (257) requires that a data foundation (248) and product database (253) exist, and that together they encompass all product objects along with their associated descriptive content and accessing routes. The product database must be structured such that each item of information knows in which form of rendition(s) to present itself, and the form of that presentation in each particular rendition. Although this information could be determined and edited directly via the data's own structuring, accomplishing such a task from the data structuring alone would be a complex matter. Therefore, a means is provided (254) to view information in the product database (253) in the context of any particular rendition, so that it will be presented in the same fashion as it would appear (255 and 256) if produced by the process which generates the rendition for final delivery (244). This same means of reviewing (254) allows the product database to be modified in such a way as to alter specific product presentation for one or more renditions. Note that in certain cases, this editing step may also involve making changes to the linking and indexing of product objects (251). Linking and indexing is described below.

Figure 22:
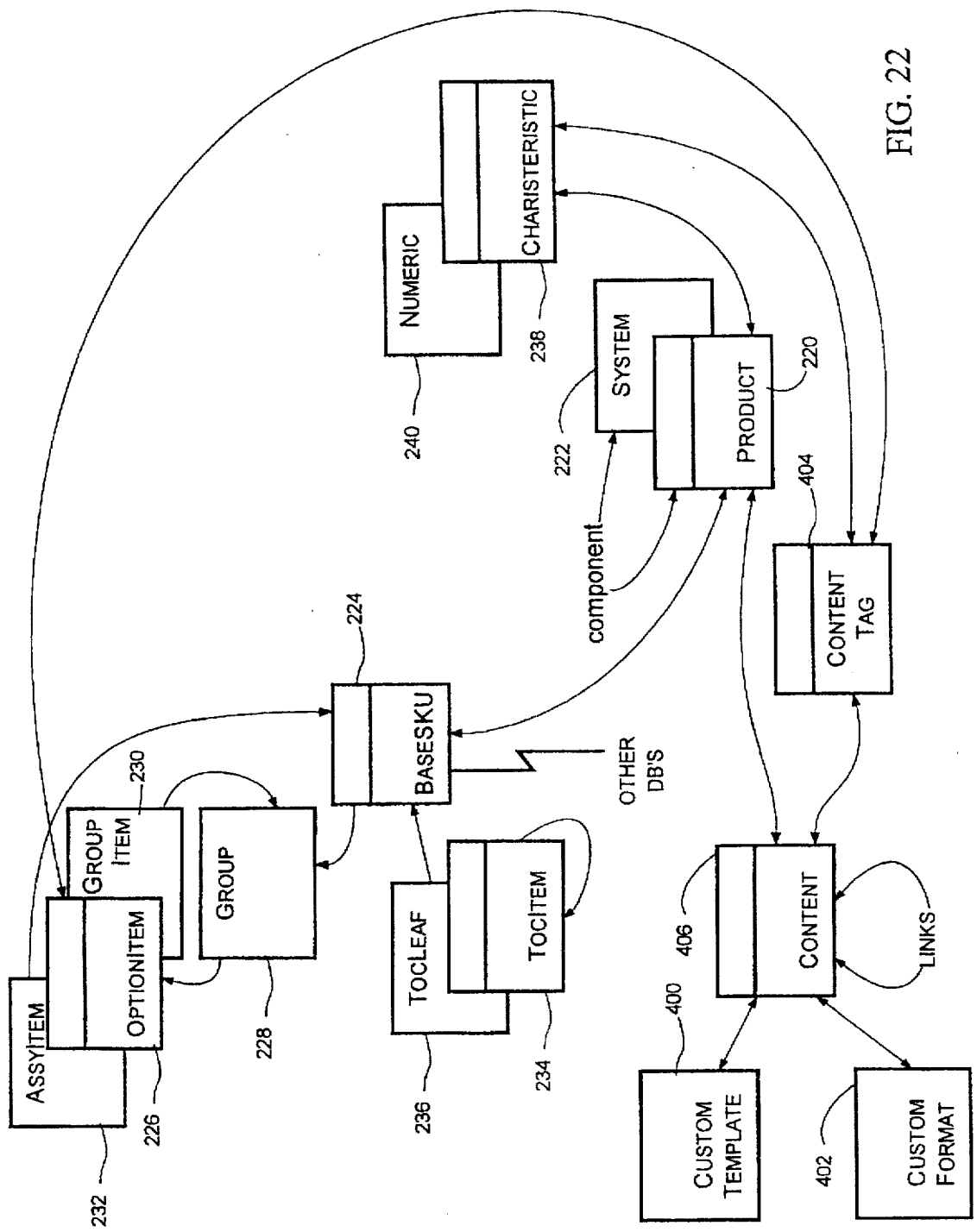
FIG. 22 is a block diagram illustrating various elements of the combined Media Base and Index Base constituting the product database of the present invention.

The preferred embodiment of the data structure for the product database is shown in FIG. 22 and described below.

C. Capturing Product Information in Electronic Form

The data foundation (248) is used to drive (but cannot be altered by) the accessing and presentation of specific product data for both reviewing/editing (254) and for generating (244) multiple renditions. The product database (253) contains three types of information: product object/option data (FIG. 16), media presentation data (FIG. 20), and linking data which allows product object/option data and media presentation data to be related (FIG. 22). This information is captured during step 242.

Product/option data is part of an Index Base defined by the data structure outlined in FIG. 16. The Index Base data structure may include structures for creating links between the following elements: Product(s) 220; System(s) 222; BaseSKU(s) 224; Optionitem(s) 226; Group(s) 228; GroupItem(s) 230; AssemblyItem(s) 232; TOCItem(s) 234; and TOCLeaf(s) 236.

As shown in FIG. 16, each BaseSKU 224 is linked to a Product 220. A BaseSKU 224 is the embodiment of a normalized orderable product (which may have configuration options). It includes the manufacturer's unique identifier and descriptive information about the orderable base product (e.g., name, shipping weight, etc.). BaseSKU identifiers enable the product database to be linked to any number of other databases that provide information that is maintained on a basis that is outside of the "catalog" publishing cycle (e.g., price, availability, etc.). A Product 220 is a collection of BaseSKUs 224 from a single manufacturer that share common characteristics as dictated by indexing against concept frames (index path) within a product realm.

A System 222 is a Product 220 that is made up of other Products from the same manufacturer. These associations are maintained by the component relationship.

A BaseSKU 224 may be related to an OptionItem 226 by way of Groups 228. An OptionItem 226 embodies data about a particular option as well as the rules that dictate how an option may be applied to one or more BaseSKUs 224. An OptionItem 226 includes a description (which may be a number, such as "2" representing the number of levels sensed by a level sensor) and an indication as to how many times the item may be picked, and for each pick any increases in shipping weight, shipping volume, price, etc., that will be incurred. It may also include a code to be inserted into the identifier for the BaseSKU 224, per the instructions given in its related Group(s) 228. It may also include a pointer to a particular different OptionItem 226 which is to be the next option offered (circumventing other options in the group's ordered collection), if the present option is successfully executed.

A Group 228 is an ordered collection of OptionItems 226 that may be referred to by any number of BaseSKUs 224 and/or OptionItems 226. A Group object includes a title (for example, "no. of levels sensed"), information about the maximum and minimum number of related OptionItems 226 that may be picked (for example, "1" and "1"), and instructions as to how the BaseSKU identifier (order number) would be modified when an OptionItem 226 is picked (for example, append option item description to the end of the Base SKU). Note that a Group 228 may be used as the means of representing a specific Real Differentia 180 (FIG. 10) (for example, node 121 on FIG. 3) at the SKU level; in this case the related OptionItems 226 would be for the specific values that are available (or for a value to be user-designated). Alternatively, a Group 228 may be the representation of a Collector 186 (FIG. 10) as applied at the SKU level; in this case the related OptionItems 226 would be for the specific related Discrete Differentia 182 (FIG. 10) that are available (see, for example, node 119 on FIG. 3).

A GroupItem 230 is an OptionItem 226 that, when picked, directs the user to the referenced Group 228 for a further layer of choices.

An AssemblyItem 232 is an OptionItem 226 that points to another (i.e., accessory) BaseSKU 224 which will be added to the user's order as a way of fulfilling the need expressed by the OptionItems 226 being picked.

A TocItem 234 is a product descriptor which may be related in a hierarchical fashion to other TocItems 234 of the same manufacturer as a means of providing manufacturer-specific (table of contents) access to BaseSKUs 224.

A TocLeaf 236 is a TocItem 234 that is a leaf in its associated hierarchy of TocItems 234. A TocLeaf 236 can be related to one or more BaseSKUs 224.

Figure 17:
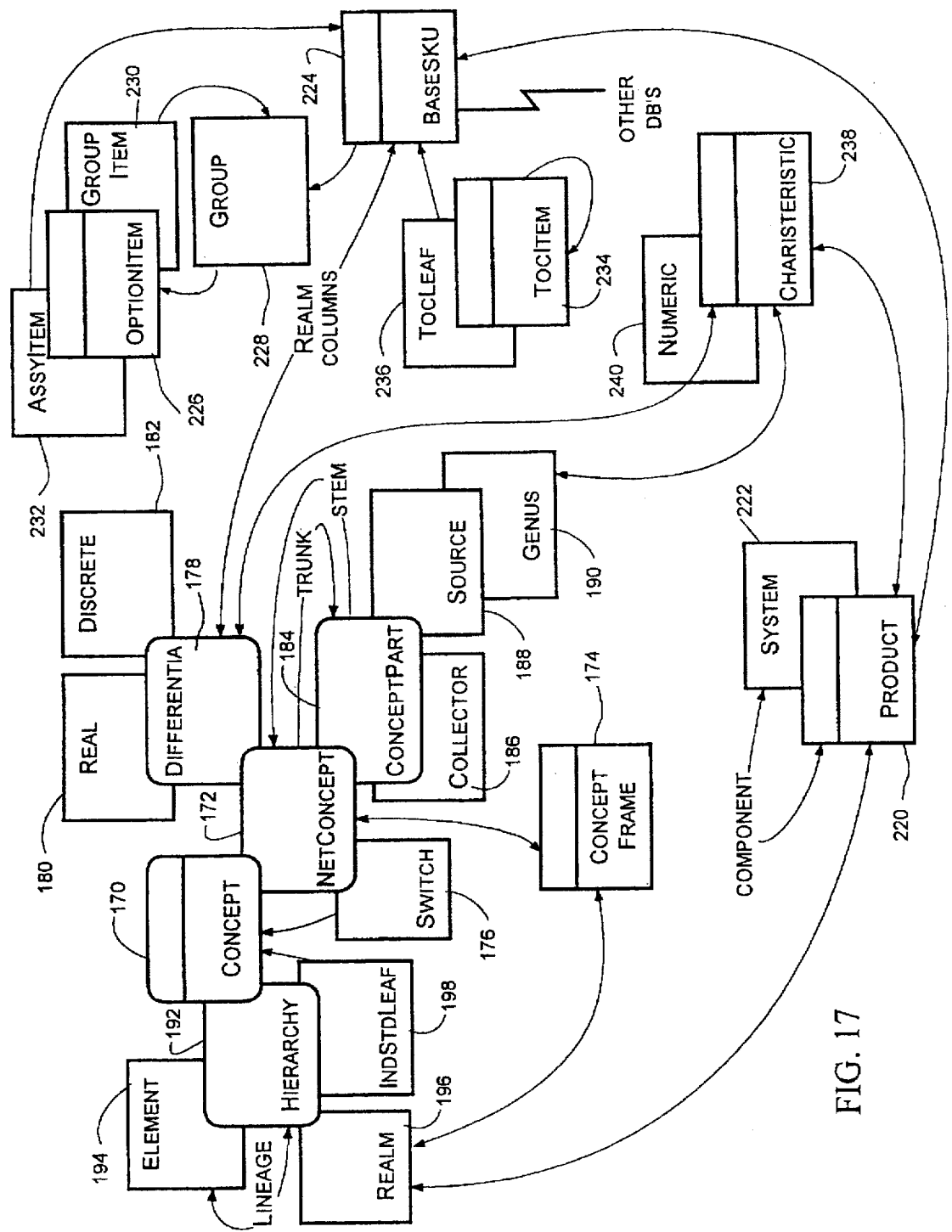
FIG. 17 is a block diagram illustrating various elements of the combined Index Base and KnowledgeBase of the present invention.

FIG. 17 shows how the Knowledgebase classes relate to the Index Base classes. Every Product 220 is related to one Realm 196. Every Product 220 may have multiple Characteristics 238, each of which relates to either a Genus 190 or a Differentia 178 within its Realm 196. A Characteristic 238 is a unique matching of a Product 220 to either a Genus 190 or a Differentia 178, as allowed by concept frame navigation rules. As will be shown in FIG. 22, the Characteristic 238 also stores references to the media content used to establish the validity of the Product 220 to Genus/Differentia match.

A Numeric 240 is a Characteristic 238 that is related to a Real Differentia 180. A Numeric 240 stores the real numbers for that measurement of the Product 220 (a minimum and a maximum value).

As described above, a Product 220 will usually consist of multiple BaseSKUs 224. In this case, all BaseSKUs 224 that share a common Product 220 are distinguished from one another by differences in their Differentia 178 and/or differences dictated by their OptionItems 226. For a given Product 220 this situation may be envisioned as a table with a row for each BaseSKU 224 and having a column for each Differentia 178 allowed for the Product 220, under concept navigation rules. Additional columns are provided for option alternatives, that is, features that are unique to a manufacturer which may not be accounted for as NetConcepts 172.

Returning to FIG. 15, the creation of product objects and option schemes (groups and items) (249) is a process of interpreting data represented in original product information sources (252, i.e., printed materials, interpreted to include, at a minimum, the existing printed product information; however, it can also include materials and data that were used in the creation of that printed information and new materials created exclusively for electronic presentation) according to the generic product classes (245) and generic optioning schemes (246) that have been set up for each product's realm. FIG. 17 shows how this interpretation is recorded in the preferred embodiment. The result of this process (249) is a data object for each BaseSKU and manufacturer-specific option schemes that describe additional product features that are available for specific groups of BaseSKU products. A rudimentary version of this process (249) is detailed in FIG. 18.

Figure 18:
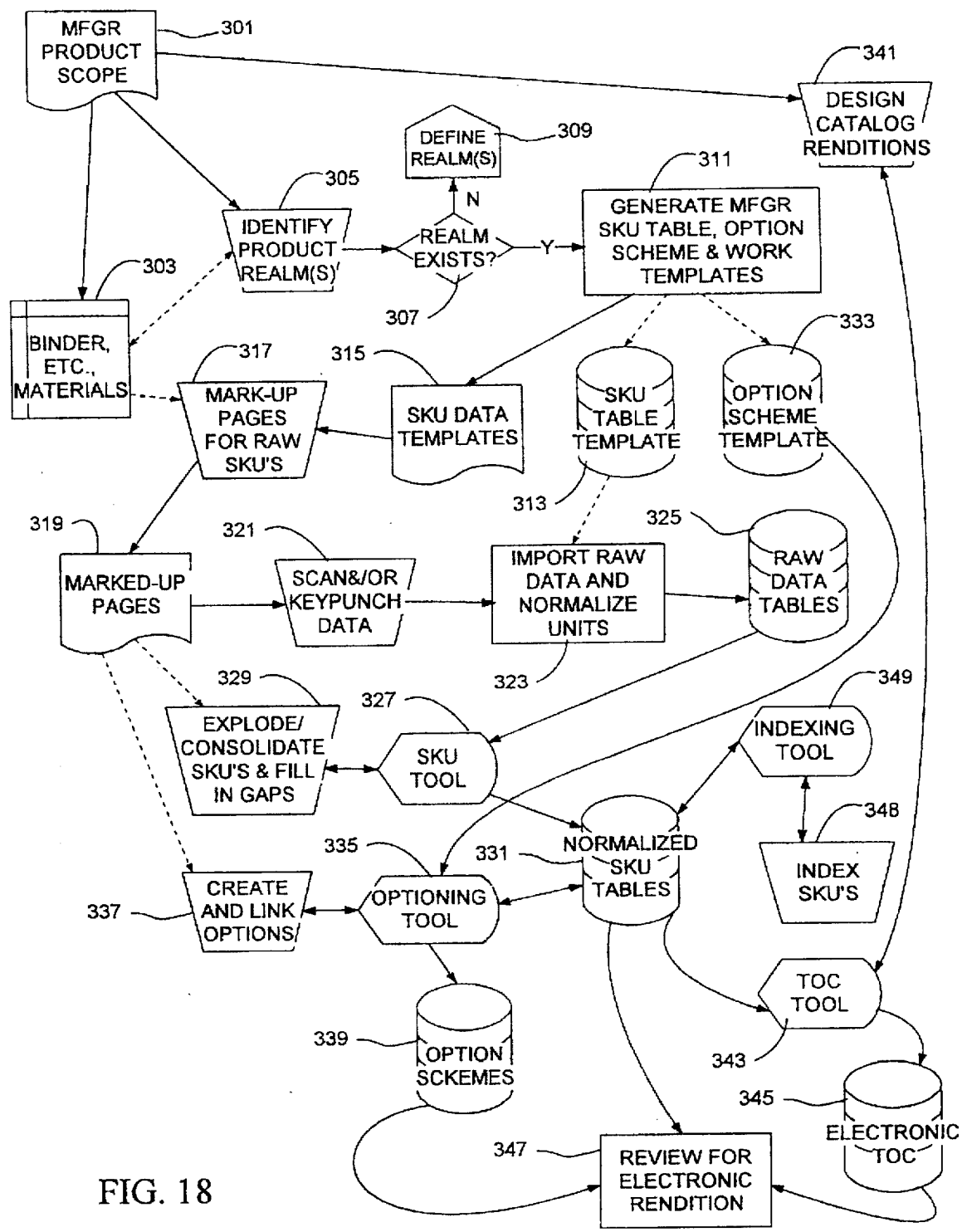
FIG. 18 is a flow diagram illustrating the details of the first-time creation process for creating an electronic catalog in accordance with the present invention.

FIG. 18 shows the rudimentary process for the first-time creation of product objects and option schemes from catalog materials. This process would be undertaken independently for each manufacturer who makes products within a realm of interest. There are three main results of this process: the normalized base SKU table (331), the populated option scheme(s) (339), and the electronic Table of Contents (TOC) (345). FIG. 16 shows these results as a part of the product database in the preferred embodiment.

To first generate an empty SKU table (313), then to add data to that table to turn it into a raw data table (325), and finally to massage data in the raw data table to arrive at the normalized base SKU table (331), a number of steps are preferably completed. Given an indication of which portion of a particular manufacturer's total offering of products (scope) is to be captured (301), the initial goal is to identify and capture those elements of data within the manufacturer's printed materials (303) that have a bearing on creating the respective product objects. This goal, and all succeeding work, is preferably undertaken one realm at a time, so the first order of business in achieving the goal is to identify the realms for all products within the scope (305), to choose a particular realm to work on, and to make uniquely numbered copies of all pages of materials that have information pertinent to products within that realm (317). The tasks involved in marking up pages and extracting data based on such marked-up pages can be done either manually, using paper copies of printed pages, or electronically, using scanned versions of printed pages. The following discussion describes the manual approach.

Assigning the realm for a given product or line of products (305) can be efficiently accomplished using the classification tree of realms that is embodied in the concept structure constructed in step 4 of the section "D. Building the Data Foundation" described below. Starting at the root of this tree, the product(s) are determined to fulfill exactly one of the defined characterizations at each successive level of the tree until an end node is reached, thus identifying the realm (307). If an end node cannot be reached in this fashion, then a new realm should be defined (309) before continuing (see steps 4 and 5 of the section "D. Building the Data Foundation"). Assuming the products of a particular realm are being captured, the next steps are to generate the empty SKU table (313), option scheme template(s) (333), and work templates (315) for the manufacturer's products being captured within the realm. These steps are this is accomplished in a coordinated fashion, as represented by 311.

In the preferred embodiment, the SKU table template (313) is generated by a computer program operating upon information already existing in the KnowledgeBase portion (FIG. 10) of the data foundation (248). The SKU table template, an example of which is shown FIG. 19, can be envisioned as an empty table made up of rows and columns, with one row for each of an unlimited number of SKUs, and a finite quantity of columns within three categories. The first category of columns ("standard columns") are the same for all SKU tables of all realms of all manufacturers. This category includes such columns as printed page reference number(s), product number, product line, product name, product object reference, and option group reference, etc. The second category of columns ("realm columns") includes two columns for each Differentia and Genus in the realm (see FIG. 12). One of the two columns is for "raw" data and the other is for "final" data, where raw data entries can be any type of characters and final data is a boolean (true or false) for all Genus 190 and Discrete Differentia 182. The final data entry is a real number in the case of Real Differentia 180. These columns are preferably the same for all SKU tables of all manufacturers, where the tables apply to the same realm. A third category of columns ("custom columns") is made up of columns that can be different for each different manufacturer's table within the same realm. Whereas the first two categories are automatically added to a SKU table at its creation, columns are added for the custom columns category manually, as needed to capture entries for additional manufacturer characteristics not included in the realm's concept frame(s). Note that "custom column" characteristics may or may not be used to either differentiate between base SKUs or to serve as option items that help define particular configurations of a base SKU.

Along with the generation of the SKU table, certain "potential product" views of this table would preferrably also be automatically generated (views being a standard facility of most Relational Data Base Management Systems (RDBMSs)). Each of these views would correspond to a unique feasible combination of Genus-related columns, as dictated by the logical scheme inherent in the realm's concept frames. These combinations could be thought of as defining a multitude of product classes, or potential products.

A SKU data work template (315) is a numbered listing of product characteristics that are described on a particular page(s) within the copies made of printed binder materials. A SKU data work template is created by reviewing these copies and selecting an appropriate subset of columns from the SKU table to match the described characteristics.

In so designating columns for use on SKU data work templates, the analyst can make use of the logical relationships between associated concept frame elements to provide guidance in marking up the page(s) for raw data entry. For example, if the selected column relates to one of the concept frame's collector nodes which offers an exclusive choice among feature alternatives, then an expected raw data entry will be phraseology corresponding to one of those alternatives. During the creation of a SKU data work template, it may also be necessary to add columns to the custom columns section of the table.

The process of designating these columns (part of 311) will automatically produce a column numbering scheme unique to the particular subset (SKU data work template). In the preferred embodiment, the maintenance of these subsets and the generation of the SKU data work templates is achieved using the mechanism of "views", which is a standard part of most RDBMS.

Having created the subset (or view) of the SKU table that applies to a particular page(s), the product analyst marks up the relevant data on the page(s), indicating the SKU and view column number for each element of data (317). The resulting marked-up page(s) 319 continues to be associated with its particular SKU data template for the balance of the product capture process. In the case of a manual page copy implementation, this may be accomplished by noting the view name on the pages (317) and the page number(s) on the SKU data work template printout (315). For an electronic implementation, this information may be managed within the RDBMS.

Given the existence of the SKU table template (313) and the existence of the pages (319) that have been marked up according to the SKU data work templates (315), converting the SKU table template into a raw data table (325) is a relatively simple matter. This involves first converting the elements with their SKUs and view column numbers into electronic form. This can be done either by key entry, or by OCR scanning with copy/paste into displayed view table fields, or by some similar means (321). Once this data is in electronic form, it can be loaded into the appropriate raw data fields for automatically creating SKU records in the empty SKU table. Note that as data is loaded into a SKU record, the source page(s) for this data is also recorded. Finally, those raw data fields that correspond to numeric data are normalized to the units appropriate for their corresponding "final data" columns. All of these activities for processing electronic data into the SKU table are accomplished, with minimum human intervention, by the import raw data and normalize units function (323). The preferred embodiment of this function is a program written using the API and import facility provided with most commercially available RDBMSs.

Using the SKU tool (327), the raw data table (325) that was created through the foregoing steps (301–323) is converted into a normalized SKU table (331). This conversion is largely a manual task (329) that involves filling in data gaps and exploding and/or consolidating the SKU records in the raw data table. This task (329) is begun only after all the manufacturer's binder pages for the realm have been processed into raw data (steps 301–325), so that all marked-up pages (319) are available as a reference for all data being converted. The following details how the exploding/consolidating of SKUs and the filling-in of data gaps (329) is accomplished, using the SKU tool (327).

In the preferred embodiment, the SKU tool is an implementation of a commercially-available SQL query/editing environment, such as Oracle's Easy SQL. Such an environment allows the user to easily manipulate tabular data. For example, the columns displayed can be limited according to pre-defined views. In addition, the scope and order of records displayed can be easily controlled by sort and select capabilities that can be applied in many combinations to any displayed field(s). An example of use in this particular implementation would be to apply one of the views associated with a particular marked-up page(s) in order to display only those columns relating to data on that page(s). Another example would be to sort records in the order of SKU number to help in establishing which records might be combined (by dropping a particular character in the SKU number and handling the product difference as an option against the resulting normalized "base SKU") or exploded (by duplicating an SKU record, with an addition of distinguishing characters to the SKU numbers to handle as separate base SKU's some variation that the manufacture's existing printed binder handles as options). In yet another example, a particular selected group of records thought to be largely similar could be displayed from the perspective of a particular "potential product". By displaying this group according to an appropriate "potential product" view (one of those created when the empty SKU table was generated), it would be readily apparent if the SKUs have been properly normalized and/or if certain elements of data that should be filled-in are currently blank. As a final example, this environment would allow various efficient means for editing and duplicating values in the raw data table, and for using the values of raw data columns to fill in their corresponding final data entries.

After the results of the exploding/consolidating of SKU's and the filling-in of data gaps (329) is reflected in the normalized SKU table (331), data from that table is used along with information from the marked-up pages (319) to convert the option scheme template(s) (333) into option schemes (option item(s) with groups) (339) that further define different available configurations of the particular manufacturer's SKUs. In the preferred embodiment, any particular option scheme maybe in the form described in FIG. 16. This is accomplished (337) by using the optioning tool (335) in close conjunction with the SKU tool (327).

The normalizing of SKUs, as described above, does not necessarily result in a definition of all the configurations of goods made by a specific manufacturer, nor the number/method for communicating an order for a particular configuration of an SKU. A particular normalized SKU may not provide a detailed enough description to allow that manufacturer to make/deliver an item (he only manufactures goods that exceed the normalized level of form and/or functionality). In such a case the manufacturer's minimum "orderable" SKU may have more characters than the normalized SKU, and an option group (228) that requires further specification of characteristics must be associated with the normalized SKU. On the other hand, if an equivalent normalized SKU is orderable from a second manufacturer, it might also be available in orderable form with certain combinations of additional features. Even if this second manufacturer's catalog enumerates these other forms of the product as separate SKUs with pre-packaged additional features (and not as options), they will be expressed in the product database using an option scheme that is related to the single normalized SKU. In yet another case, a third manufacturer offers the same functionality as the other two manufacturers in a product that is formed by the customers' combining of a certain one of his orderable SKUs, along with one or more additional SKUs that represent products that can be used with the first SKU to enhance its form and/or functionality. In this case, the normalization process would have required the addition of an artificial (hidden) character(s) to the SKU; this new (additional) SKU needs to be associated with an optioning scheme that requires a user selection from among those assembly option items (232) designating SKUs which, together with the original base SKU, provide the form and/or functionality required of the new normalized SKU.

The above examples make clear the interplay required between manipulating SKUs (329) and creating option schemes (337). In its preferred embodiment, the optioning tool (335) will be capable of manipulating both RDBMS data, in the form of a normalized SKU table, and OODBMS data, for the option scheme data and relationships. While the core capability for simultaneously accessing both forms of data is available commercially, this implementation will, in the preferred embodiment, be a custom application of this kind of capability. This application will keep track of the correspondence between certain option schemes and the normalized SKU table columns. In this way, the relationship between an option scheme and differentia in the related realms' concept frames can be determined.

Once a normalized SKU table (331) has been completed for each realm in the manufacturer's scope, these tables are accessed by the TOC tool (343) for the purpose of creating access paths to SKUs based on the manufacturer's own organization of products and/or product concepts. Creation of an electronic table of contents (TOC) (345), which may be organized differently from the TOC in the manufacturer's printed catalog, is a part of the overall design of different catalog renditions (341). This particular design task is facilitated by the TOC tool (343), which allows a simple tree navigation structure to be defined (using an outliner tool in the preferred embodiment) with one or more SKUs attached to each leaf. The nature of the nodes on this structure is completely free format, is not governed by the bounds of realms or by any particular product characteristics, and is entirely up to the manufacturer's preferences. To aid in the construction of the nodes and in the assignment of SKUs, the TOC tool (343) has a functionality similar to the SKU tool (327) for displaying information in the normalized SKU table (331); however, while this display would support the ability to copy and paste elements from the normalized SKU table to the electronic TOC table, it would not allow any alteration to the contents of the normalized SKU table. With the TOC table completed, at least one electronic rendition of one manufacturer's catalog (without media presentations) can be reviewed (347 and 254).

Figure 18A:
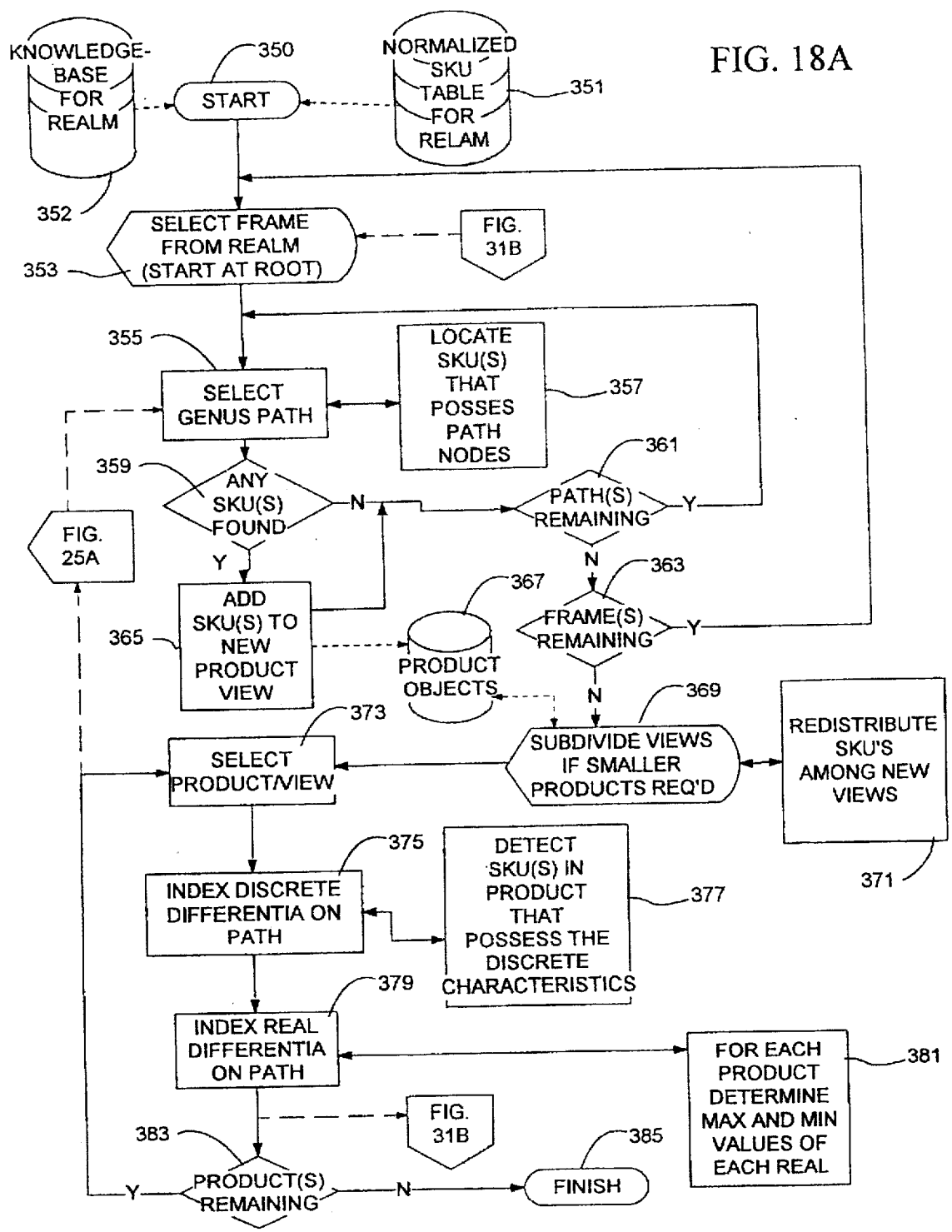
FIG. 18A is a flow diagram illustrating the details of the process for indexing products from normalized SKUs.

FIG. 18 also features a representation of a rudimentary process for indexing SKUs (348). This process would allow the creation of product objects (220). According to the description for the preferred embodiment (FIG. 16), products are collections of base SKUs from a single manufacturer that share common characteristics, as dictated by their indexing against concept frames within a product realm. One means for creating products would be through an interactive indexing tool (349) that would identify all SKUs in the normalized SKU table that meet the requirements of each particular "potential product" (as dictated by the genus characteristics within the concept frames). Different algorithms for processing the normalized SKU data against the concept frames are possible. FIG. 18A, which is described below, shows one implementation of this indexing tool. Further sub-dividing these groups of SKUs into "smaller" product objects according to differences on Differentia, organizations expressed in the electronic TOC, etc., would be allowed according to the judgment of the indexing tool user.

Through the programmed functionality of the indexing tool (349), a product object that has been established and associated to particular SKUs, is automatically related to genus items in the realm's concept frames. In the preferred embodiment, this relationship is established using a characteristic, per FIG. 17. At this point, the indexing tool (349) can also automatically create relationships to the appropriate differentia that are allowed (by the concept frame logic) within the product class, as follows: for discrete differentia, if and only if at least one of the SKUs associated with the product possesses the quality (according to that SKU's corresponding final data entry in the normalized SKU table), then a relationship is established between that product and that differentia, using a characteristic to record the relationship. For real differentia, all SKUs associated with the product are processed to determine the largest and the smallest value for the associated actual data entry, and those two values are recorded as a part of the relationship created between the real differentia and the product, as shown in the preferred embodiment in FIG. 17.

FIG. 18A shows a process 350 for indexing products from normalized SKUs utilizing the KnowledgeBase 352 for a realm and the normalized SKU table 351 for the realm. The process begins with the user selecting a concept frame from the realm starting at the root of the concept structure (step 353). Then, a genus path is selected (step 355) and SKUs that possess the characteristics associated with the path nodes are located (step 357). Next, a determination is made whether SKUs are found (step 359). If no SKUs are found, the process next determines if there are any paths remaining in the selected concept frame (step 361). If there are paths remaining the process returns to step 355 to select the next genus path and steps 357 through 361 are repeated. If, in step 359, SKUs are found the process continues by adding these SKUs to a new product/view (365) which is reflected in the listing of product objects 367. If there are no paths remaining in step 361, the process then determines whether there are any concept flames remaining in step 363. If there are concept frames remaining, the process returns to step 353 to select a new concept frame and steps 355 through 363 are repeated for the new concept frame. If, on the other hand, there are no concept frames remaining, the next step in the process (step 369) is to subdivide the product views if a smaller number of SKUs per product is desired. If the views are subdivided, the SKUs are distributed among the new views (step 371). Next, a product/view is selected (step 373) and Discrete Differentia on the path are indexed (step 375). Step 375 is performed while detecting whether there are any SKUs in the product that possess any discrete characteristics (step 377). Next, any Real Differentia on the path indexed (step 379) and for each product the process automatically determines the maximum and minimum values of each Real Differentia (step 381). Then, the process determines whether there are any products remaining in step 383. If there are products remaining, the process returns to select a new product/view in step 373 and then steps 375 through 381 are repeated until no products are remaining—at which point the process is finished (step 385).

Figure 20:
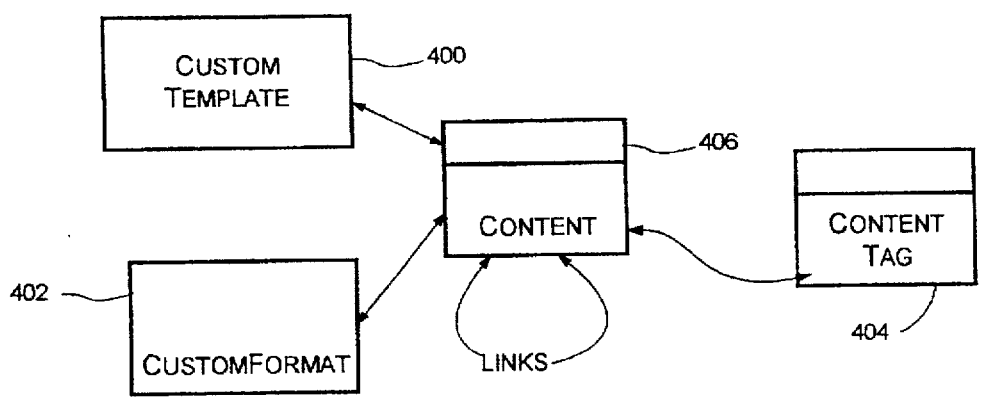
FIG. 20 is a block diagram illustrating various elements of the Media Base of the present invention.
Figure 21:
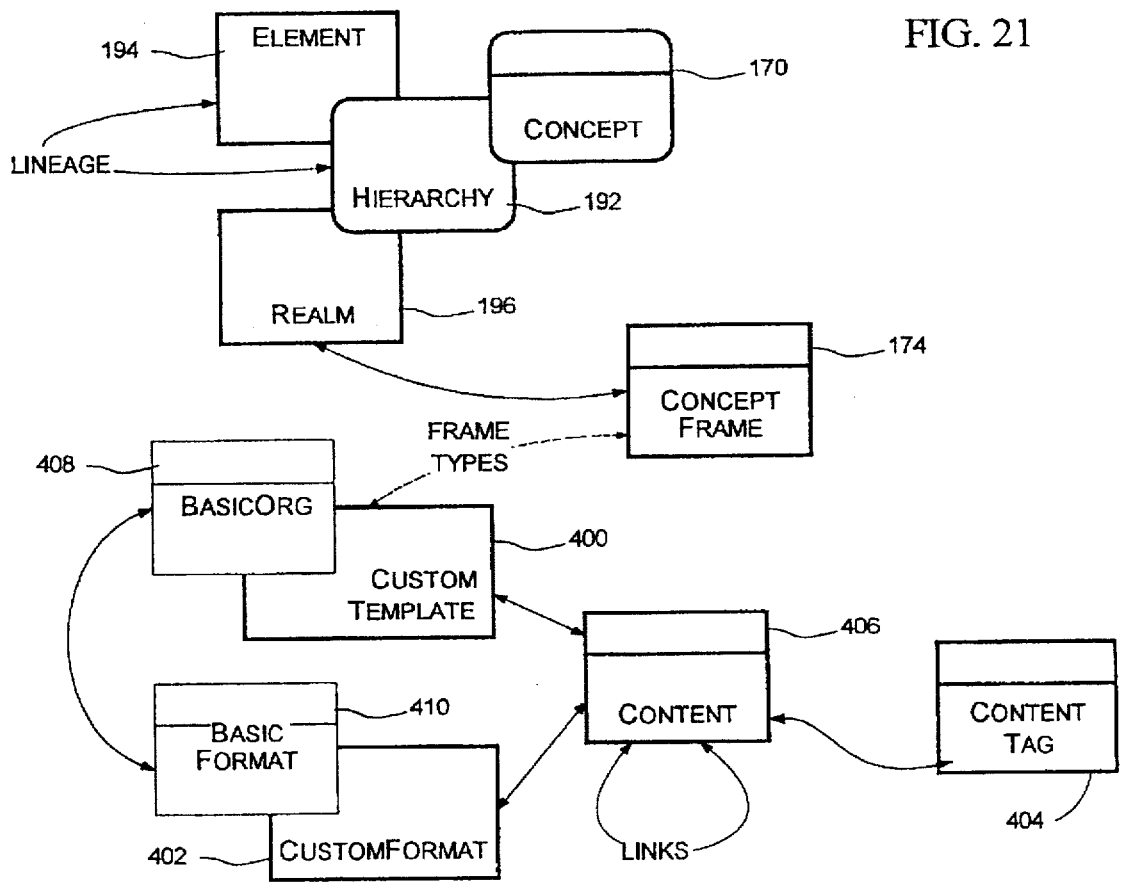
FIG. 21 is a block diagram illustrating various elements of the combined Media Base and KnowledgeBase of the present invention.

The formatting of media presentations (250) is the process of interpreting descriptive content (text, pictures, vector graphics, etc.) from original product information sources (252, i.e., printed binder materials) according to the generic presentation types (247) set up for the products' realms. FIGS. 20 and 21 show how this interpretation is recorded in the preferred embodiment. Note that certain presentation types, most notably tables, can include logical links that enable specific content to be associated with generic product class (245) and/or generic optioning (246) information in a particular concept frame. How this may be accomplished is now described.

FIG. 20 shows the data structure for the media base in accordance with the preferred embodiment. The media base data structure may provide for Custom Template(s) 400; Custom Format(s) 402; and Content Tag(s) 404 all linked to the Content 406 of the media.

A Content 406 is a piece of descriptive media preferably expressed in SGML (Standard Generalized Markup Language) and/or one of its extensions (Document Style Semantics and Specification Language (DSSSL), HyTime, etc.). Each Content 406 is structured according to one or more CustomTemplates 400 that enforce rules about the structuring of information within that Content 406. Such structuring involves the creation of ContentTags 404 for the Content 406. In addition, links between different Contents 406 may be suggested and stored. A CustomTemplate 400 is preferably an SGML Document Type Definition (DTD) used for the organization of Content 406. A CustomFormat 402 is one or more schemes used for the presentation of Content 406. A ContentTag 404 is the specific use of an SGML tag to relate some portion of a Content 406 to a Product's Characteristics 238 (FIG. 17). This is illustrated in FIG. 22.

FIG. 21 shows how the Media Base is directly related to the Knowledgebase. As was explained earlier, a Realm 196 can have multiple ConceptFrames 174. Each of these ConceptFrames 174 is one of a limited number of ConceptFrame types. A CustomTemplate 400 enforces Content 406 structuring, in part according to specific concept frames of reference. Because of this, CustomTemplates 400 are related to ConceptFrames 174 according to the specific concept frame types they share in common.

The combined Media Base and KnowledgeBase may also include a BasicOrg 408, which is a base SGML DTD from which CustomTemplates 400 are derived, and a BasicFormat 410, which is a base format from which CustomFormats 402 are derived. A BasicFormat 410 is related to one or more BasicOrgs 408.

FIG. 22 shows how the Index Base is related to the Media Base to define the product database. It shows a relationship for associating each Product 220 with multiple Contents 406 and each Content 406 with multiple Products 220. Also, each of a Product's indexed Characteristics 238 can be associated to specific portions of those Contents 406 through ContentTags 404.

Figure 23A:
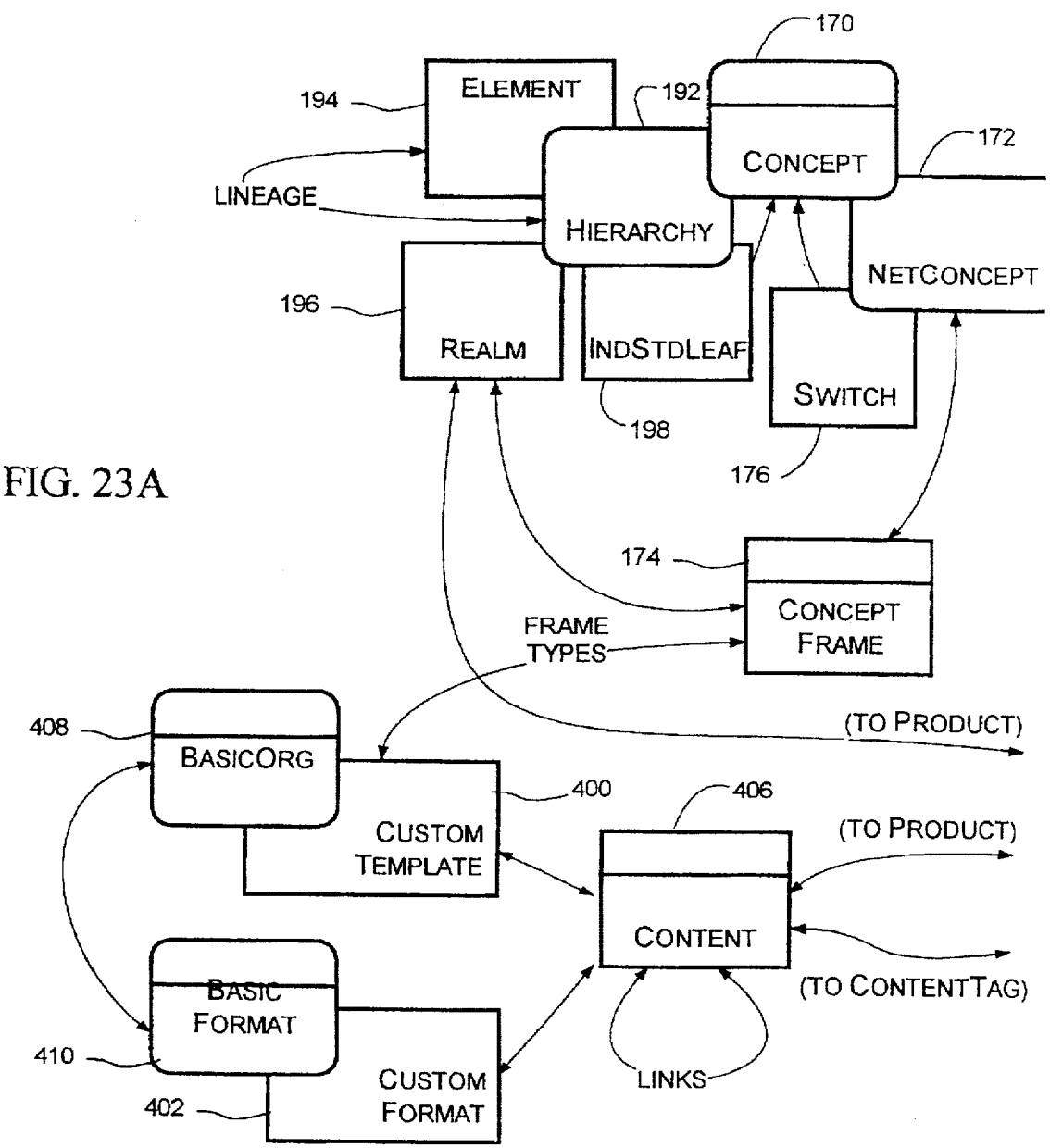
FIG. 23 is a block diagram illustrating various elements of the combined product database and the concept structure of the KnowledgeBase of the present invention.
Figure 23B:
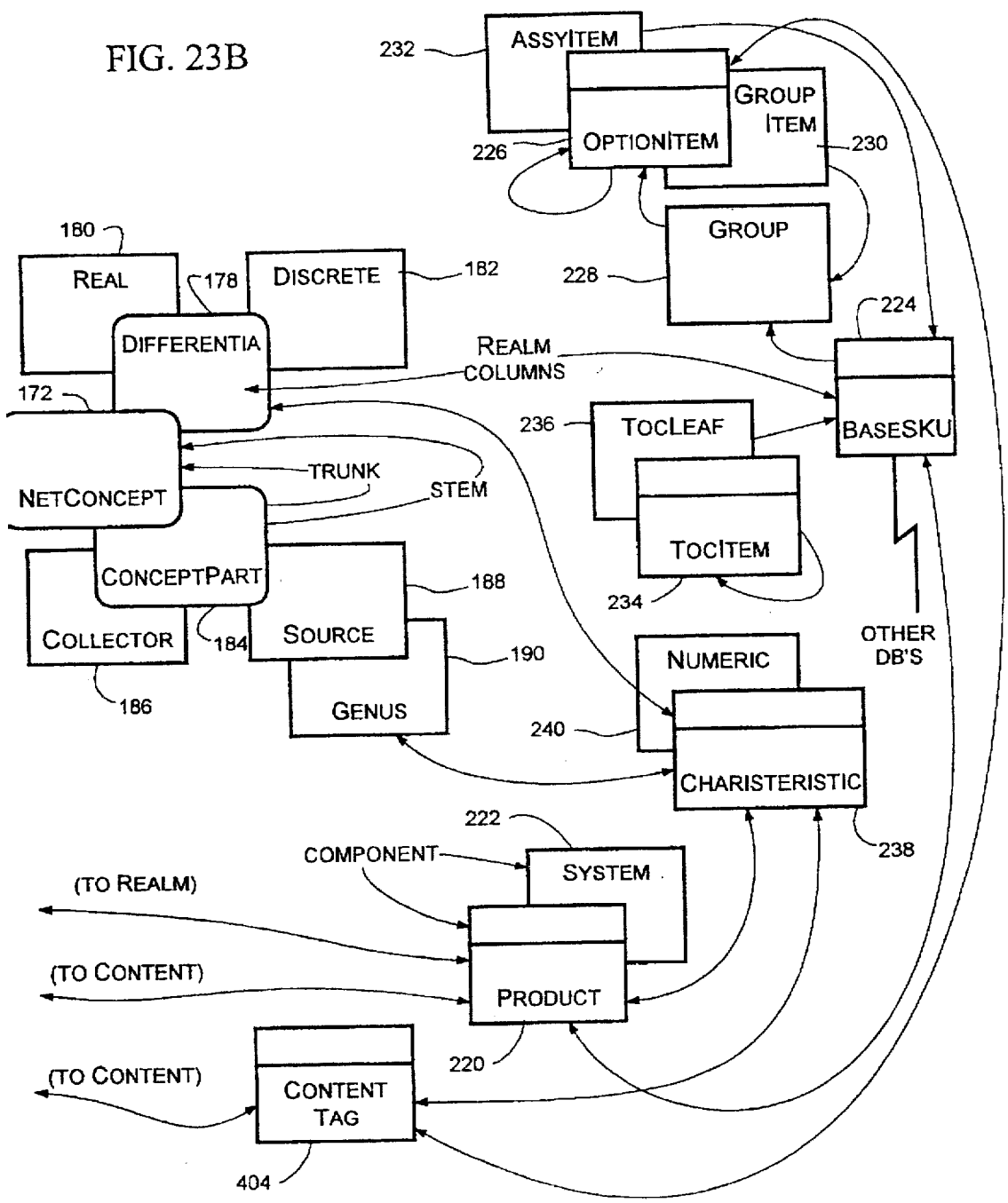

FIG. 23 shows the interplay between the classes of the Knowledgebase Structures, Index Base, and Media Base. No new relationships or classes have been added. This structuring facilitates multiple scenarios for maintaining and publishing product information. For example, assume that a KnowledgeBase has been established for a particular Realm, and that a particular manufacturer's Products within that Realm have been indexed against the Realm's concept frames, using Contents 406 formatted according to the organization of the Media Base. Then, if some Content 406 is being modified, the modification of a particular portion of that Content 406 can immediately identify and indicate that portion's significance to the indexing (and end user access) to affected Products 220. As another example, in designing and/or maintaining hypernavigation of Content 406 via links, this structuring makes clear the base entry points for the end user's access to Products 220. It is clear how this information can be used to suggest appropriate links between Contents 406 because this organization also relates Contents 406 to Products 220 in the specific context of indexing against the KnowledgeBase.

Figure 24A:
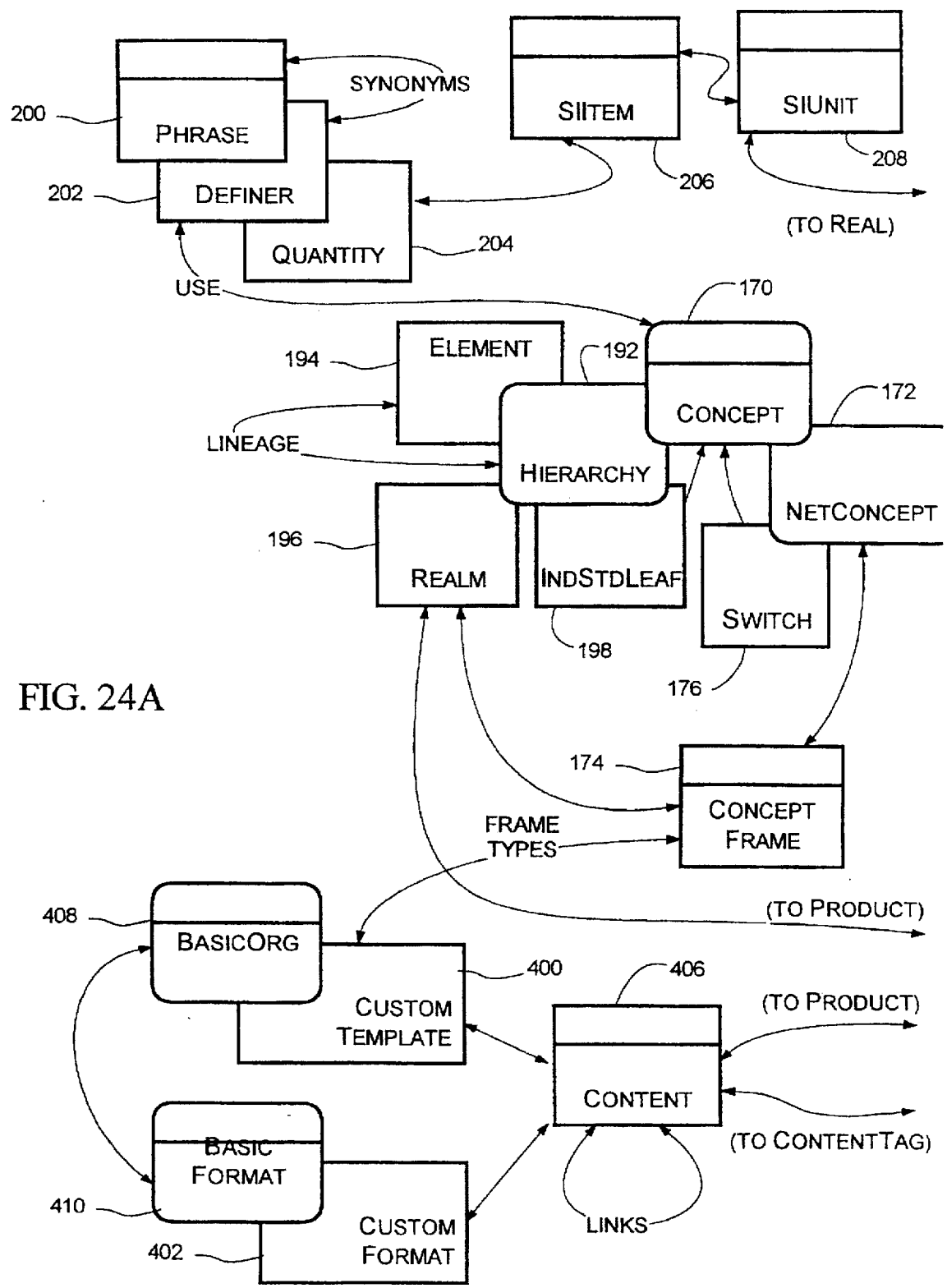
FIG. 24 is a block diagram illustrating various elements of the combined product database and the KnowledgeBase of the present invention.
Figure 24B:
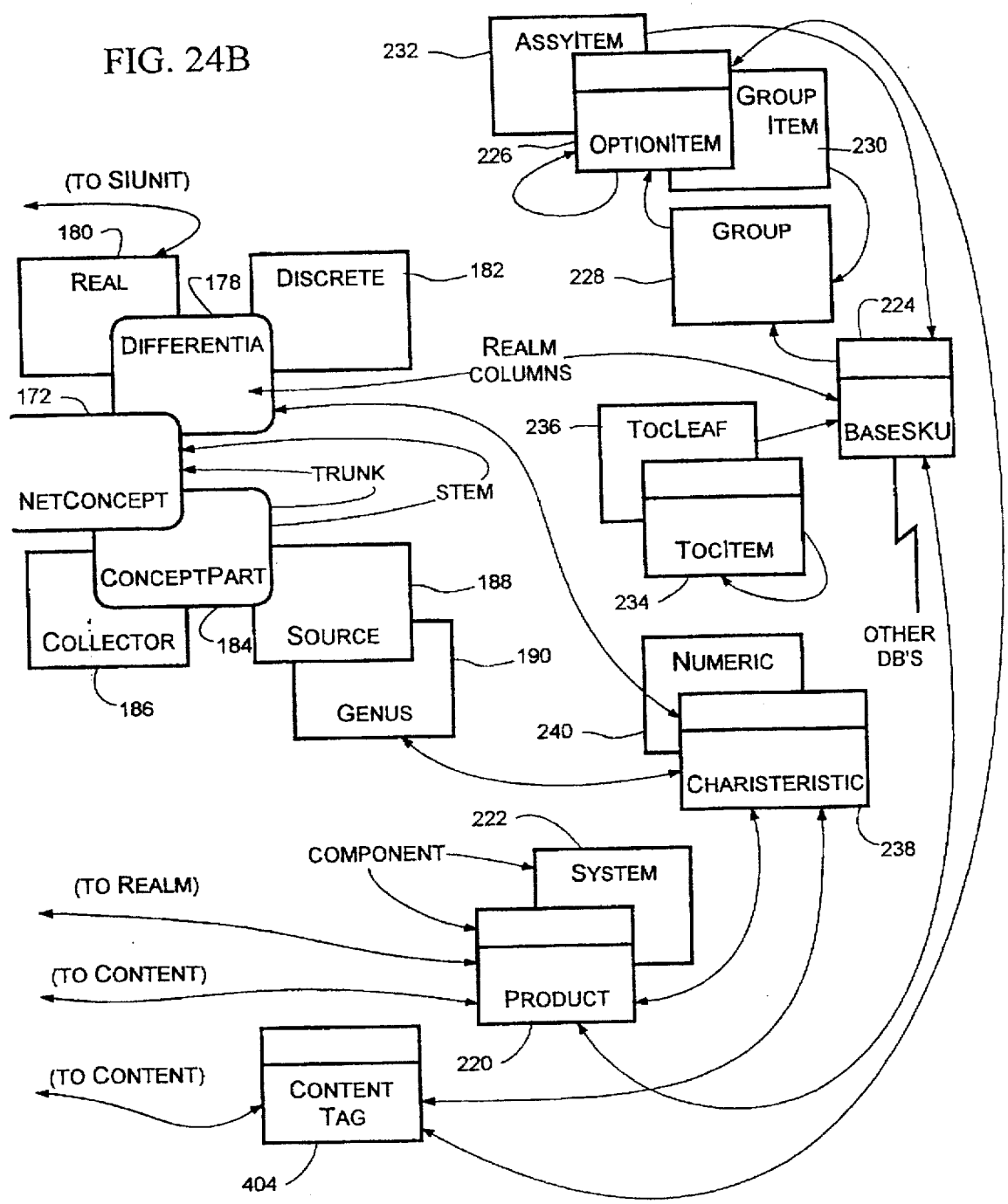

FIG. 24 adds the glossary portion of the KnowledgeBase to the diagram presented by FIG. 23. In FIG. 24, the additional power of the structuring of the Integrated Publishing System become evident. For example, assume that new Content 406 is provided for a manufacturer's Product 220. The Content 406 is expressed according to a Custom Template 400 that is appropriate to the Product's Realm. How might this content affect the Product's indexing? This could be determined by scanning the content for appropriate Phrases 200, as identified by their relation to the use of synonymous Definers 202 employed within the Realm's concept frames. In fact, the analysis of the Content 406 is more powerful and requires less work due to the fact that it can make use of the subservient relationships between Definers 202, as established by their usage in the concept frames. Many similar scenarios can be envisioned to illustrate the advantages of this structuring. FIGS. 25A–C which are described below, show one possible implementation of these features.

Figure 25:
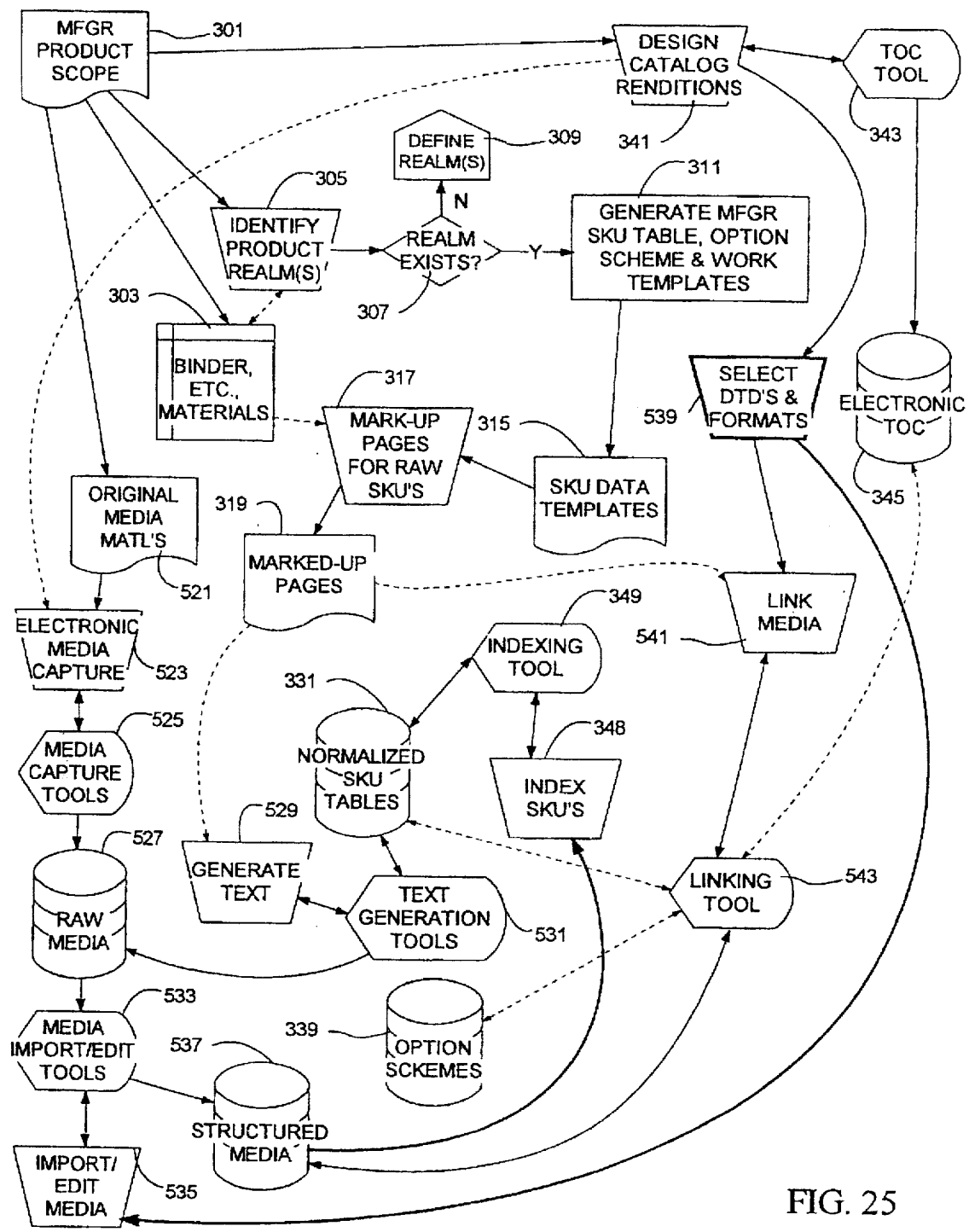
FIG. 25 is a flow diagram illustrating the details of the media capture process for creating an electronic catalog in accordance with the present invention.
Figure 25A:
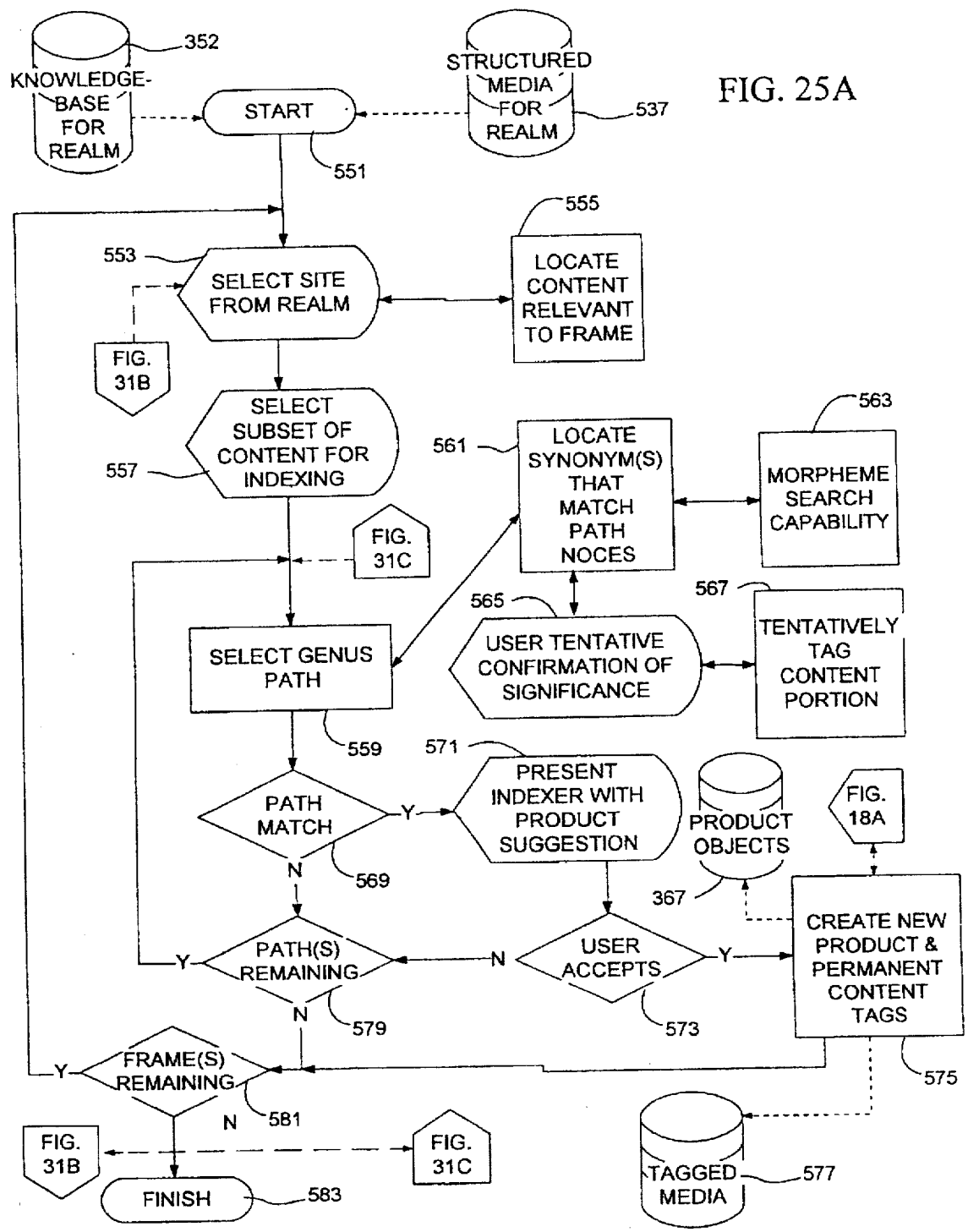
FIG. 25A is a flow diagram illustrating the details of the process for indexing products from structured media.
Figure 25B:
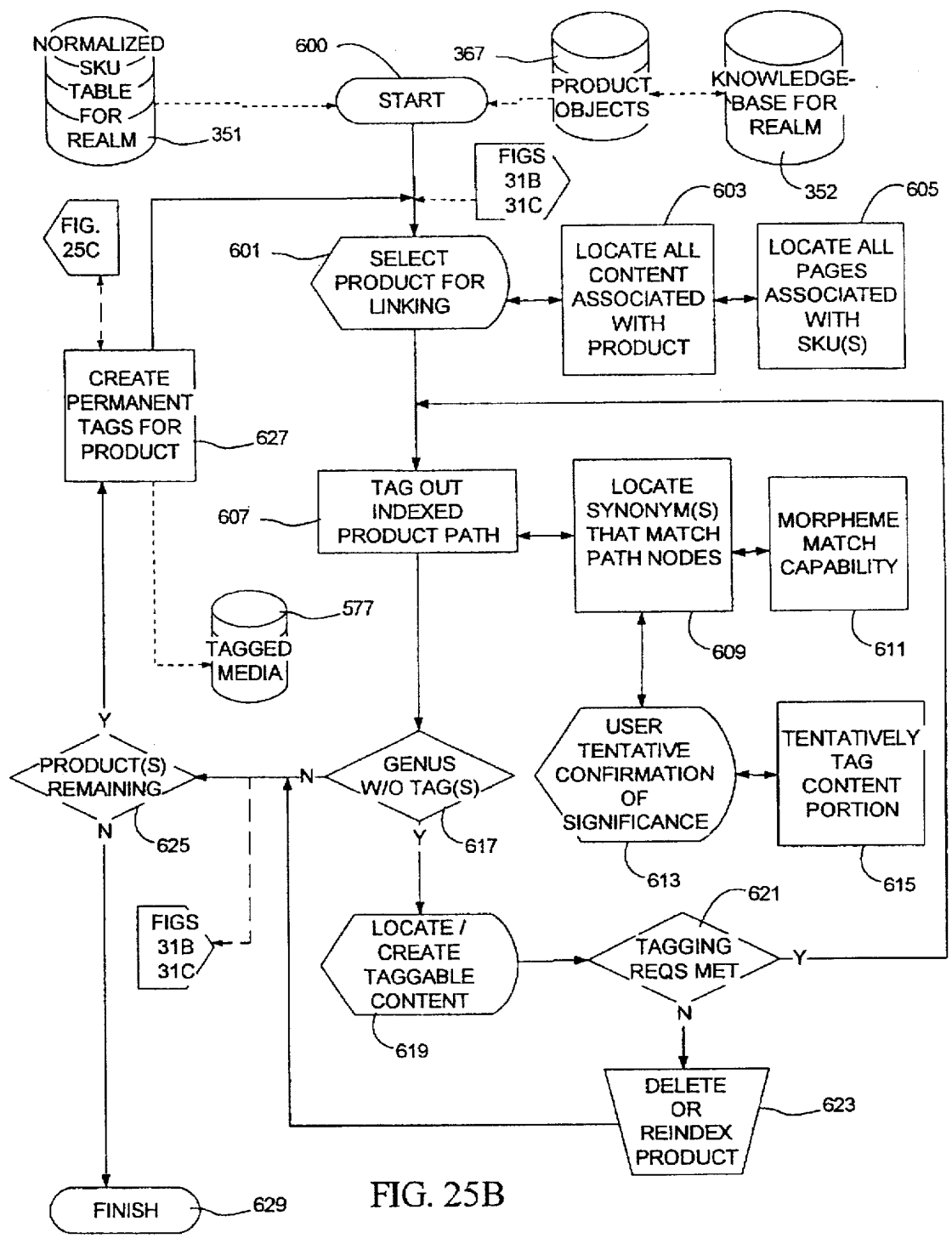
FIG. 25B is a flow diagram illustrating the details of the process for associating media with product objects.
Figure 25C:
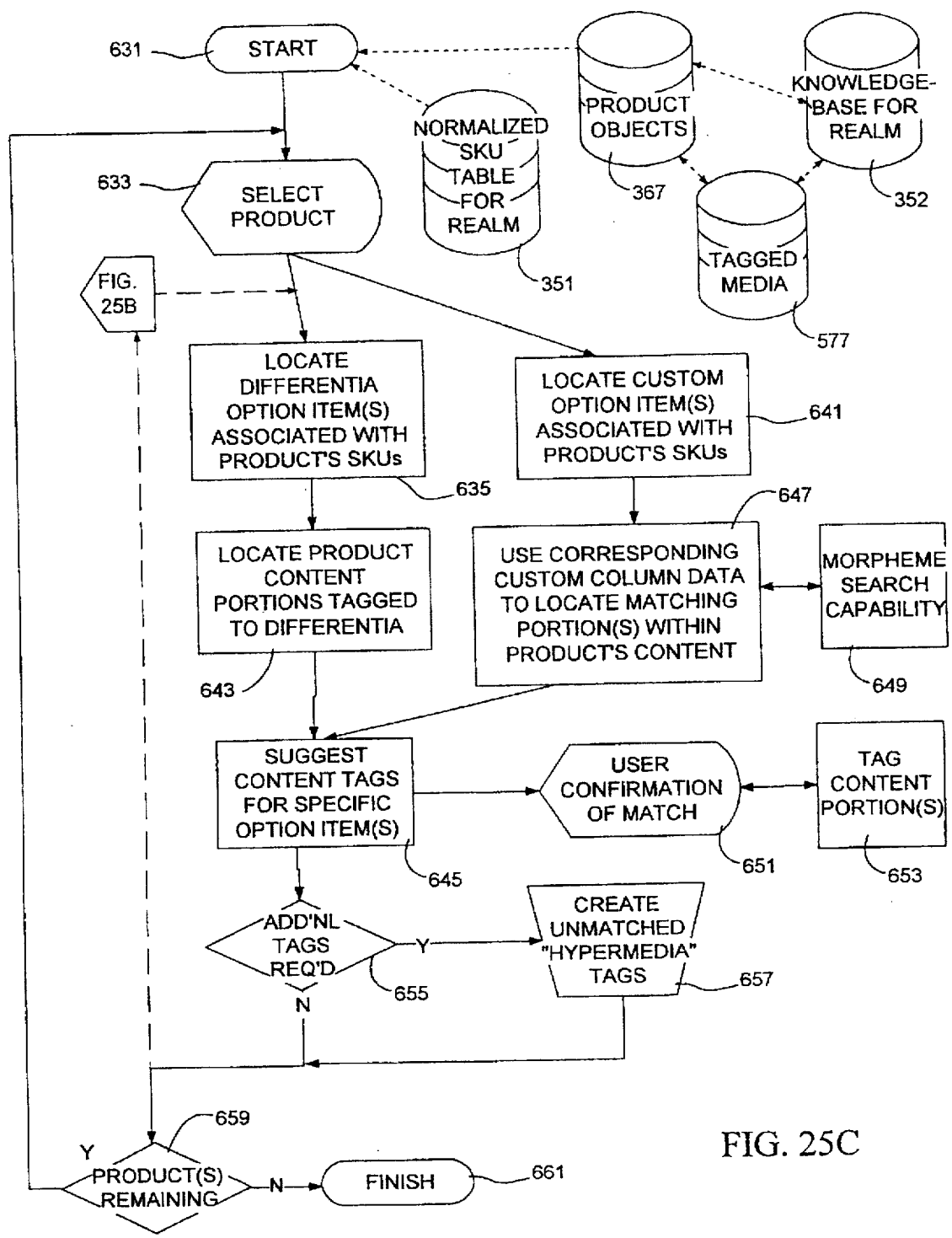
FIG. 25C is a flow diagram illustrating the details of the process for associating media with Option Items.

FIG. 25 shows detail on how the formatting of media presentations (250) is integrated with elements of the rudimentary version (FIG. 18) of the process for creating product objects and option schemes (249). This integrated process provides the means for linking products to presentations (251). Using these presentation linkages, the process of FIG. 25 provides enhancements over the means for indexing that was described in FIG. 18.

FIG. 25 shows that, as in the case of creating products and option schemes (FIG. 18), the formatting of media presentations must start with a knowledge of the scope of products to be captured for the particular manufacturer (301) and with the printed binder, etc. (303), for those products. The printed binder is a good starting point for the designing of catalog renditions (341), because it describes one of the renditions that should be generated (as closely as possible) by the new publishing system (see 255).

The electronic capture of media (523) involves gathering original materials (521) from the manufacturer and using media capture tools (525) to import them to a raw media database (527). At a minimum, the media to be gathered will include the materials that were used to create the printed binder; however, the process of designing catalog renditions (341) might reveal that additional materials are needed for the system to generate the desired print and/or electronic presentations. The media capture tools (525) are a collection of commercially-available hardware and software used for converting printed, photographic, electronic, and other forms of data provided by the manufacturer into the particular electronic formats supported by the raw media database (527), which is also a commercially-available document/image management system. The media furnished directly by the manufacturer (521) is augmented by text that is generated (529) from the normalized SKU and option tables using a text generation tool (531). The text generation tool provides a means for manipulating character-based data in these tables to produce product descriptions and summaries. The preferred embodiment of this tool is a word processor that supports extensions in a text manipulation language like AWK or PEARL. These generated product descriptions are stored in the raw media database (527).

The next task is to use the media import/edit tools (533) to import/edit (535) the raw media (527) in order to convert it into structured media (537). The preferred embodiment of structured media is as content that is expressed according to templates and formats governed by SGML and its extensions, and stored in an OODBMS, as described in FIG. 20. These templates 400 and formats 402 are versions of basic organizations 408 and formats 410 that were selected, combined, and/or edited (539) in conjunction with the design of catalog renditions (341). The process of selecting DTDs and formats (539) is facilitated by the pre-existence of generic presentation types (247, as described in "D. Building the Data Foundation"). The general process of selecting and using DTDs and associated formatting schemes (e.g., DSSSL or FOSI) for publishing printed matter is well-known in the industry, as is the use DTDs in electronic publishing. For this reason, the importing/editing of media (535) into the selected organizations and formats can be accomplished with tools (533) that are already commercially available for this purpose. The difference with the publishing process of the present invention is that the DTD selection process (539) does more than associate a manufacturer with a particular presentation type; it also specifies the realm, and the content organization relative to the realm's concept frames, for that manufacturer.

Once portions of the raw media (527) have been imported into structured form (537), the task of linking media can proceed (541). This task is undertaken in several stages. As a starting point, the selected DTDs and formats (the CustomTemplates 400 and CustomFormats 402 of FIG. 21) have already been associated with a particular realm(s) and concept frame(s) as a part of the selection process (539).

At this point, the indexer has the option of applying an alternate (or supplementary) functionality of the indexing tool (349), namely, indexing from media (See FIG. 25A). In indexing from media, the content is scanned for synonyms (at a morpheme level) that are related to concepts within the bounds of realm(s) and concept frame(s) associated with the DTDs used for organizing the content. Based on the relationships between concepts that are expressed in the concept frames, the scanning algorithm can suggest which potential products may be represented by the content. This functionality is an enhancement to that already described (in conjunction with item 348 on FIG. 18) for the creation of specific products.

FIG. 25A shows the process of indexing products from structured media 551 utilizing the structured media 537 for a product realm and the KnowledgeBase 352 for the realm. The process begins with the user selecting a concept frame from the realm (step 553) at which point the process locates the content in the structured media relevant to the selected concept frame (step 555). Then, the user selects a subset of the content for indexing (step 557) and the process selects a genus path within the selected concept frame (step 559). At this time, the process locates any synonyms that match path nodes of the selected genus path (step 561) utilizing a morpheme search capability (step 563). Next, the user provides tentative confirmation of the significance of the selected subset of content for indexing (step 565) by tentatively tagging content portions (step 567). In step 569, it is determined whether there is a genus path match, and if there is, the process presents the user with a product suggestion (step 571). Then, if the user accepts the product suggested by the process (step 573), the process creates a new product and permanent content tags (step 575) by updating the product objects listing 367 and creating a collection of tagged media 577. At this point the user may switch to the process shown in FIG. 18A to index products from normalized SKUs by jumping to step 355. Referring to FIG. 18A, the user indexing products from the normalized SKUs may likewise jump to step 575 in FIG. 25A. If the process determines in step 579 that there is no genus path match, or if the user does not accept the product suggestion in step 573, the process then determines whether there are any genus paths remaining to select (step 579). If there are paths to select, the process returns to step 559 where a new genus path is selected and steps 561 through 575 are repeated. If there are no paths remaining, or after a new product has been created and permanent content tags are made in step 575, it is determined in step 581 whether there are any additional concept frames remaining with products to be indexed. If there are concept frames remaining, the process returns to step 553 to allow the user to select a new concept frame from the realm and the forgoing steps are repeated. If, on the other hand, no concept frames remain, the process is finished in step 583.

The next stage in the process illustrated in FIG. 25 is to associate each structured media object (which represents a specific implementation of a DTD) with product objects that were created in the context of a particular realm (see FIG. 18, item 348). This level of media linking (541) is accomplished with the linking tool (543), by reviewing the correspondence between marked-up pages and structured content presentations in light of the known associations between those pages (via records in the normalized SKU tables (331)) and the SKU(s) that were related to the product objects when those product objects were created. The associations between structured media objects and product objects, as implemented in the preferred embodiment, is shown in FIG. 22.

FIG. 25B shows a process 600 for associating media with product objects 367, which utilizes the normalized SKU table 351 for a product realm, a listing of product objects 367, and the KnowledgeBase 352 for the product realm. The process begins by selecting a product for linking to the media (step 601). At this time, all the content associated with the product is located by the system (step 603) and all pages associated with SKUs of the product are also located (steps 605). Next, the indexed product path is tagged out (step 607) and synonyms are located that match the path nodes (step 609) using a morpheme search capability (step 611). The user may then tentatively confirm the significance of the path nodes and tentatively tag the content portion (step 613 and 615). Next, the process determines whether there are any Genus on the product path without tags (step 617). If there are such Genus, the user locates or creates taggable content (step 619) and then it is determined whether the tagging requirements have been met (step 621). If such requirements are met, the process returns to step 607 and steps 609 through 617 are repeated. If tagging requirements have not been met the process deletes or re-indexes the product (step 623). Then it is determined in step 625 whether there are any products remaining. If there are such products, the process creates content tags for the product (step 627) and modifies the collection of tagged media 577 and returns to step 601 to select another product linking. Prior to selecting another product, the user may enter the procedure detailed in FIG. 25C to associate media with option items related to SKUs for the current product (see FIG. 22). Once there are no products remaining (step 625) the process is finished (step 629).

Another feature of the linking tool (543) is its capability for creating associations between specific content portions and specific SKUs, option schemes, or TOC entries. One example would be creating an association between an SKU and a particular raster image or a particular row in a table presentation of multiple products. This type of media linking is optional, and is performed by viewing and selecting the records in the normalized SKU table, option table, or TOC while simultaneously viewing and selecting a potion of a particular structured media object.

FIG. 25C shows a process 631 for associating media with Option Items. This processes utilizes information stored in the normalized SKU table for a product realm (351), the listing of product objects 367, the KnowledgeBase 352 for the product realm, and the collection of tagged media 577. The process begins with the user selecting a product (step 633). The process then locates all differentia option item(s) associated with the selected product's SKUs (step 635), locates product content portions already tagged to those differentia (step 639), locates custom option item(s) associated with the product's SKUs (step 641), and uses the corresponding custom column data to locate matching portion(s) within the product's content (step 647) by utilizing the morpheme search capability (step 649). At this point, the system suggests content tags to be created for specific option item(s) (step 645) and the user accepts, rejects, or modifies these suggestions (step 651), whereupon the system permanently tags the relevant content portions (step 653). If the user indicates (step 655) that no additional tags are required, the process returns to step 635 and repeats steps 641 through 655 until no additional tags are required. When additional tags are required the user is first given the opportunity to create "hypermedia" tags (step 657). Next, the process queries the user whether there are any products remaining (step 659) and, if there are, the process returns to step 633 where the user selects new product and steps 635 thorough 657 are repeated. On the other hand, if there are no products remaining, the process is finished (step 661).

Finally, with reference again to FIG. 25, the linking tool (543) has the general functionality for creating links between specific portions of specific content presentations. This level of linking is already common in the electronic publishing field, and can be implemented using commercially available "hypermedia" authoring software. The use of this linking functionality would be optional, and would supplement the links automatically provided via the previously established CustomFormat 402 for the content, as documented in FIG. 20.

Figure 26:
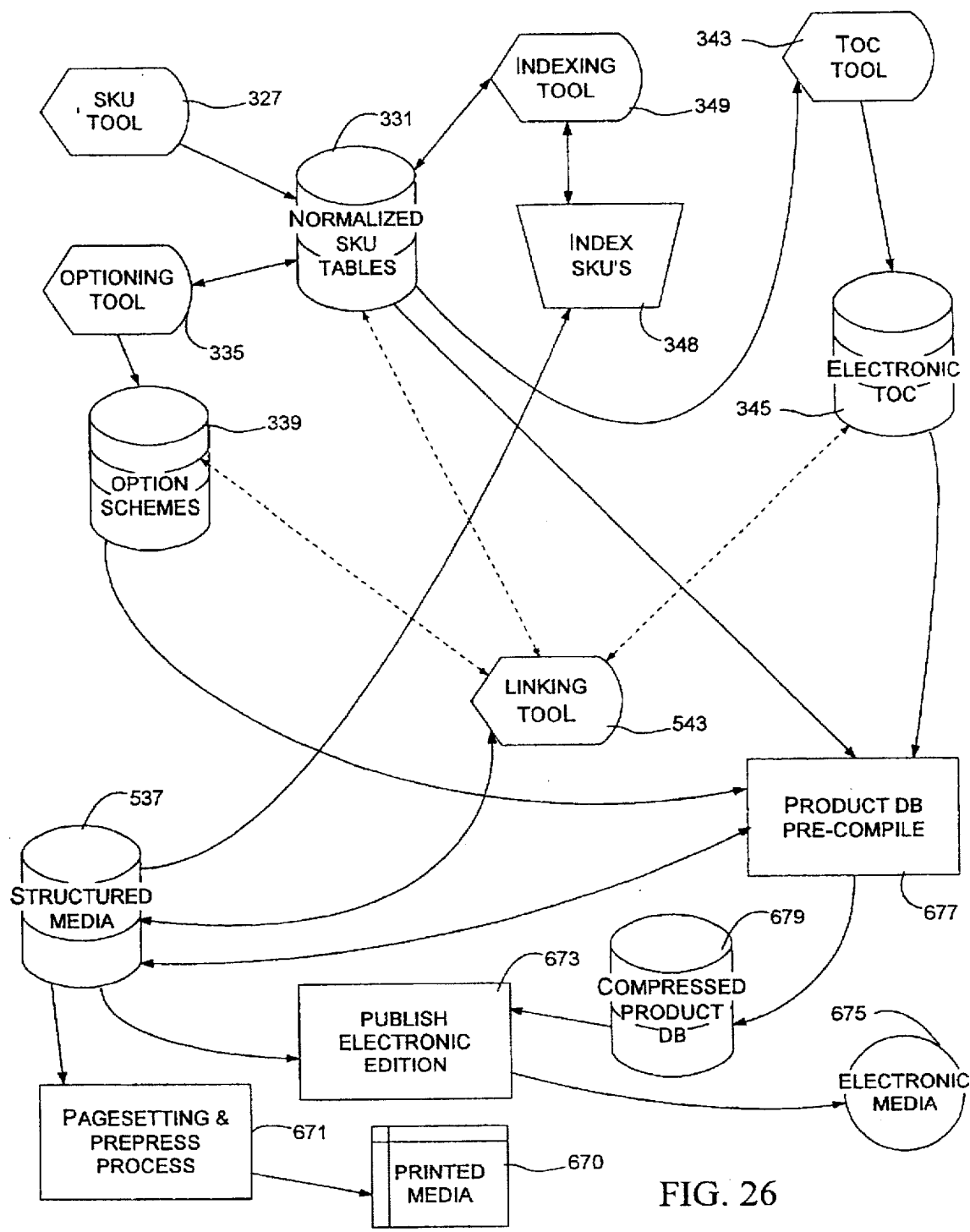
FIG. 26 is a flow diagram illustrating the details of the end process for electronic media capture for creating an electronic catalog in accordance with the present invention.

FIG. 26 shows parts of both the product/option capture and the media capture processes. In addition, FIG. 26 shows that the printed binders, etc., (670) are produced by a pagesetting and prepress process (671) that operates on the structured media (537) that was the result of 250. In the preferred embodiment, 671 makes use of commercially-available software suited to this purpose which is preferably capable of processing DSSSL formatted SGML content. FIG. 26 also shows the process (673) for producing electronic presentations (675), which also operates on the structured media (537) as well as data derived from the TOC, the normalized SKU table(s), the option schemes, and, additionally, the data foundation (as explained above with respect to 244 (FIG. 15)). This process, for example, may use commercially-available translation software to format data onto CD-ROM's, convert SGML data to Hypertext Mark-up Language (HTML) data, which is a subset of SGML used for providing information on the Internet, for on-line access, etc. This process would also synchronize the published catalog access software with particular editions of other vended software applications, such as electronically-delivered codes and standards, CAD, CAE, and other productivity tools.

As FIG. 26 suggests, a final step to the capture process—the product database pre-compile (677)—would be applied to the TOC (345), normalized SKU tables (331), and option schemes (339) to compress them by removing data that was of use only in the capture process itself (e.g., raw data, realm columns relating to genus, binder page reference number, etc.). Implicit in the representation of these sources in FIG. 26 is the fact that the product database (253) is in this compressed form (679) prior to the generation of multiple product renditions (257). The compressed form of this data may be in RDBMS tables, in SGML tables, in an OODBMS, or in some combination of these forms. At this point, the manufacturer's product information can be reviewed (with media presentations) both from the access means provided by the manufacturer's own TOC and the multi-manufacturer organization provided by the KnowledgeBase.

Figure 27A:
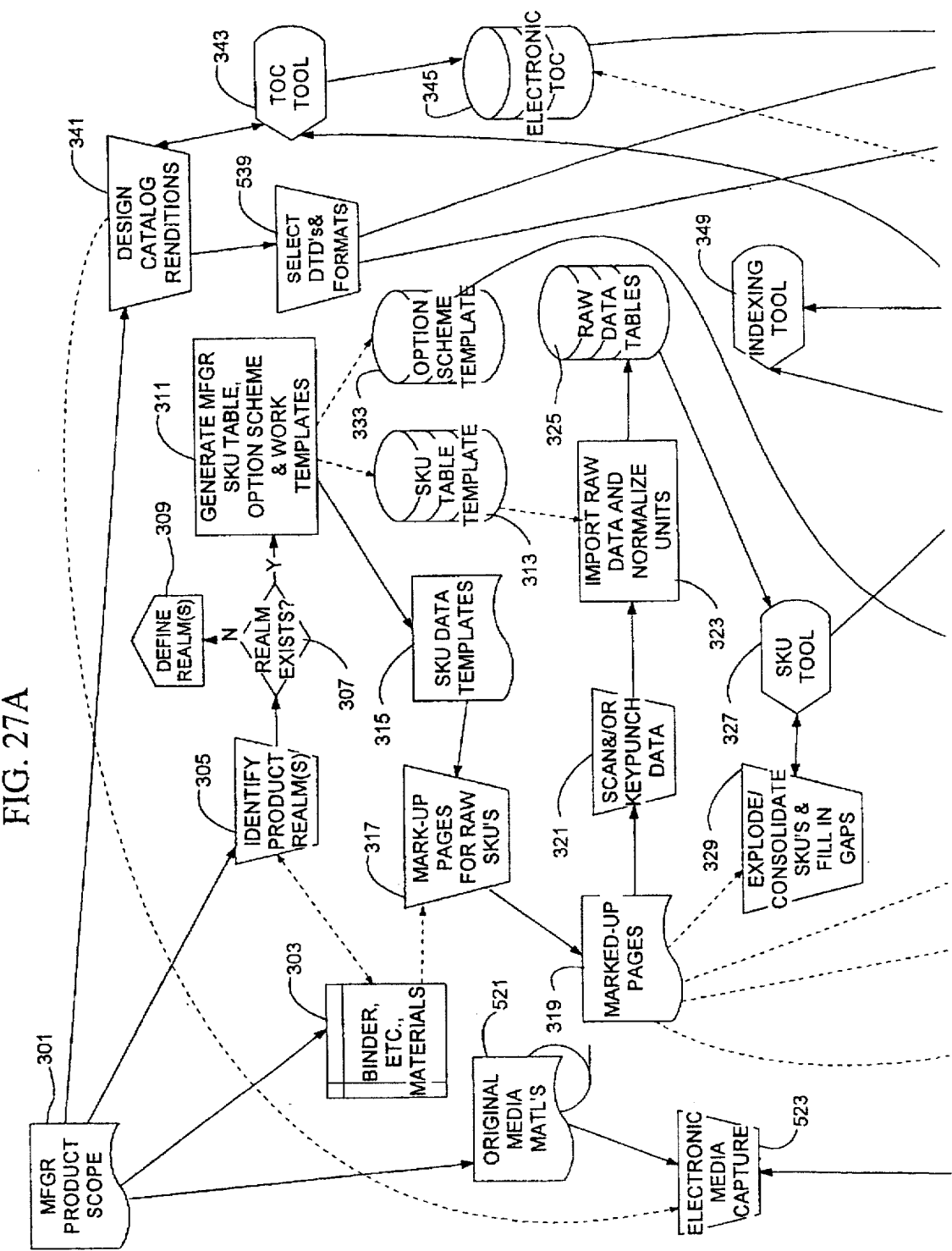
FIG. 27A is a flow diagram illustrating the details of the process for constructing concept frames for a realm.
Figure 27B:
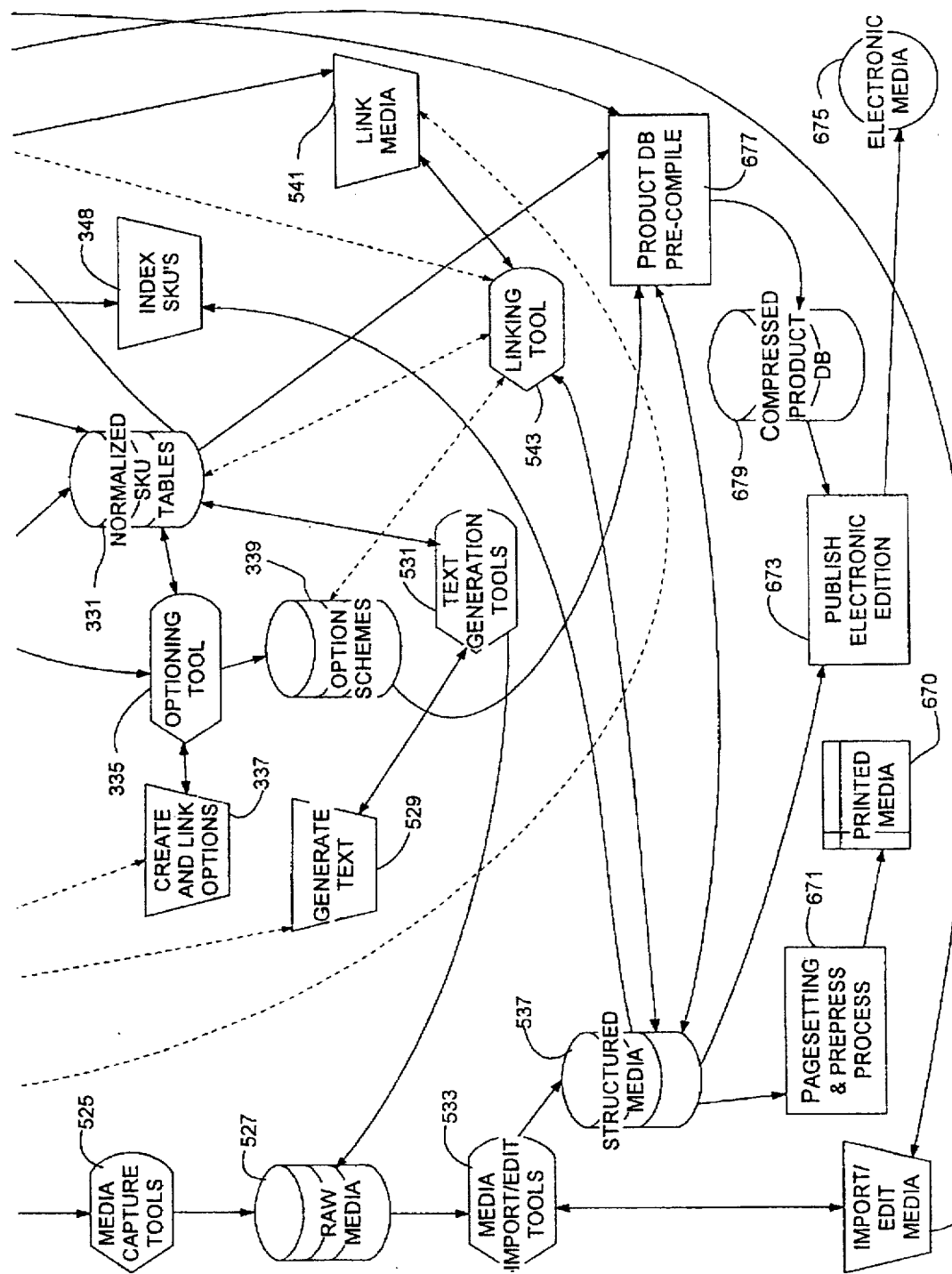
FIG. 27 is a flow diagram illustrating the complete detailed process for electronic capture of printed catalog information used in creating an electronic catalog in accordance with the present invention.
Figure 27C:
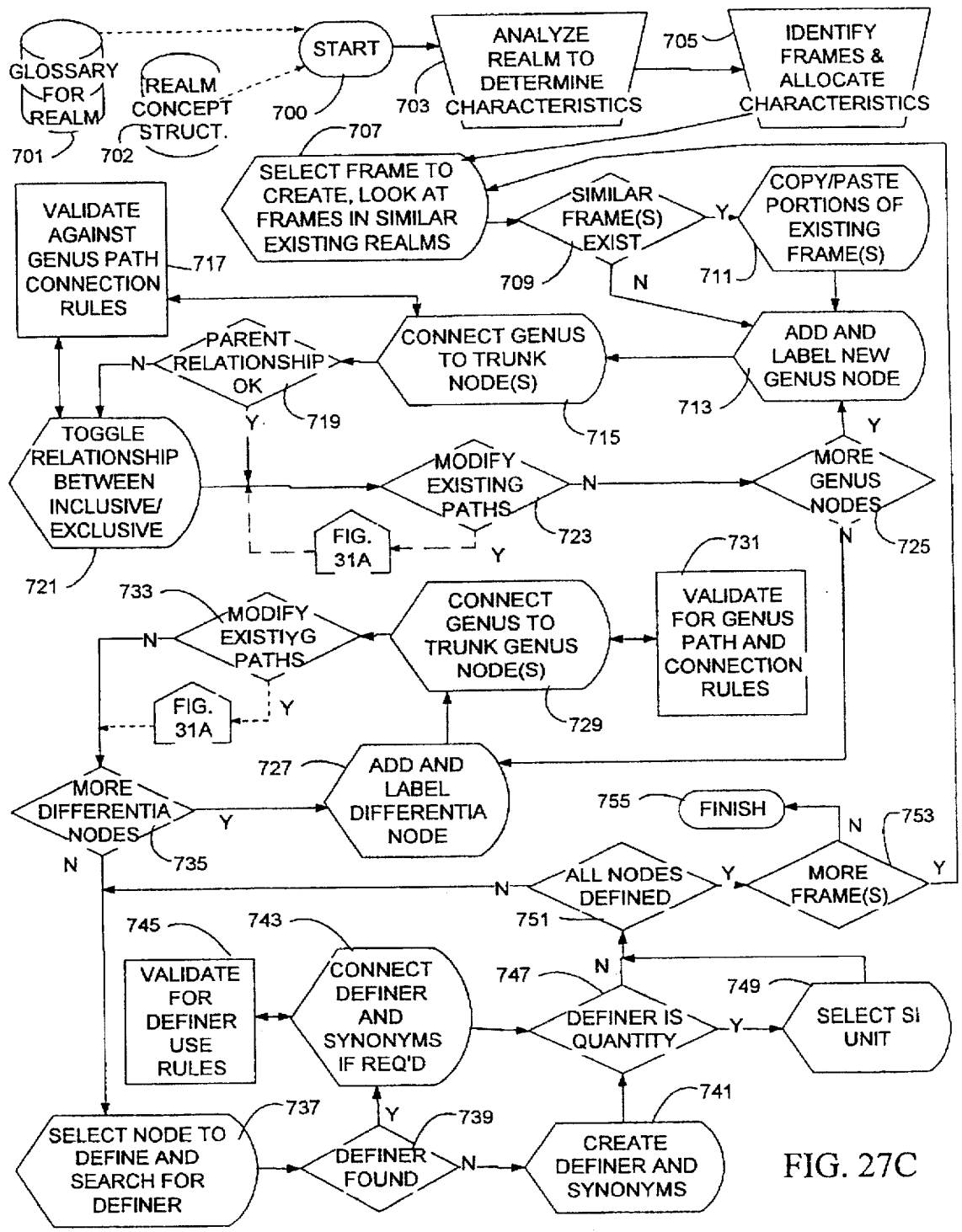

FIG. 27 shows all the detailed parts of the first-time product/option and media capture process.

D. Building the Data Foundation

From the above, the capture of product information in electronic form (242) cannot be accomplished without the pre-definition of generic product classes (245) generic optioning schemes (246), and generic presentation types (247) for the products' realm. How these three parts of the data foundation are defined will now be explained.

Defining generic product classes (245) requires the development of a glossary and concept structures that are linked to items in this glossary. Collectively, the glossary and concept structures are referred to as the KnowledgeBase. The preferred embodiment of the KnowledgeBase is described as FIGS. 10–14. FIGS. 23 and 24 show how the KnowledgeBase is related to the product database (253) in the preferred embodiment.

The glossary portion of the KnowledgeBase (see FIG. 13) consists of a multitude of phrases some of which have a unique definition (Definers). All Definer phrases and their definitions are in a single language (English in the preferred embodiment). Each Definer also may have any number of alternate phrases (which may or may not have definitions of their own) related to it as synonyms for the Definer. Phrases that are only used as synonyms, and which are therefore not Definers, can be in any language. Any Definer may have possible use in one or more product Realm. Definers and their synonyms are entered into the system either through a batch loading from industry and/or governmental sources, or by individual creation through the glossary editing portion of the software for modifying generic product classes (see section VII for a description). Every Definer that represents a quantifiable product characteristic (such as overall height, minimum voltage variation, etc.) (Quantity (204)) is related to exactly one SI primitive (such as distance, electrical potential, etc.) (SI Item (206)). SI primitives and their related units of measure (for example; meters, centimeters, inches, feet, etc.; or, volts, millivolts, etc.) (SI Unit (208)) are created in the glossary directly from the information in the SI Standard, ASTM E380-91a.

The first step in creating the KnowledgeBase is to create the SI data. This step needs to be undertaken only once because this SI data will serve the needs of all product realms. The second step is to create sufficient Definers and synonyms to describe the known characteristics of products in the particular general field of knowledge that encompasses the realms to be addressed and/or to verify their pre-existence (from their use in previously addressed realms) (see, for example, FIGS. 5 and 27A). The third step is to relate any Definers that represent a quantifiable product to appropriate SI primitives (for example, "minimum voltage variation" would be related to "electrical potential"). Note that the need to create additional Definers and synonyms may come to light as other characteristics are uncovered in the process of building concept structures (steps four though six, described below).

The fourth step in creating the KnowledgeBase is to construct the concept structure that defines what the product realms to be addressed are. The preferred embodiment of this particular concept structure is of the form described in FIG. 11 (see also, for example, FIGS. 2 and 32). The preferred method of developing this structure is in an outliner format that is a part of the software for modifying generic product classes (as described under section VII). Preferably, this facility allows and requires each element (node) in the structure to be associated to one and only one Definer.

The fifth step in creating the KnowledgeBase is to construct one or more concept frames for each product realm defined during the fourth step. The preferred embodiment of this particular type of concept structure is of the form described in FIG. 10. The preferred method of developing this structure is in a graphical format, using the product realm structure editing portion of the software for modifying generic product classes (as described under section VII). This facility allows and requires that each realm have one or more concept frames, and if more than one, that each concept frame is of a different type. It further allows and requires that each concept frame be associated to one and only one realm. Using this facility (see FIG. 27A described below), a concept frame for a product realm is created in a five-part sub-process:

1) analyze the product data available from various manufacturers and other industry sources to determine the characteristics of products within the particular realm;
2) identify the type of concept frame(s) to be created (preferably selected from a finite set of types, such as functionality concept frame, appearance concept frame, etc.);
3) create and label symbols representing nodes of particular product characteristic types that apply to the concept frame (preferably the node types described in FIG. 10);
4) indicate relationships (of either an inclusive or exclusive type) between the nodes by casting lines between the symbols created in the previous step subject to specific rules governing allowable relationships; and
5) locate or create an appropriate Definer for each node, using the search capabilities of the glossary editing portion of the KnowledgeBase software and for each node create an association to exactly one Definer subject to specific rules governing allowable associations.

FIG. 27A illustrates the process 700 for constructing concept flames for a product realm. This process utilizes the developed glossary 701 for the product realm and the realm concept structure 702, such as that shown in FIG. 2. The process begins by analyzing the product realm to determine what distinguishing characteristics the products that fall within the realm may have (step 703). The next step, 705, is to identify concept frames that may be useful for grouping these characteristics and to allocate these characteristics to one of the identified concept frames. The user may then select a concept frame to create looking at concept frames in similar existing realms (step 707). If similar concept frames exist (step 709), the user may copy and paste portions of the existing concept frame (step 711) to create the new concept frame. If no similar concept frames exist, the user will have to add and label a new Genus node (step 713). Similarly, if the portion of a similar concept frame that was copied and pasted does not complete the creation of the concept frame, the user will have to add and label a new Genus node as indicated in step 713. Next, the user connects the newly created Genus node to a trunk node (step 715) and the process will validate the connection against certain genus path connection rules (step 717) to ensure the selected connection is proper. Next, the user will decide whether the parent relationship established by this connection is proper (step 719). If the relationship is not proper the user may toggle the relationship between the connected nodes as being either an inclusive relationship or an exclusive relationship (step 721). The user then decides whether any other paths within the concept frame require modification (step 723). If an existing path requires modification the process proceeds to step 833 in FIG. 31A to modify an existing concept frame in the manner described below. Once no additioinal path modifications are necessary, the process will return to step 713 to add a new Genus node if more Genus nodes are to be added (step 725). If there are no more Genus nodes to add, the user could then add and label a Differentia node (step 727). Then the user will connect a Genus to a trunk Genus node(s) (step 729) while the process validates the connection utilizing the genus path connection rules (step 731). Once again, if the user decides to make other modifications (step 733), the process proceeds to step 833 of FIG. 31A to modify an existing concept frame in the manner described below. Once no additional path modifications are necessary, if there are more Differentia nodes to add (step 735), the process will return to step 727 to add and label additional Differentia nodes. If there are no more Differentia nodes to add, the user selects a node to define and searches for a Definer (step 737). If a Definer is found (step 739), the user may connect the Definer to the selected node and add any synonyms, if required (step 743), while the process validates the selections utilizing certain definer use rules (step 745). If no Definers are found (step 739), the user may create a Definer and any synonyms associated with that Definer (step 741). Following steps 741 and 743, the process will determine whether the Definer is a Quantity (step 747) and, if it is, the process will select an SI unit (step 749). The process then queries the user whether all nodes have been defined (step 751) and returns to step 737 if all nodes have not been defined. On the other hand, if all nodes have been defined the process then inquires whether there are more concept frames to create (step 753). If there are more concept flames to create, the process returns to step 707 and the process is repeated for each concept frame to be created. Once there are no more concept frames to create, the process is finished (step 755).

The sixth step in creating the KnowledgeBase is to construct one additional concept structure for each industry-standard classification scheme that is in common use by specifiers of products within the realm(s) being addressed. The preferred embodiment of this particular type of concept structure is of the form described in FIG. 11. The preferred method of developing this structure is in an outliner format that is a part of the software for modifying industry-standard structures (as described under section VII). This facility allows each element in the structure to be associated to one and only one Definer. In this usage context, this facility also requires each Industry standard leaf element of the hierarchy to be related to one or more Concepts, either within the structure defined in the fourth step, and/or within at most one node per concept frame per realm. FIG. 12 shows how this is implemented in the preferred embodiment.

Defining the generic optioning scheme(s) (246) for a product realm(s) involves creating option item(s) for characteristics of products within that realm(s) which may optionally be, or which may need to be, chosen to further specify the makeup of products defined by normalized (base) SKUs. The relationship between a base SKU(s) and option items (via groups) in the preferred embodiment is illustrated in FIG. 22. For example, if non-standard coloring of a product is potentially a consideration, the product database (253) might include, for a particular manufacturer, several groupings of color choices, each of which pertains to particular SKUs. To support the construction of such manufacturer-specific optioning schemes, the data foundation (248) can store optioning schemes that are defined generically (246) with respect to a product realm(s) for use in the creation of option scheme templates for a particular manufacturer's products that are found to be within that realm(s) (249). For example, for a given realm a single color group might be created which references all optional generic color choices (e.g., black, white, green, red, and yellow) that might be expected to be applied to products generally, within that realm. Continuing with this example, a single material group might also be created which references all optional generic material choices (e.g., brass, plastic, and stainless steed that might be expected to be applied to products generally, within that same realm. These generic optioning schemes would preferably be stored in the data foundation (249). Modified versions of these generic schemes might be applied to a specific manufacturer's SKUs (via the process described as 249) in order to express the fact that only a subset of the generic material choices is available (e.g., brass and plastic) and furthermore that, for a certain choice of material (e.g., plastic), only certain colors (e.g., black, green, and "fire engine red") are available.

The process of defining generic optioning schemes for a realm(s) (246) is aided by the pre-existence in the data foundation (248) of generic product classes that have already been defined (245) for that realm(s) and other realms. As a starting point, any differentia concepts within a product class defined by that realm(s) which would be used to specify a variant of some manufacturer's SKU should have a representative record generated for it as an option item in the generic optioning scheme. In fact, all differentia for the realm could automatically be included as initial items which would then be gathered into appropriate generic groups as indicated by a review of the product data available from various manufacturers and other industry sources (see the fifth step, above). Also, the table editing tool will allow the creation of additional options and groups in the generic optioning scheme, at the discretion of the tool user. For example, the tool will provide a convenient means to create option items by "copy and pasting" from differentia and option items already established for other realms.

Defining generic presentation types (247) involves first creating basic templates (408) for the organization and formatting of product information content, based on the general types of information (text, tables, charts, pictures, etc.) conveyed for various purposes (e.g., brochures, catalogs, price lists, etc.). The relationship of these basic templates (408) within the preferred embodiments for the product database and the KnowledgeBase is illustrated in FIG. 21. The preferred embodiment for defining organization of content is through use of the SGML. The preferred embodiment for defining the formatting of content is the DSSSL subset of SGML. The preferred embodiment of SGML is using an OODBMS. These basic templates (408) should only be created after a thorough content analysis process. Then, after the basic templates (408) have been created, customized versions of these templates and/or combinations of these templates are created for the specific product realms and product manufacturers to be addressed. The process of using SGML to define content organizations is well-known in the publishing industry.

Having described the process for first-time creation of an electronic catalog using the data structure of the present invention, an example of how the data structure may be used to facilitate changes in the product database and KnowledgeBase will now be described.

V. Manufacturer Update Example

A. Introduction

Figure 28:
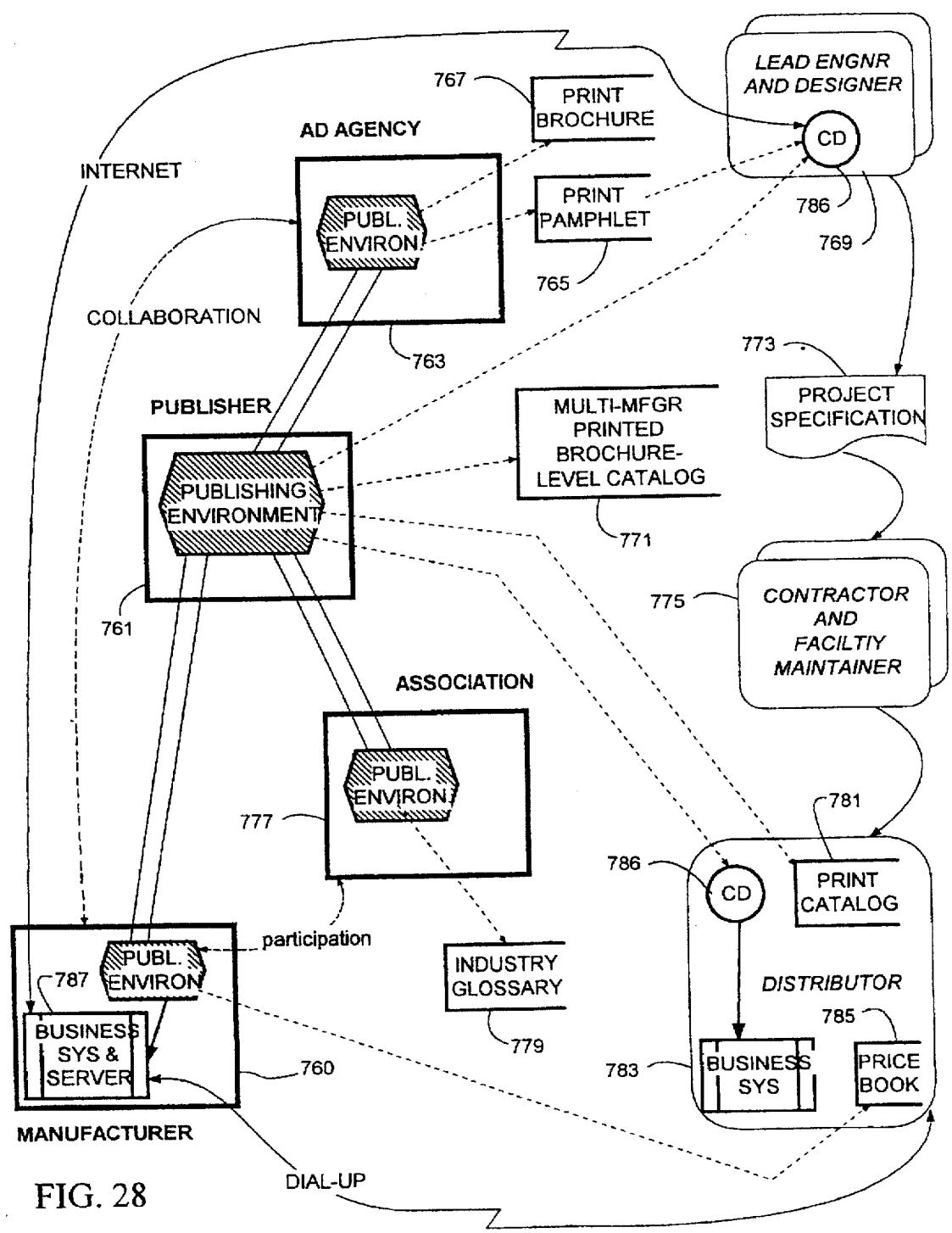
FIG. 28 is a block diagram illustrating the publishing process for publishing multiple renditions of printed and electronic product catalogs in accordance with the present invention.

The following scenarios are a continuation of the first example (see Section II), only from the viewpoint of Manufacturer X's (760) need to add an all-plastic option to their multiple-sensor line. FIG. 28 shows one possible distribution of the product information publishing tasks and their relation to the end-user access modes described in the first example. FIG. 28 shows that even though the different information deliveries of the first example are created from a single product database, they are produced by four different parties. In this particular case, the channel publisher 761 plays a central role, directly producing multi-manufacturer brochure level information 771 in various print 781 and electronic 786 forms as well as coordinating the roles of the other publishing participants. For the implementation example depicted in FIG. 28, Manufacturer X ties their own mainframe applications 787 (for telecommunications, inventory control, etc.) into the publishing system in order to provide electronic binder access via direct line (with electronic ordering capabilities for their distributors) and via the Internet. Although Manufacturer X generates their own printed price book 785, the task of managing media and producing printed brochures 767 and pamphlets 765 has been outsourced to an ad agency 763 that has been certified for using the publishing system.

B. Manufacturer X Scenario

Manufacturer X has the capability to react rapidly to the market's demand for an all-plastic product offering. The SKUs for the new product are added to their mainframe inventory system 787 and production has started. Manufacturer X meets with their certified ad agency 763 to agree on how the new SKU option for plastic float sliders will be presented in the various access modes. These presentations can be reviewed using the media/product data review/editing tool (item 819 in FIG. 31). For example, when the currently tagged text portion reading "sliders are available in brass or stainless steel" is changed to "sliders are available in brass, stainless steel, or PVC", the tool recognizes that PVC is a synonym for plastic, which is a characteristic in the Materials concept frame associated with some currently indexed SKUs. In response to the tool's messages pointing out the potential significance of this change, the tool is used to create a new product and SKU for the all plastic offering. A product database version updated with this information can be used immediately to produce printed bulletin pamphlets 765 to notify product specifiers 769 and distributors 783 of the impending product. The manufacturer's electronic Internet binder 787 can also tie into this information in a "what's new" section.

C. Certified Ad Agency Scenario

In preparation for the next publishing cycle, which is orchestrated by the channel publisher 761, the certified ad agency 763 has been working with Manufacturer X to change some wording and otherwise improve the presentations of various other products. The agency 763 uses the media/product data review/editing tool to rewrite one section, and is alerted by the computer that a particular phrase cannot be changed without affecting the indexing of a product. That product is broken out into a separate paragraph.

The other improvements are made possible by some new content formats released by the channel publisher since the last cycle. The certified ad agency 763 can immediately use the reformatted content to produce new printed brochures 767 and pamphlets 765, and the multi-manufacturer CD 786 and print catalogs 771 produced by the channel publisher will automatically reflect the improvements at the end of the current cycle. Similarly, while Manufacturer X can issue printed and electronic bulletins immediately, the full integration of the changes into other presentations will also be coordinated within the cycle. In this way, the consistent interaction between the various user access modes can be assured.

D. Channel Publisher Scenario

As indicated in the above two scenarios, the channel publisher 761 plays a pivotal role in coordinating the activities of all publisher participants. Note that this coordinating role encompasses a multitude of manufacturers 760 and certified ad agencies 763 providing information to a multitude of industries that use similar products.

E. End Users Scenario

Here is how end users in the first example might be impacted by the updates described in this example. If the all-plastic sliding sensor had been launched in time, the pamphlet 765 picked-up by the lead engineer 769 may have highlighted the fact that more information about this new product could be gotten via Manufacturer X's Internet home page 787. When the lead engineer 769 found Manufacturer X in the multi-manufacturer electronic brochure CD 786 for the chemical industry, he could have linked through to that page and seen the expanded version of the pamphlet information in the "what's new" section. In this case, Manufacturer X would not have dropped out of contention with respect to the detailed design activity. The designer would have at least looked at Manufacturer X's electronic binder via the Internet.

On the other hand, if the all-plastic sensor became available in the time-span between the writing of the specification and the letting of the contract, a new cycle of distributor CD catalogs 786 may have occurred, including the new product. Then, when the contractor 775 visited his local equipment distributor 783, Manufacturer X's new product would have come up as an additional alternate to Manufacturer Y's series 123ABC. The information displayed for the new product would be consistent with the new product bulletin the distributor would had received weeks earlier, and availability of the new product could be checked within the same computer session.

Finally, assuming that Manufacturer X's new product was not released until after Manufacturer Y's product had been installed, the facility maintainer 775 would have gotten a Manufacturer X alternative to the Manufacturer Z replacement part suggested by the local equipment distributor 783. Note that, although they are issued by different parties, the printed price book 785 is guaranteed to be 100% consistent with the distributor's printed 781 and CD 786 catalogs.

F. Conclusions: Manufacturer Update Example

The scenarios in the above example give some idea of the product information updating functionalities provided for by this invention. The existing processes of publishing product information involves all the same parties mentioned in these scenarios, but their roles are poorly coordinated, overlapping, and grossly inefficient. This is due to the fact that each method of accessing product information is currently supported by its own database. As another result, each end user is faced with the certainty of receiving some conflicting information in using presently published information. This situation causes a general lack of confidence which often leads to unnecessary and costly direct interaction between end users and the manufacturers' customer service departments. The scenarios in this example are feasible because the invention promotes the coordination that makes rapid and consistent updating possible.

Most existing approaches are aimed at the general problem of retrieving documents from a large base of existing literature. While these generalized approaches recognize the need to update a knowledge base (concept structures), they do not take into account dynamic documents whose content changes over time. In existing applications, a knowledge base is used in analyzing the document content, but the system does not remember what specific parts of the document content were significant to the analysis or just what the significance was.

This example assumes that both the contractor and the facility maintainer 775 rely totally on their local equipment distributor 783 for product information, as would be likely in the days of print-only information. With the economics of electronic publishing available via the invention, however, the contractor and facility maintainer could easily afford to have their own copies of the CD catalogs.

VI. Knowledgebase Update Example

A. Introduction

Figure 29:
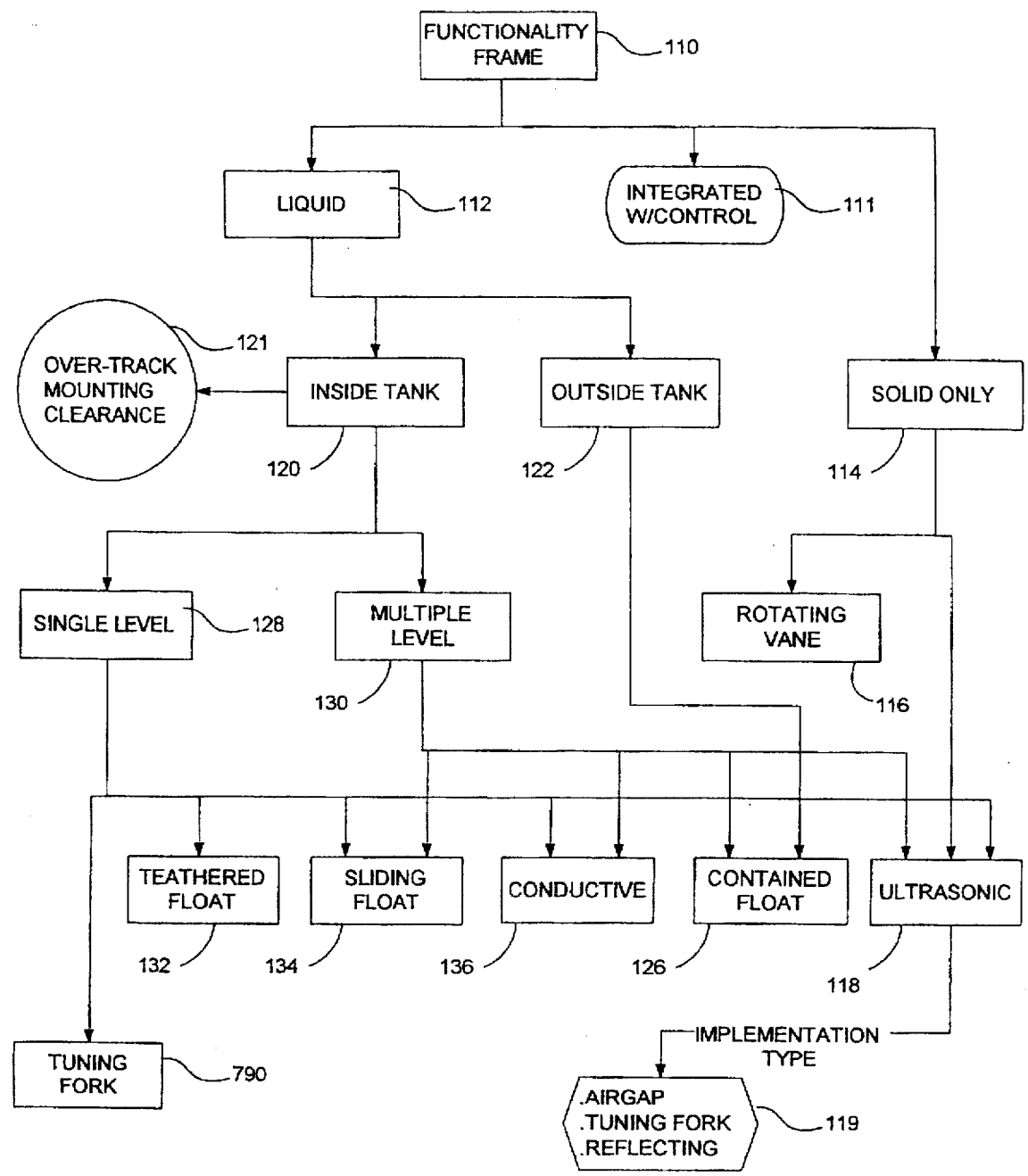
FIG. 29 is a graphic illustration of an exemplary modified lower-level concept structure for a Functionality concept frame constructed in accordance with the present invention.

The scenarios in this example follow the same theme as the previous two examples, in that they relate to level sensors. Returning to FIG. 28, this example explains how one possible implementation of the invention involves the sensor manufacturers' association 777. Specifically, referring to FIG. 3, tuning fork level sensors have always been indexed under ultrasonic because all such devices have always operated above audible frequencies. This is indicated in FIG. 3 by the existence of a discrete item (node 119) for tuning fork under the collector labelled implementation type. Manufacturer X has now developed a series of tuning fork level sensors that is not ultrasonic, and has asked for the addition of a node 790 in the Functionality concept frame, at the same level as ultrasonic (118), for indexing these products only, as shown in FIG. 29. In this example, the KnowledgeBase maintenance part of the publishing process has been turned over to the sensor manufacturers' association 777. As a result, Manufacturer X must take their case to this body.

B. Manufacturers Association Scenario

Figures 30, 32:
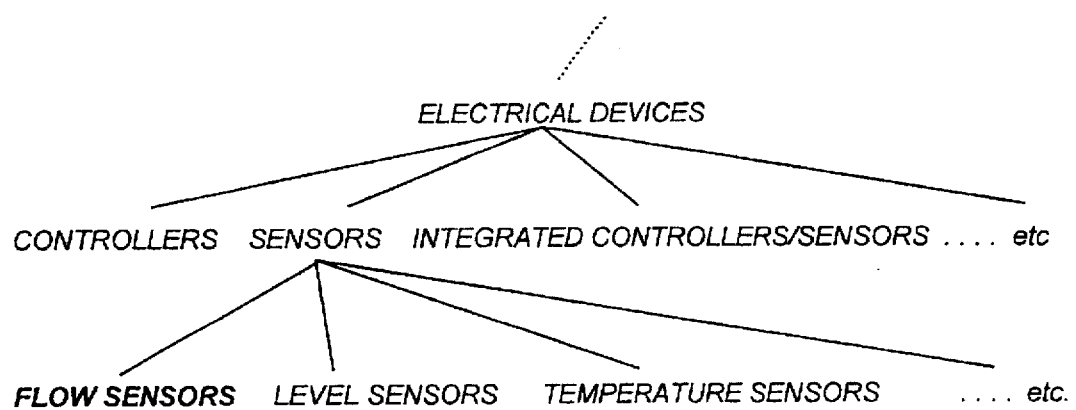
FIG. 30 is a table corresponding to an exemplary modified phrase table constructed in accordance with the present invention.
FIG. 32 is a graphic illustration of an exemplary modified top-level concept structure constructed in accordance with the present invention.

Manufacturer X goes before the sensor manufacturers' association to make their case for adding a new node for indexing non-ultrasonic tuning fork sensors. Other members of the association come up with two alternate approaches: change ultrasonic to sonic and include the new products on the revised node, or change the definition of ultrasonic to exclude tuning fork sensors altogether so that all tuning fork sensors would be included under a new tuning fork node, regardless of their operating frequency. The association opts of the latter alternative, and uses the concept frame and glossary editing tools (described below) to make the changes. These changes will be processed by the channel publisher for release two cycles in the future. At that time, the association will issue a new printed glossary that includes the new definer for tuning fork (temporarily with the synonym ultrasonic) and the revised definition for ultrasonic. The updated glossary is illustrated in FIG. 30.

C. Channel Publisher Scenario

Independent of their work on the next publishing cycle, the channel publisher begins to process the new Functionality concept frame for the level sensors product realm. This processing consists of re-indexing all tuning fork sensors to take advantage of the new tuning fork characteristic. At the same time that the next cycle is issued to the end-users (not yet reflecting the tuning fork changes), a proposed version of the product database for the following cycle is issued to the manufacturers and certified ad agencies. In issuing this proposed version, the channel publisher informs each manufacturer of re-indexing changes that were made to their products. In addition to re-indexing products, the channel publisher may adjust the standard classification scheme for the chemical industry so that within that scheme "ultrasonic" will point to both the ultrasonic and the new tuning fork realm.

D. Manufacturer X Scenario

Manufacturer X, along with all the other manufacturers in the multi-manufacturer catalog and/or their certified ad agencies, review the proposed version of the product database. They each either accept the re-indexing of their own products as-is or use the media-product data review-editing tool (819 in FIG. 31) to make modifications in the manner described below. As a part of conducting this review, Manufacturer X reviews the tagged segments within the content for it's tuning fork sensor products. Content tags are used to record relationships between content segments and realm characteristics possessed by specific products. Whereas previously tagged instances of ultrasonic are still valid (due to the inclusion of ultrasonic as a synonym for tuning fork), it is now also valid for Manufacturer X to substitute "tuning fork" for "ultrasonic" within their content. The revised version of the product database will form the basis for the succeeding cycle release.

E. End Users Scenario

Here is how end users might be impacted by the updates described in this example. Suppose the changes had been issued on the lead engineer's release of the multi-manufacturer electronic brochure CD for the chemical industry. When the lead engineer searches "*ultra*", instead of getting the results listed in the first example, the lead engineer would get:

highest (ultrapure) [Distillation System]
low-density foam [Insulation]
　plastic ultralight foam
ultrasonic [Level Sensors]
tuning fork [Level Sensors]
　ultrasonic This result reflects the fact that ultrasonic was added as a synonym for the new characteristic tuning fork. With this new set of choices, the lead engineer would not miss the chance to consider any of the tuning fork products that would have been accessible under the previous cycle release as ultrasonic products.

F. Conclusions: KnowledgeBase Update Example

This example highlights the power of the invention with respect to maintaining the ability to reliably and accurately locate products. Current natural-language methods for information retrieval ignore the fact that the meaning and usage of terms within particular realms of knowledge are constantly evolving. These existing approaches do not allow for a uniform application of changes to all manufacturers, but instead rely on the content to eventually normalize to a new vocabulary. In the meantime, searches under such an uncoordinated update scheme will invariably offer inconsistent and unreliable product location results. Furthermore, it is not realistic to expect that the vocabulary will ever normalize, unless it happens that manufacturers stop innovating. The present invention utilizes an approach that allows each manufacturer to participate in publishing their own content, while at the same time assuring their equal access under a multi-manufacturer presentation.

Having described two examples illustrating how the present invention generally operates to permit alterations in the product database and knowledge base, a detailed description of how the data structure of the present invention implements the above features will now be described.

VII. Maintenance of Existing Catalogs, Detail

Figure 31:
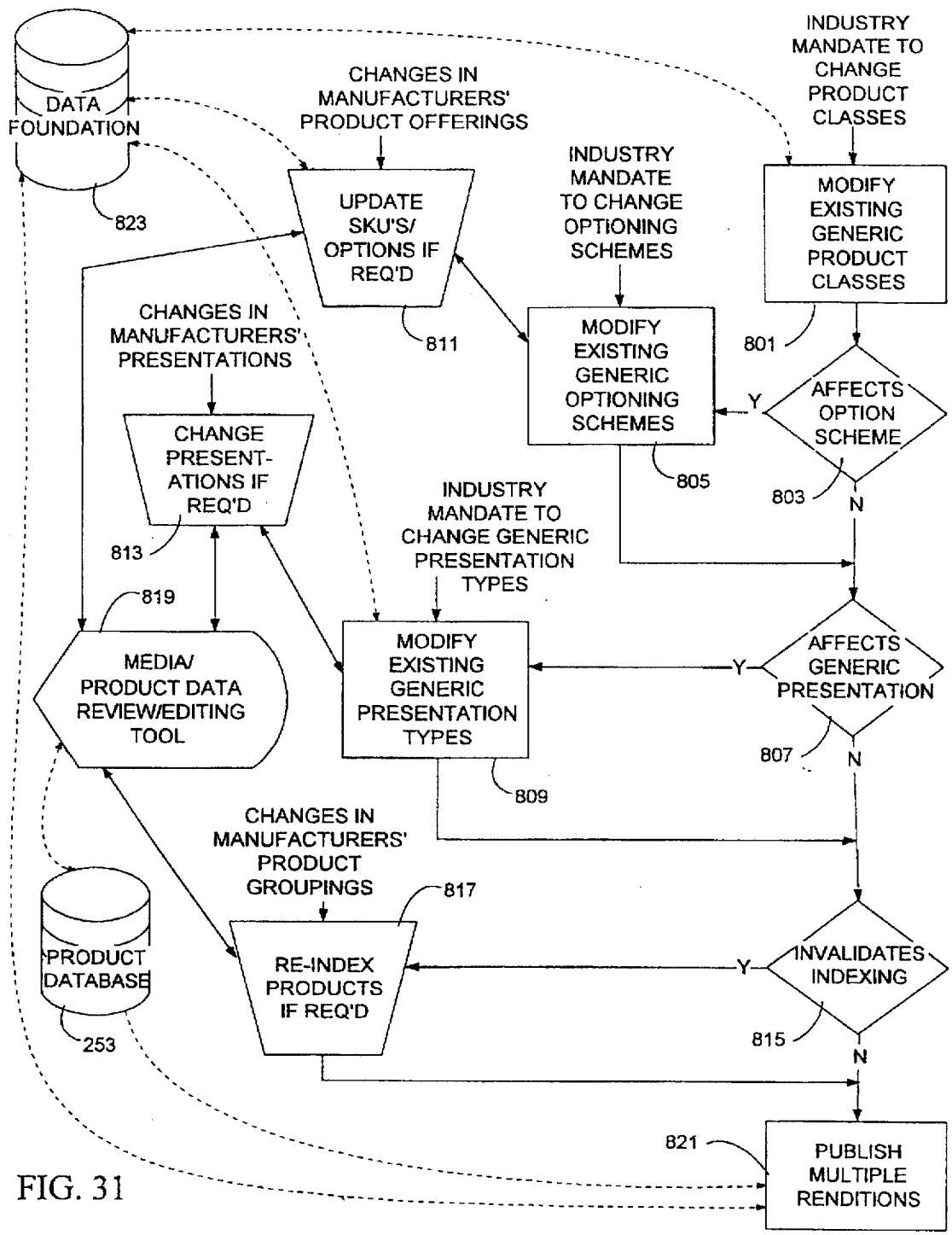
FIG. 31 is a flow diagram illustrating the process for maintaining existing catalogs created in accordance with the present invention.

FIG. 31 shows the procedure for updating, modifying, or otherwise maintaining an existing catalog. Maintaining the data foundation (823) implies two different kinds of tasks. Steps 801 through 809 have to do with changing the data foundation itself, and this would most likely have an affect on the capture of any future product information (as was explained with reference to 242). Executing these items that change the data foundation, however, may result in the need to also change existing product information, as represented by steps 811 through 817. Both product information changes that result from modifying the data foundation and product information changes that are originated by the manufacturers of products can be accomplished using the media/product data review/editing tool (819).

The process of FIG. 31 supports three different modes of operation. Each of these modes allows a different allocation of maintenance tasks among the catalog publisher, and/or the manufacturers, and/or industry and professional associations.

In one mode, steps 801 through 809 are first executed in sequence to change the data foundation, followed by the execution of steps 811 through 817 for the adjustment of product information due to data foundation changes, and then the repeated execution of steps 811, 813, and 817 for the manufacturers' changes to product information.

In a second mode, steps 801, 803, 805, and 811 (and possibly 813 and 817 as weld are first executed to update product SKUs and options as a part of updating the generic product classes and optioning schemes, then steps 807, 809, and 813 are executed to update existing product presentations as a part of changing the underlying generic presentation types, then any invalidated indexing is corrected by executing steps 815 and 817, and finally steps 811, 813, and 817 are executed again for the manufacturers' changes to product information.

In a third mode, steps 801, 803, and 805 are executed, and as they are executed, step 811 (and possibly steps 813 and 817 as well) is executed to take care of both changes to product SKUs and options required due to data foundation changes and changes to product SKUs and options due to the manufacturers, then steps 807 and 809 are executed, and as they are executed, step 813 is executed to take care of both changes to presentations required due to changing the underlying generic presentation types and changes to presentations due to the manufacturers, and finally steps 815 and 817 are executed to take care of product re-indexing to accommodate both the data foundation changes and the manufacturers' changes.

During any particular publishing cycle, there may be no reason to modify the data foundation, as typified in the example of Section V. In such a case, the maintenance activities start with the use of the media/product data review/editing tool (819) and, through the use of the tool, may be found to involve any of 811, 813, and/or 817. In its preferred embodiment, this tool will have the capability of viewing the structure and navigating the tagging of SGML media content within the context of any formatting scheme supported by that content's related DTD. When this tool is used to review and edit a table of SKUs and related options, for example, the relationships inherent in the data scheme (see FIG. 17) can be used to identify the product group(s) and indexing information about it, to the extent of displaying a navigation path(s) through the related concept frame(s). To continue this example, the user may express the desire to change the navigation and thereby be informed by the tool of tagged portions of media content which currently contradict the new path. As another example, the user may attempt to change a tagged portion of media and be informed by the tool of that portion's significance to the indexing of a product group. Continuing with this second example, if the user changes the product group indexing by making an appropriate change to the tagged media portion, then viewing the SKU table may present different characteristic data and/or different option table choices than were present before the change. These examples do not necessarily represent the exact functionality of the tool, nor all the functionality of the tool, but are only presented to illustrate how a review/edit session can start from a number a different perspectives and lead to other perspectives of the data.

On the other hand, an external impetus to change the data foundation may arise within a publishing cycle. It could take the form of changes to the product classes, to the generic optioning schemes, and/or to the generic presentation schemes, in any combination. A mandate to make such changes may come from industry associations, professional groups, etc., associated with the use or manufacture of products in existing catalogs. Section VI provides an illustration of how such a situation might develop.

In the preferred embodiment (see FIG. 31), changes to the generic product classes (801) can be of four types:

1) The glossary may be changed by the destruction of definers and phrases, the demotion of definers to phrases, the creation (or promotion from phrase) of new definers, the changing of definitions, the creation of phrases, and the making/breaking of synonym associations between definers and phrases. Glossary changes can affect the nature of the generic product classes, because of their use in either the product realm classification or in a product realm's concept frame hierarchy (see FIG. 14). As an illustration, in the example of section VI, the definition of ultrasonic was modified to exclude tuning forks. The relationships in the data structure allow the tool used for modifying the glossary to indicate if and where any effects in those structures might occur as a result of any change. In the preferred embodiment, the tool used for editing the glossary has extensive capabilities for searching for particular phrases and definers, for viewing and altering the synonym relationships between definers and phrases, and for listing and displaying the uses of a definer within its associated structure(s).

2) The structure that makes up the product realm classification scheme (see FIG. 11) may be changed by the addition and/or deletion of elements at any level, or by changing the definers related to elements. Any such change could possibly require subsequent adjustments to the concept frames of related realms. As an illustration, in the example of Section IX, the new concept frames could only be built after creation of the Flow Sensors realm within the realm classification scheme. The relationships in the data structure allow the tool used for modifying the product realm classification scheme to indicate which realms might be affected as a result of any change. In the preferred embodiment, the tool used for modifying the product realm classification scheme operates like the outliner functionality of a commercially available word processor, except that any particular element may be picked in order to have the details of its associated definer displayed. To aid in locating and linking definers to elements in the product realm classification scheme, this tool will also share some of the functionality of the glossary editing tool.

3) Concept frames (see FIG. 12) can be added or deleted from a realm, or an existing realm can be modified. As an illustration, in example VI, tuning fork was deleted as an ultrasonic implementation type and added as a genus of single-level sensors. Furthermore, in addition to adding, deleting, arraying, and naming individual network concepts in concept frames, the associations between concepts and definers can be changed. In the preferred embodiment, the tool used for modifying concept frames operates like the graphical flow charting functionality of a commercially available CASE tool, except that particular symbol types and relationship types will be programmed-in to enforce the navigational rules inherent in the data structure (see FIG. 12 and FIG. 31A described below). In the preferred embodiment, the tool used for modifying concept frames also has the ability to display information about associated glossary items, about products associated by indexing, and about related generic presentation types. For example, from within this tool it should be possible to select a genus (characteristic), and view the products and/or SKUs indexed against that characteristic. From this point it should be possible to select a particular product and view the tagged portions of related documents that are associated with that indexing. To aid in locating and linking definers to network concepts in concept frames, this tool will also share some of the functionality of the glossary editing tool.

4) The structure that makes up any particular industry standard classification scheme (see FIG. 11) may be changed by the addition and/or deletion of elements at any level, or by changing the concepts related to a Industry-Standard leaf(s). Elements may or may not have relationships established to definers. In the preferred embodiment, the tool used for modifying the product realm classification scheme operates like the outliner functionality of a commercially available word processor, except that any particular leaf may be picked in order to have the details of its associated concept(s) displayed. To aid in identifying and linking concepts to leafs in the industry standard classification schemes, this tool will also share some of the functionality of the concept frame editing tool.

Figure 31A:
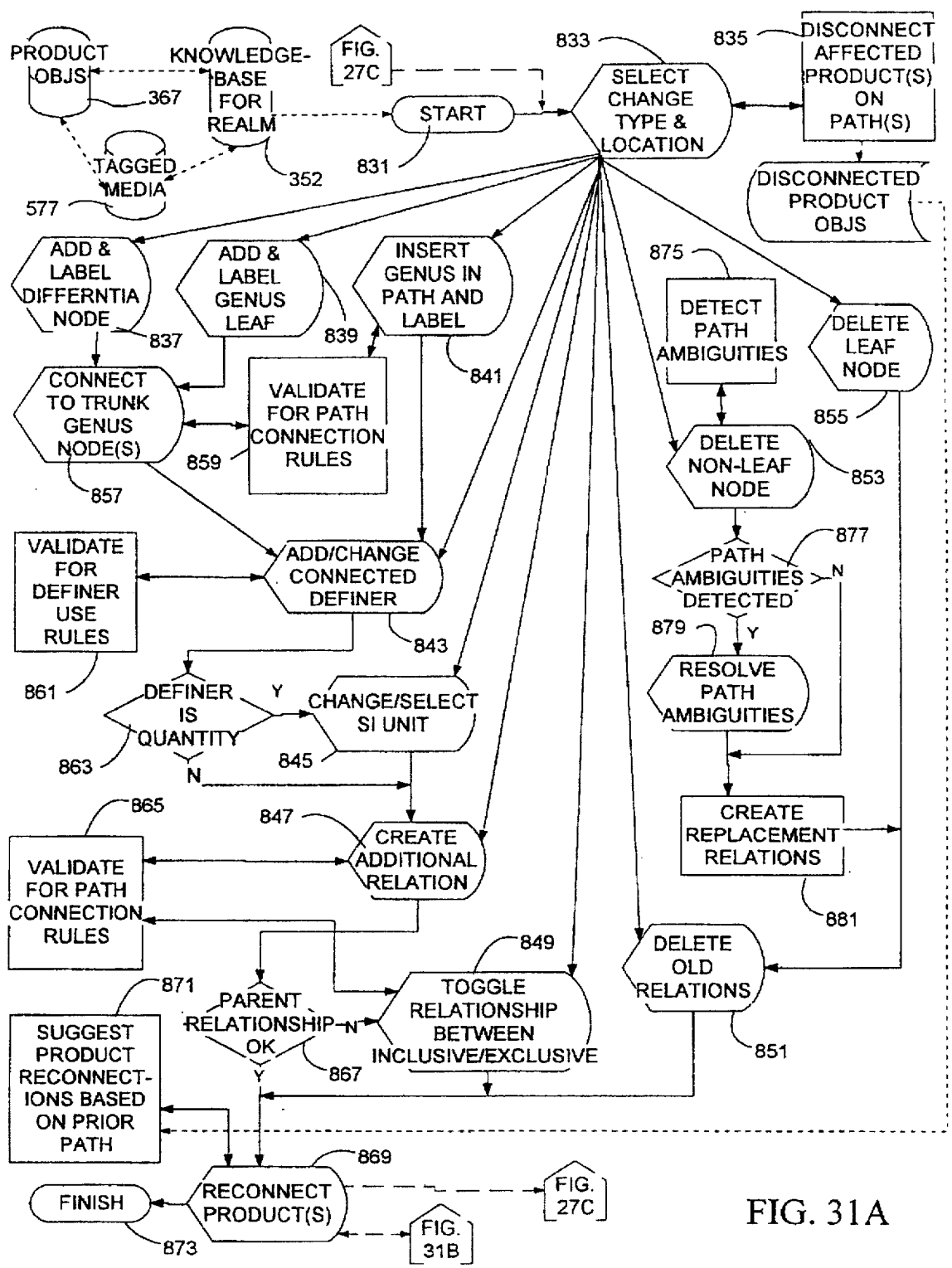
FIG. 31A is a flow diagram illustrating the details of the process for modifying a concept frame.

FIG. 31A illustrates the preferred process for modifying a concept frame 831 utilizing information included in the KnowledgeBase 352 for a product realm, the collection of tagged media 577, and the listing of product objects 367. The process begins at step 833 by allowing the user to select the type of change to be made to the existing concept frame and the location of the change to made. Such changes may include adding and labeling a Differentia node (step 837), adding and labeling a Genus leaf (step 839), inserting a Genus in a path and labeling (step 841), adding or changing a connected Definer (step 843), changing or selecting an SI unit (step 845), creating and additional relation (step 847), toggling a relationship between inclusive and exclusive (step 849), deleting an old relation (step 851), deleting a non-leaf node (step 853), and deleting a leaf node (step 855). Upon the users selection of the change type and location, the process will disconnect affected products on the identified path (step 835).

If the user adds and labels a Differentia node (step 837) or adds and labels a Genus leaf (step 839), the user would then connect the newly created node to a trunk Genus node (step 857), and the process would validate for path connection rules (step 859) prior to advancing to step 843. If the user inserts a Genus in a path and labels it (step 841), the process will validate for path connection rules (step 859) and advance to step 843 where the user may add or change a connected Definer. The system will then validate any additions or changes to a connected Definer using predetermined definer use rules (step 861) prior to determining whether the Definer is a Quantity (step 863). If the Definer is not a Quantity, the process proceeds to step 847. If the Definer is a Quantity, the process first allows the user to change or select the SI unit (step 845) prior to advancing to step 847 where the user may create an additional relation. At this time, if an additional relation is created, the process will validate this connection for path connection rules (step 865) prior proceeding to step 867 where the user decides whether the parent relationship is proper. If the relationship is proper, the process proceeds to step 869 where the user may reconnect products that were disconnected in step 835 to the newly modified concept frame. If the parent relationship is not proper, the user will be prompted to toggle the relationship between inclusive and exclusive (step 849) prior to reconnecting products in step 869. Preferably the process will automatically suggest reconnections based on prior paths (step 871) such that the user may easily reconnect the products in (step 869) prior to finishing the process (step 873). If the user deletes a non-leaf node (step 853) the process will detect any path ambiguities (step 875) and determine in step 877 whether any path ambiguities are detected. If there are no path ambiguities detected the process will created replacement relations (step 881), and if there are detected path ambiguities, the process will prompt the user to resolve these path ambiguities (step 879) prior to advancing to step 881. Following step 881, the system will allow the user to delete old relations (step 851) prior to reconnecting the disconnected products in step 869. If the user deletes a leaf node (step 855) the system will allow the user to subsequently delete old relations (step 851) prior to reconnecting the previously disconnected products in step 869.

Referring back to FIG. 31, because modifications to the generic product classes (801) can alter the inclusion of, definition of, and relationship between product characteristics arrayed within a realm's concept flames, such modifications can be a cause for modifying the generic optioning schemes (805), which may be dependent upon the those characteristics for their makeup. The modification of generic optioning schemes (805) will address the effects of changes to generic product classes, if any (803), either before or at the same time as addressing any industry-mandated changes to the generic optioning schemes. In the preferred embodiment (see FIG. 16), changes to the generic schemes (805) can be of three types:

1) Creation, destruction, or modification of option items;
2) Addition, deletion, or modification of relationships between option items and columns in SKU templates and/or items within concept flames; or
3) Modification of the structure of schemes by the combining of option items into groups and nested groups.

In the preferred embodiment, the tool used for modifying option schemes has a functionality similar to the graphical object browsing tool that is a part of the functionality of many commercially available software development environments, and it preferably includes the ability to change relationships between particular objects (i.e., option items and groups, and group items and groups, see FIG. 16). In the preferred embodiment, the tool used for modifying option schemes also has the ability to display and edit information about individual option items and groups themselves.

Because modifications to the generic product classes (801) can alter the definition of realms and/or can add or delete concept frames from a realm, such modifications can be a cause for modifying the generic presentation types (809), which are organized according to realm and concept frame type. Because modifications to the generic optioning schemes (805) can alter the configuration of tabular data, such modifications can be a cause for modifying the generic presentation types (809), which include tabular formats. The modification of generic presentation types (809) will address the effects of changes to generic product classes and/or optioning schemes, if any (807), either before or at the same time as addressing any industry-mandated changes to the generic presentation types. In the preferred embodiment (see FIG. 17), changes to the generic schemes (809) can be of two types:

1) Changes to any DTD(s) including, but not limited to, designation of organizational portions to include information relevant to a particular realm(s) and/or concept frame(s), designation of organizational portions to be governed by particular formatting schemes, etc.; and
2) Changes to formatting schemes related to any DTD(s).

In the preferred embodiment, the tool used for modifying generic presentation types is an implementation of a commercially available SGML content development environment.

The re-indexing of products (817) will address the effects of changes to generic product classes, if any (815), either before or at the same time as addressing any manufacturer-mandated changes to product indexing (see FIG. 31A). In the preferred embodiment (see FIG. 23), changes to product indexing (817) can be of two types:

1) A product grouping may be eliminated, combined with another grouping, or split into two or more new groupings; and
2) A product grouping may have changes made to its indexing characteristics.

In the preferred embodiment, the tool used for re-indexing products (which is a part of the media/product data editing/review tool, 819) will be similar to the tool described for modifying concept frames (see 801), except that this tool will preferably not allow modification to the structure of the concept frames. Instead, this tool will allow the user to view, edit, create, delete (including cut/copy paste functionality) products within a realm, along with their associated SKU information. In addition, this tool will allow the characteristics associated with a product group (see FIG. 23) to be modified by picking items in the concept frame, as allowed by navigation rules enforced by the structure (see FIG. 12).

Figure 31B:
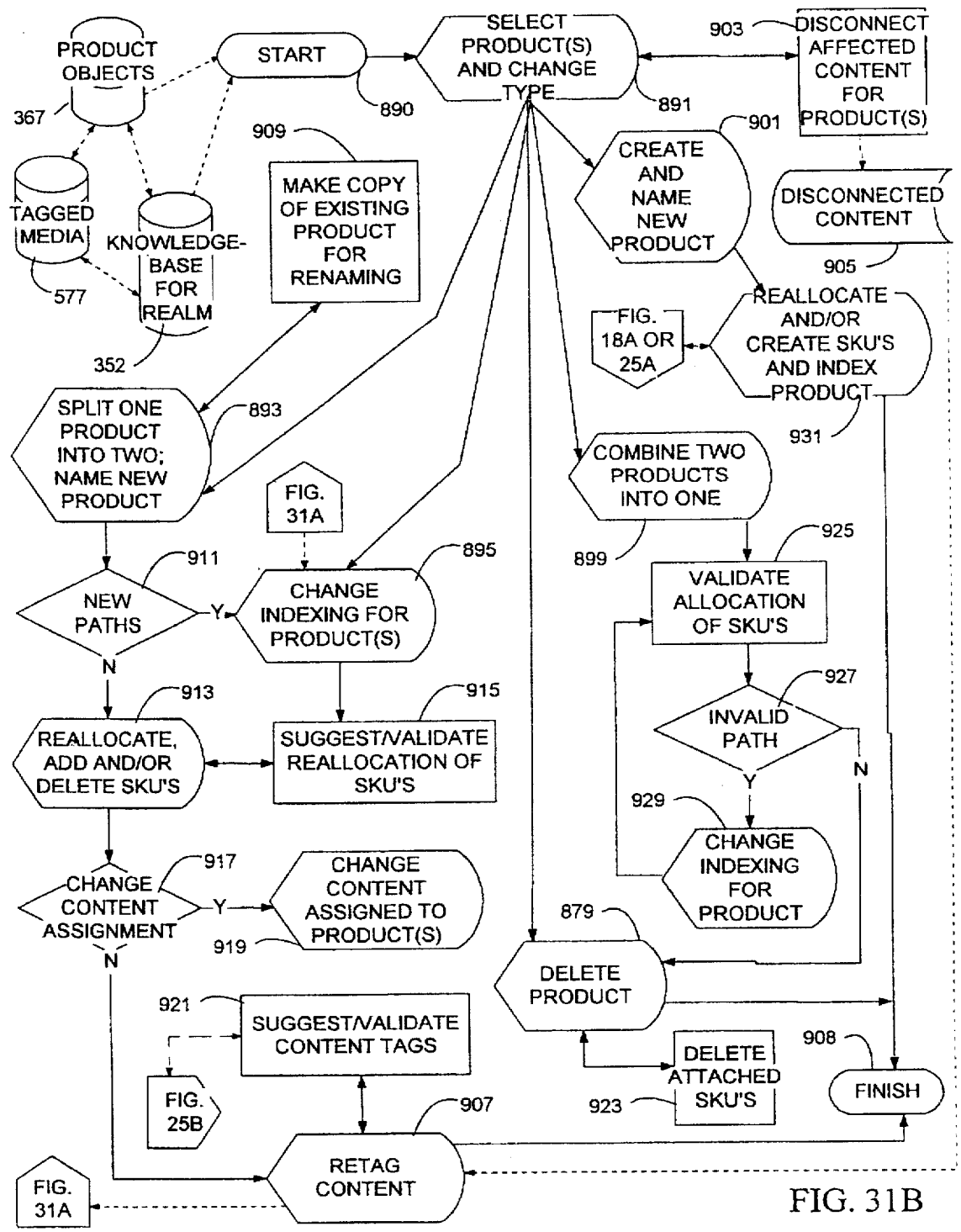
FIG. 31B is a flow diagram illustrating the details of the process for re-indexing products.

FIG. 31B shows the process for reindexing products utilizing the review/edit tool. This process utilizes the KnowledgeBase 352 for a product realm, the collection of tagged media 577, and the listing of product objects 367, and begins at step 891 by allowing the user to select one or more products and the type of change to be made. Such changes may include splitting one product into two products and naming the new product (step 893), changing the indexing for the selected products (step 895), deleting a product (step 897), combining two products into one product (step 899), and creating and naming a new product (step 901). When the user selects the products and type of change to make to the selected products in step 891, the process automatically disconnects the affected content 905 for the selected products (step 903).

If the user splits one product into two products and names the new product (step 893), the process will make a copy of the existing product for renaming (step 909) and the user will subsequently indicate whether the creation of the new product requires the indexing of a new path (step 911). If there is no new indexing required, the process advances to step 913, otherwise the process first allows the user to change the indexing for the two products (895) prior to advancing to step 913. In step 913, the process allows the user to reallocate, add, and/or delete SKUs while suggesting and validating the reallocation of SKUs (step 915). If the content assignment does not need to be changed (step 917), the process retags the previously disconnected content 905 in step 907 while the process suggests and validates the content tags (step 921) prior to finishing the process (step 908). If the content assignment does need to be changed (step 917), the system allows the user to change the content assigned to the products (step 919) and suggests and validates content tags (step 921) before retagging a disconnected content 905 in step 907. A portion of the review/edit tool that suggests and validates content tags in step 921 may access the process for associating media with product objects described above with respect to 25B following step 617 (FIG. 25B). The review/edit tool may be accessed during the process for modifying a concept frame that is shown in FIG. 31A beginning at step 895 and continuing until any disconnected content 905 is retagged in step 907.

If the user combines two products into one product (step 899), the process will validate reallocation of SKUs (step 925) and, if an invalid path is created (step 927), the process will prompt the user to change the indexing for the product (step 929) and revalidate the reallocation of SKUs (step 925). Once the process determines that there is no invalid path (step 927), the process advances to step 897 where a user may delete a product. If a product is deleted, the process will delete any remaining attached SKUs (step 923) prior to finishing the process (step 908). If the user creates and names a new product (step 901) the user may then reallocate and/or create SKUs and index the product (step 931) prior to finishing the process (step 908). The functionality in step 931 may be achieved via the processes illustrated in FIG. 18A or 25A.

Figure 31C:
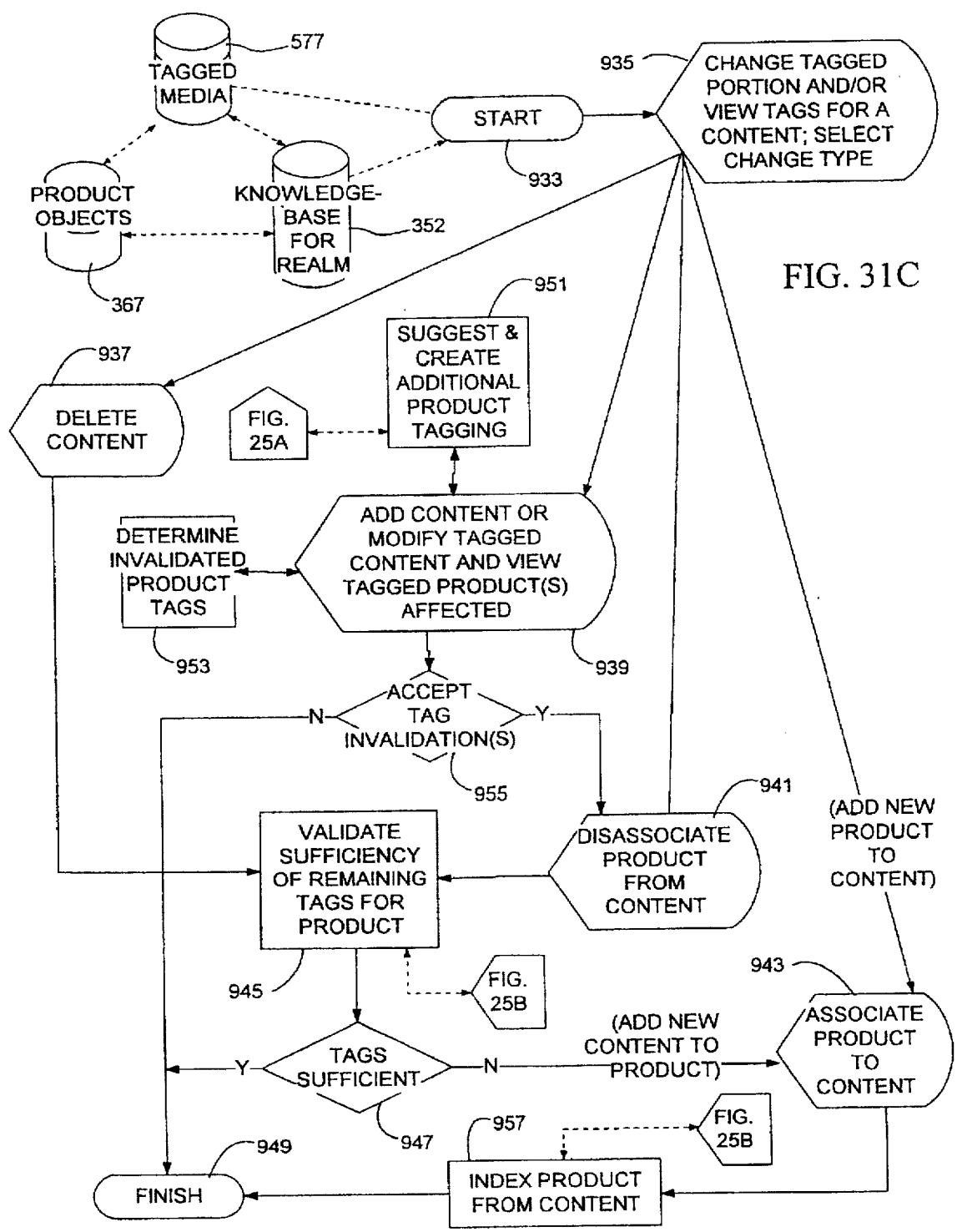
FIG. 31C is a flow diagram illustrating the details of the process for updating product presentations.

FIG. 31C illustrates the process 933 for presentation updating using the review/edit tool. This process utilizes information in the KnowledgeBase 352 for a product realm, the listing of product objects 367, and the collection of tagged media 577. This process begins by allowing a user to change a tagged portion of content and/or view tags for a content and to select the type of change to be made (step 935). The user may then delete content (step 937), add content or modify tagged content and view the tagged products affected (step 939), disassociate a product from the content (step 941), and, if a new product is to be added to the content, the user may associate the new product to the content (step 943).

If the user deletes content (step 937), the system will validate the sufficiency of remaining tags of the product (step 945) and if the tags are sufficient (step 947), the process will be finished (step 949). If the tags are not sufficient, the user would add new content to the product and associate the product to the new content in step 943. Then the process would index the product from the content (step 957) prior to finishing the process. If the user adds content or modifies tagged content and views tagged products affected (step 939), the process will suggest and create additional product tagging (step 951) and will determine whether there are any invalidated product tags (step 953). If the user does not accept the tag invalidations (step 955) resulting from adding or modifying tagged content, the process will be finished. On the other hand, if the user will accept the tagged invalidations, the process will allow the user to disassociate a product from the content (step 941) and will validate the sufficiency of remaining tags for the product (step 945). If the tags are sufficient (step 947), the process will be finished.

Referring back to FIG. 31, step 821 is the generation of multiple product renditions, using data from both the data foundation (823) and the product database (253). It should be noted that one benefit to the new catalog production process is that various renditions of information about the same products will be consistent because they are derived from a common data source. This data source, which may be centralized or distributed, will allow access to the multi-manufacturer publisher, and/or the individual manufacturers, and/or industry and professional associations, so that portions of this task (821) may be accomplished at different locations.

Having described the manner by which an electronic catalog may be created and subsequently modified, two more example will now be described illustrating the benefits of providing for a single approach to simultaneous catalog creation and maintenance.

VIII. Catalog Creation Example

A. Description

This example involves only manufacturer Q and the channel publisher. Manufacturer Q is a producer of level sensors that has traditionally used their own internal graphics arts group to create printed catalogs and promotional materials, as opposed to relying on an outside ad agency. They now wish to have this same internal group work with the channel publisher to create a catalog database. In this way Manufacturer Q can start to publish product information through all the access modes such a database enables.

As a licensed user of the invention, the channel publisher is well-versed in the proper catalog creation process. As described with respect to FIGS. 15, 18, 18A, 25, 25A–C, 26, 27, and 27A, Manufacturer Q's existing materials are put through a series of predefined steps that extract a complete definition of all their products at a normalized SKU level. This definition includes options and features unique to manufacturer Q, as well as characterizations chosen from those that have been universally accepted by the industry. At the same time, these same materials are put through a parallel set of steps that restructure the information for multiple presentation and ease of integration between content and product characterization. Links are established between each defined product and the various portions of different content, according to the products' characteristics. Restructuring and linking the content in this way serves three purposes. First of all, it assures consistency between all of the end users' information access modes. Secondly, it automatically generates most of the user interface sequencing (hypermedia) for the electronic presentations. Thirdly, it eases the task of maintaining the catalog, because the re-indexing activity and the content update activity can each be used in the accomplishment of the other.

B. Conclusions

There are currently many different processes followed to create each separate product information access mode. In some cases, a new process is implemented for each manufacturer. Furthermore, there is redundancy between these different creation activities for any given manufacturer. The present invention involves a single process whose execution can be improved through repeated application. Furthermore, each manufacturer benefits from the data foundation created as a basis for information organization and presentation. In other words, there is no need for each manufacturer to invest in "re-inventing the wheel" when their resources could be better spent honing their core competencies (producing products).

In their analysis of documents/databases, existing approaches do not focus on physical things (in the case of the present invention, products) as the objects of interest (concepts) to be identified. Rather, they are typically looking for facts/statements as expressed in text, using some method that depends on word proximity as a major determinant. For product information this is a problem because the information about a specific product may be found dispersed in the document. Furthermore, information about a specific product may exist sometimes in statements about a single SKU and sometimes in general statements covering whole product lines, or options that cross product lines.

Most existing approaches do not consider the possibility of re-structuring the content as a part of the analysis process. This is key in achieving an efficient means for maintaining consistency over multiple presentations/deliveries.

IX. Knowledgebase Creation Example

A. Description

This example requires the joint efforts of the channel publisher, the sensor manufacturers' association, and the certified ad agencies. It involves the creation of a new product realm for Flow Sensors. The first task, accomplished by the channel publisher through use of the product realm classification editing tool, is to create a node for the product realm itself (see FIG. 32).

Figure 33:
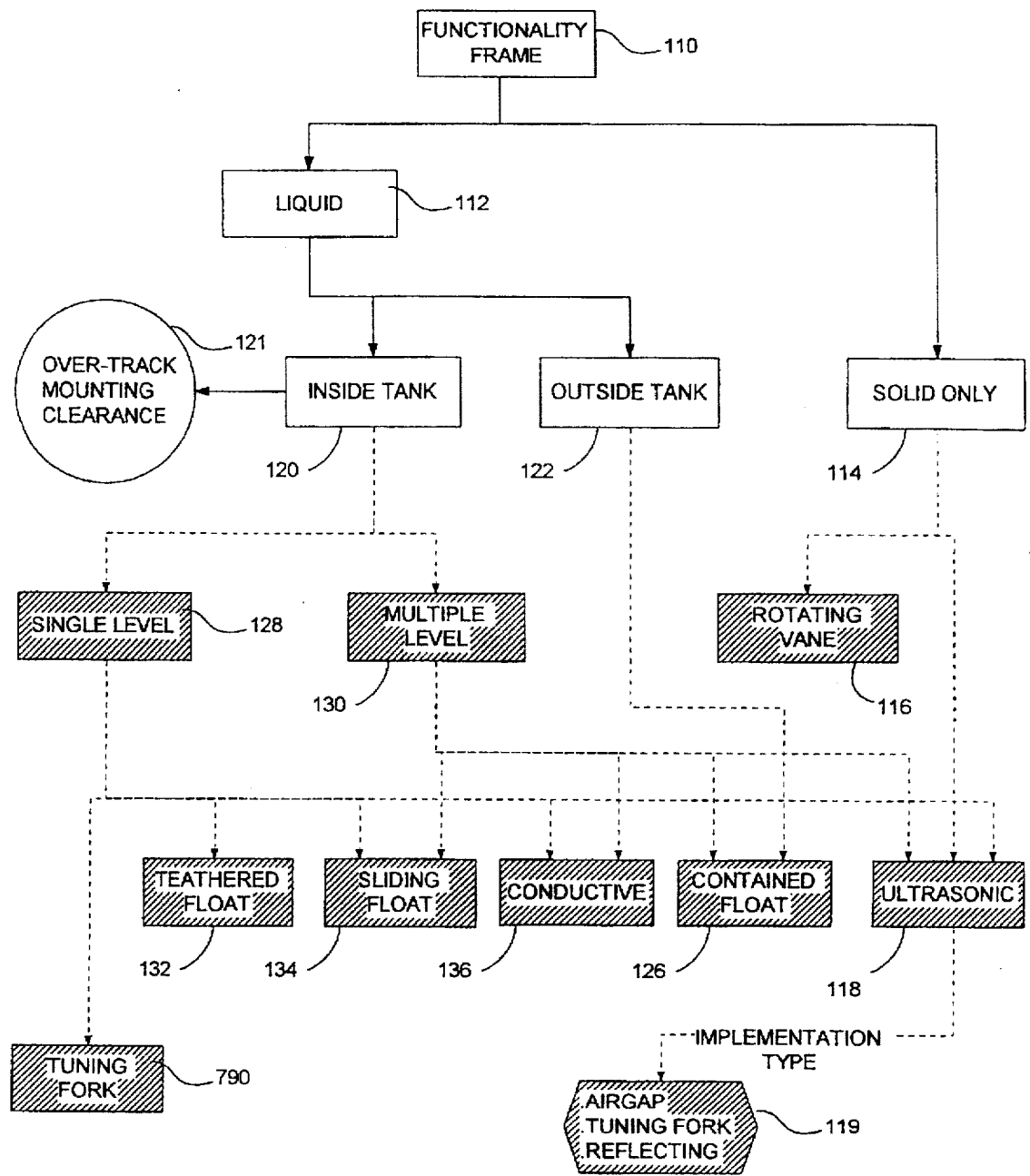
FIG. 33 is a graphic illustration of an exemplary modified lower-level concept structure for a Functionality concept frame constructed in accordance with the present invention.

After this placement has been approved by the association, the channel publisher works with the association to create the concept frames, using the concept frame and glossary editing tools. This task is simplified because the tool allows some of the logic and glossary established for the similar Level Sensor realm to be reused (see solid lines in FIG. 33 and see FIG. 27A). In a similar fashion, the generic optioning schemes are made up largely from pieces of other schemes already in existence.

Next, the channel publisher assembles generic presentation types for the new Flow Sensors realm. If these types are not identical to those already in existence for level sensors, the certified ad agencies would be a good source for determining any minor adjustments required.

B. Conclusions: KnowledgeBase Creation Example

The present invention provides a means and process for structuring knowledge in a way that excels beyond all previous applications of concept frames to product information. That is because the invention ties together all participants and all presentations into a single publishing system. As the above example points out, an extra advantage to this approach is that it allows the KnowledgeBase data to be bootstrapped from existing product realms to the new ones. A detailed description of the above processes is provided below.

X. Single Approach to Simultaneous Catalog Creation and Maintenance, Detail

Figure 34A:
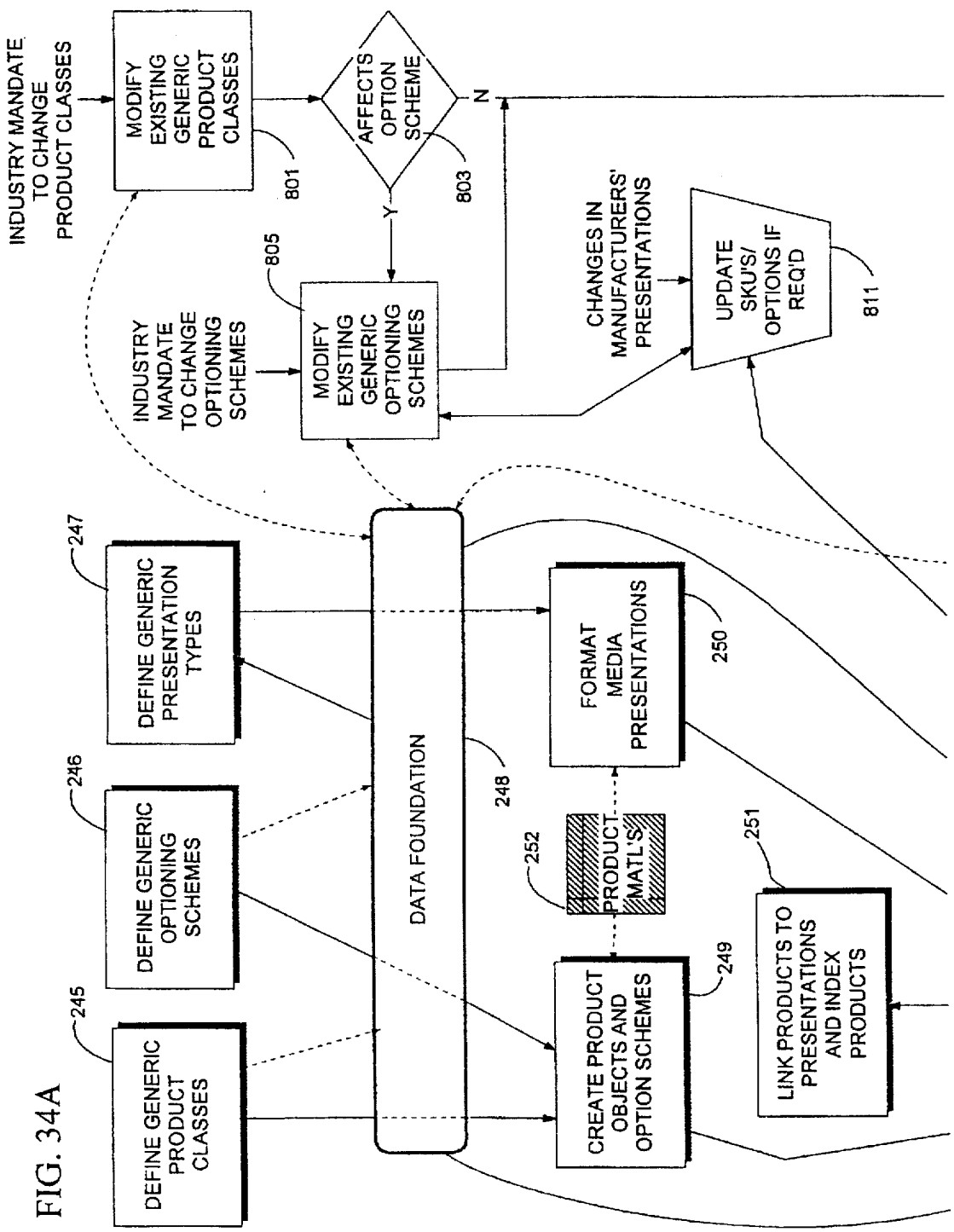
FIG. 34 is a flow diagram illustrating the process for a single approach for catalog creation and maintenance in accordance with the present invention.
Figure 34B:
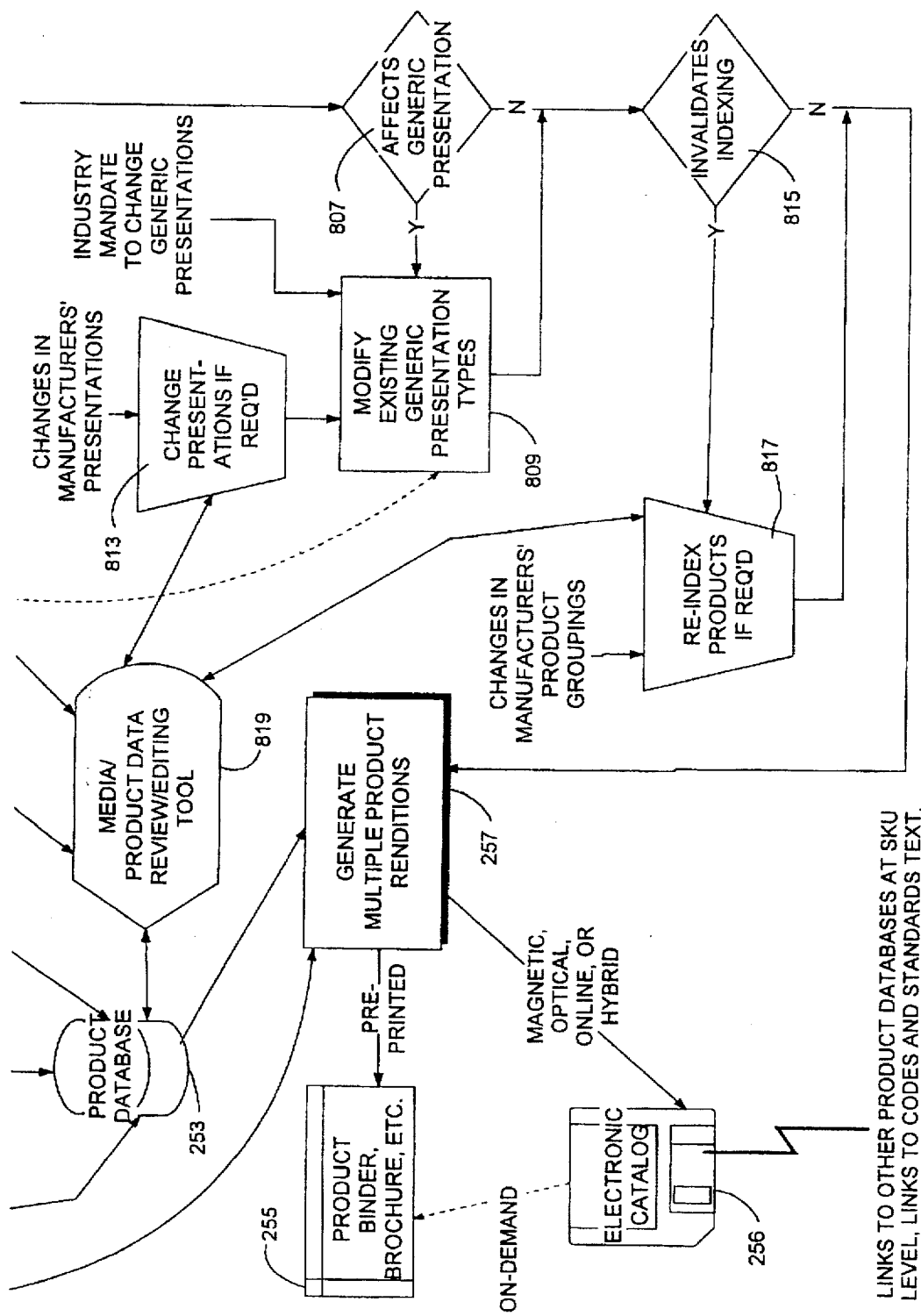

FIG. 34 provides detail with respect to the publishing process previously outlined. It should be readily apparent that FIG. 34 is merely a combining of FIGS. 15 and 31 into a single, unique seamless process. For an explanation of any particular detail of FIG. 34, the reader is directed to the corresponding section(s) of description for FIGS. 15 and/or 31.

Certain beneficial features of the new single process described by FIG. 34 will now be described. First and foremost it should be noted that once the data foundation for a product realm has been completed, many of the elements of that realm (phrases, definers, concept frame logic segments, option items, basic media organizations and formats, etc.) can be used in creating the elements of realms for products that are similar to that first realm. Thus, the task of building the data foundation can occur across publishing cycles, and becomes easier as time goes on. Once the data foundation for any particular realm has been added to the system, product information can be captured for the creation of new catalogs within that realm, but not all manufacturers within the realm need to be added at the same time. The maintenance function allows the first-time creation of different manufacturers' catalogs to occur over multiple publishing cycles, with each succeeding cycle taking advantage of improvements in the data foundation, while multi-manufacturer catalogs maintain consistency in the treatment of all manufacturers with products within a realm. There may be a time period during which there exists in the data foundation only some of the realms needed to represent the full product line of a particular manufacturer. During such a time period, those of that manufacturer's products not covered by the data foundation can still be made accessible via the manufacturer's own table of contents (TOC), although their presentations and representation as normalized SKUs would later have to be re-created to take into account product indexing when appropriate realms become available. Furthermore, not all manufacturers need to have their product information captured and maintained at the same level of detail. For example, some manufacturers in a realm may wish to have only brochure-level (product and content) information entered into the publishing system, while others supply option schemes and media presentations to support data access at the SKU level.

XI. End User Interactive Methods

A. Introduction

This section describes the preferred embodiment of that portion of the present invention that deals with the end-users' access to product information. Note that these different forms of access will provide consistent product identification in all cases, a feature that is unique to this invention and is a direct result of the data structuring and production process heretofore described.

B. Generic Access to Products (Print)

Item 671 on FIG. 26 represents the process by which structured media (537) is converted to printed media (670). FIG. 26 also describes the conversion of the electronic TOC (345) into structured media (537) via the product db pre-compile (677). Together, these processes result in the inclusion of printed tables of contents within single-manufacturer printed renditions of product information (e.g., product binders). Printed renditions of multiple-manufacturer catalogs need additional indices to aid the end-user in the identification of products of interest, and these have traditionally been produced by a laborious manual indexing process. Multiple-manufacturer catalogs generally are divided into sections by broad product types, with information about different manufacturers' products grouped together within a section. Typically, the manually-produced indices direct the user to a section or to one or more manufacturers within a section, but not to specific products. Some such indices are simply alphabetically sorted keywords having to do with types of products, similar to a rudimentary book index. Other indices, along the line of a layered topical index or a product features chart, might be maintained by the catalog publisher within each section. If the industry that uses the products has a standard way of classifying designs, work methods, or products, then these types of hierarchies may be included, with references to particular manufacturers within a section.

One feature of the product db pre-compile (677) that has not yet been described is its ability to automatically generate the structured media (537) needed to produce printed indices for multi-manufacturer catalogs. This capability is apparent from the data structure of FIG. 24. For example, definers can form the basis for a keyword index to catalog sections composed of one or more realms which can easily be augmented by the inclusion of phrases indicating the "see" and "see also" cross-referencing implied by synonym relationships (see FIG. 14). As another example, the product realm structure forms the basis for a publisher's topical index with ties to manufacturers' offerings within the sections. By extending this hierarchy into concept frames, the "see" and "see also" cross-referencing implied by switches (see FIG. 12) could also be provided. Industry-standard schemes are similarly supported. These indices, and many variations on them, could be produced with ties to sections, manufacturers, and even specific pages, all without manual intervention.

C. Generic Access to Products (Electronic)

The data structure and process of the present invention promotes a level of standardization in the definition and presentation of products that has not been delivered through any other means to date. This standardization optimizes the efficient identification of products of interest based on their characteristics. Three unique features of the invention are key to achieving this optimization. First of all, the same relationships established between phrases, definers, and nodes within concept structures can be used to the advantage of end-users in navigating structures and formulating queries, as well as being used by the indexer of products (the manufacturer). As a result, there is an unprecedented level of understanding established between the seekers and providers of product information with respect to defining the characteristics of products. Secondly, there is complete integration between the words and concepts that define products and the content that manufacturers use to describe products. Finally, the publisher has within its control, through its design of the realm structure and concept frames, the number of interactions required for the end-user to narrow the search to a particular quantity of product candidates. The ratio of interactions required to the quantity of products in the result is a good measure of efficiency in a multi-manufacturer catalog. The structuring of relationships between the concept frames and the product objects (see FIG. 17) allows the publisher to gather objective statistics on the efficiency of the end-user's access to the current scope of products. Such statistics can be used as a guide in making adjustments to the structure to optimize end-user access. Other access systems, such as hypernavigation or boolean keyword search, are incapable of providing such statistics.

In the preferred embodiment, the method for end-user access to product information consists of four stages. The example of Section II provides an illustration of these stages in practical use.

1) Identify a Realm of Interest

The structuring of data in accordance with the present invention makes it possible to provide various means for identifying the realm(s) that contains products in which the end user is interested. The user may choose to navigate the product realm structure or any one of the industry-standard structures provided to determine the realm (see FIG. 11). Alternatively, the user may search for appropriately defined phrases and/or their synonyms, and by their use (see FIG. 14) either locate directly to a point on the realm structure, or to a position within a particular realm's concept frame. It would also be possible to configure the end-user system to accept the input of a manufacturer's name and offer the choice of all the realms within which that manufacturer furnishes products.

2) Identify Candidate Products Within a Realm

The chief means of identifying products within a realm is by navigating the concept frames (see FIG. 10). In concept frame navigation, the system presents the user with choices among characteristics, relative to a particular concept frame, that apply to products identified thus far by all the choices made within the realm up to the current time. Previous choices may have been from any of the realm's concept frames. At any time while in this stage, the user has five options for action: 1) the user can pick one of the choices presented within the current concept frame (thus possibly reducing the current identified products); 2) the user can make another concept frame the current concept frame (in which case the user will be presented with a different set of choices); 3) the user can look at information about the products identified thus far (moving the interaction to stage three, below); 4) the user can back up to any previous point in the user's interaction (thus altering the current choices and possibly altering the current concept frame and current identified products); or 5) the user can ask for more information, such as a definition explaining the meaning of any current or previous choices. Two of the ways that this implementation of concept frames to identify products is unique are in its implementation of switches to other realms and its ability to use defined phrases and/or theft synonyms to jump to navigation points in the current or in other realms based on shared usage.

The above are only a few of the navigation possibilities using concept frames. For example, in another implementation, the concept frames may be presented in the form of a graphical map that allows the user to pick a particular node, thus bypassing (automatically choosing) intermediate nodes.

3) Review Information About Candidate Products

There are there are two types of information detail that may be viewed by the user once the user has identified a particular product of interest. One type is a formatted summary of all the indexed characteristics of the product, highlighting the characteristics that the user explicitly picked during stage 2.

The other type of information about a selected product(s) is from the structured media content associated with that product(s) (see FIG. 22). Because such media is also linked to particular concept frames and characteristics within concept frames (see FIG. 23), the particular media presented and/or the order or format of presentation might be determined in part by the characteristics explicitly picked by the user either in stage 2 or from the formatted summary of all indexed characteristics. Alternatively, the user might indicate the desire to view only a particular type(s) of media (e.g., images), possibly of more than one product at the same time. The above description illustrates just a few of the media navigation schemes that simulate hypermedia navigation without incurring the expense of building actual hypermedia links. Note that the system also has the ability to accommodate explicit hypermedia links (see FIG. 20).

4) Retrieve Information About Specific SKUs and Configurations of SKUs

It may be impractical for a generic access delivery of product information to provide all the information normally associated with a specific manufacturer's product binder. In the preferred embodiment, the user wishing information about specific SKUs or configurations of SKUs would progress from the third stage to stage 4. Under this embodiment, the electronic equivalent of the specific binder may be accessed on a stand-alone basis (e.g., via the electronic TOC) by the user who has already identified a manufacturer of interest. Alternatively, this same "electronic binder" could be accessed from within a generic electronic catalog. The advantages of this approach are many, because the invention's structuring of data keeps track of relationships between products and SKUs (see FIG. 17). For example, if the user has chosen a product of interest in stage 3 then, upon entering the electronic binder, the user can be directed immediately to the sections of that electronic binder that deal with the related SKUs and their options. Because navigation modes in the electronic binder can be tailored to the needs of the specific manufacturer, any entry point can be designated for particular points of departure from the generic catalog. As just one of many possible examples, if the user was last in a concept frame dealing with product appearance, then entry into the electronic binder might be on a chart of color options for the SKUs associated with the current identified products.

Through application of the appropriate end-user process, certain of the above stages may be bypassed. If the user is only working on a conceptual design, for example, the user may stop his information search at stage 3. On the other hand, if the user is only interested in the goods of a particular manufacturer, the user may start a search at stage 4 with that manufacturer's specific electronic catalog.

Knowing a particular manufacturer's name or product could allow the user to skip stages 1 and 2 and begin by immediately reviewing information about candidate products (stage 3). Furthermore, looking through a manufacturer's content will allow the user to identify specific products (see FIG. 22). Since the relationships of the data structure (see FIG. 17) record the characteristics of such products, then products having identical characteristics (by the same or a different manufacturer) can be easily located. If there are no exact equivalents, then the user can proceed from stage 3 to stage 2, where he can navigate the concept frames, starting with the navigation established by the found products, and then relax certain requirements or establish new ones to locate other products that are largely similar.

If a user is currently at stage 2 within a particular realm, there are a number of ways that the user may navigate to some other realm while remaining at stage 2, one way being through a switch symbol (see FIG. 12). A second method for changing realms might be to look up the definer phrase or the synonym phrases for the definer of a particular node of the concept frame (see FIG. 14). Such a phrase might have usage in some other realm to which the user may choose to go. As a third example, the user may be in a realm that contains system products. In this case the user may choose to go to the realm of one of the component products that makes up that system product.

All of the above are only a few of the various combinations of types of product accessing that can be made available through the concept frame scheme that is central to this invention.

D. Manufacturer-Specific Access to Products (Electronic)

Note that, at the option of the particular manufacturer, many of the same access techniques described above for generic access could be applied to a manufacturer-specific rendition of product information.

As described above and recited in the claims, the term "catalog" refers to a collection and presentation of product information that may take various forms, such as that of a pamplet, brochure, price book, proudct binder, etc., and may include information about proudcts available from a single manufacturer or from may manufacturers.

The above described embodiments were chosen for purposes of describing but one application of the invention. It will be understood by those who practice the invention and by those skilled in the art, that various modifications and improvements may be made to the invention without departing from the spirit of the disclosed concepts. The scope of protection afforded is to be determined by the claims and by the breadth of interpretation allowed by law.

The embodiments of the invention in which an exclusive property or privilege is claimed are defined as follows:

1. A data structure for use in publishing an electronic catalog containing information on a plurality of products, comprising:

means for creating a concept structure for at least one product realm wherein said concept structure includes at least one concept frame for defining classes of product groupings, said concept frames including a plurality of concept nodes having relationships based upon characteristics of the products within the product realm;

means for creating a product database including a listing of SKUs, each SKU corresponding to a product or a component of a product, said product database further including product information for each associated SKU, and an identification of each concept node in which each SKU can be located; and means for creating a glossary to be used for searching for a particular product or group of products having desired characteristics, said glossary including a plurality of phrases, at least one of said phrases being a definer that links said at least one phrase to one of said concept nodes.

2. The data structure as defined in claim 1, wherein at least one of said phrases is a synonym and having a predetermined relationship to at least one definer.

3. The data structure as defined in claim 1, wherein said means for creating a product database includes a relational database management system.

4. The data structure as defined in claim 1, wherein said means for creating a concept structure includes an object-oriented database management system.

5. The data structure as defined in claim 4, wherein said means for creating a product database includes a relational database management system.

6. The data structure as defined in claim 5 and further including linking means for automatically linking entries in said relational database management system with entries in said object-oriented database management system.

7. The data structure as defined in claim 1, wherein said means for creating a product database includes means for creating at least one table of SKUs, said table including for each SKU an identification of each concept node in which the associated SKU can be located.

8. The data structure as defined in claim 7, wherein said means for creating a table of SKUs includes means for generating and displaying a SKU table template having data entry fields for entering an SKU and for entering data in predefined columns of said SKU table.

9. The data structure as defined in claim 1 and further including means for creating a second concept structure for at least one product realm wherein said second concept structure represents an industry standard for classification of product groupings, said second concept structure having nodes that are cross-referenced to said concept frames of said first concept structure.

10. The data structure as defined in claim 1, wherein said means for creating a product database includes means for creating a media base as part of the product database, wherein said media base includes numeric media content associated with at least one product and links associating a portion of the numeric media content to a numeric characteristic of a product.

11. A data structure for use in publishing print and/or electronic catalog containing information on a plurality of products, comprising:

means for creating a concept structure for at least one product realm wherein said concept structure includes at least one concept frame for defining classes of product groupings, said concept frames including a plurality of concept nodes having relationships based upon characteristics of the products within the product realm;

means for creating a product database including an object representation of products, said object representation including for each product an identification of each concept node in which the associated product can be located, said means for creating a product database further includes means for creating a media base as part of said product database wherein said media base includes descriptive media content associated with at least one product and content tags linking a portion of the descriptive media content to characteristics of a product linked to characteristics identified for each product in said object representation of products; and means for creating a glossary to be used for searching for a particular product or group of products having desired characteristics, said glossary including a plurality of phrases, at least one of said phrases being a definer that links said at least one phrase to one of said concept nodes.

12. The data structure as defined in claim 11, wherein at least one of said phrases is a synonym and having a predetermined relationship to at least one definer.

13. The data structure as defined in claim 11 and further including means for creating a second concept structure for at least one product realm wherein said second concept structure represents an industry standard for classification of product groupings, said second concept structure having nodes that are cross-referenced to said concept frames of said first concept structure.

14. The data structure as defined in claim 11, wherein said descriptive media content is expressed in Standardized Generalized Markup Language.

15. The data structure as defined in claim 13, wherein said means for creating a media base includes means for creating templates outlining the relation between content sections and concept frames.

16. The data structure as defined in claim 11 and further including means for creating product options representing differences between SKUs that exist in a common generic product class.

17. The data structure as defined in claim 16, wherein said means for creating product options includes means for relating said product options to said concept nodes.

18. The data structure as defined in claim 17, wherein when said product options are numeric values, said means for creating product options automatically summarizes the numeric values for specific SKUs within a common generic product class as maximum and minimum values for the products within the common generic product class.

19. The data structure as defined in claim 17 and further including means for automatically summarizing product options possessed by specific SKUs within a common generic product class as optional characteristics of products within the common generic product class.

20. The data structure as defined in claim 11, wherein a portion of said descriptive media content is numeric data that is linked to numeric characteristics of a product identified in said object representation of products.

21. The data structure as defined in claim 20, wherein said numeric data represents a product dimension illustrated in a CAD-type drawing.

22. The data structure as defined in claim 11, wherein said media base includes numeric media content associated with at least one product and links associating a portion of the numeric media content to a numeric characteristic of a product.

23. A data structure for use in publishing multiple renditions of electronic catalogs and for publishing multiple renditions of printed catalogs, the electronic and printed catalogs containing information on a plurality of products, the data structure comprising:

means for creating a concept structure for at least one product realm wherein said concept structure includes at least one concept frame for defining classes of product groupings, said concept frames including a plurality of concept nodes having relationships based upon characteristics of the products within the product realm;

means for creating a product database including an object representation of products, said object representation including for each product an identification of each concept node in which the associated product can be located, said means for creating a product database further includes means for creating a media base as part of said product database wherein said media base includes descriptive media content associated with at least one product and content tags linking a portion of the descriptive media content to characteristics of a product linked to characteristics identified for each product in said object representation of products; and means for selecting portions of the descriptive media content in said media base for specific products in order to compile information from said product database and said media base to generate a desired rendition of a printed catalog.

24. The data structure as defined in claim 23, wherein said descriptive media content is expressed in Standardized Generalized Markup language.

25. The data structure as defined in claim 24, wherein said means for creating a media base includes means for creating templates outlining the relation between content sections and concept frames.

26. The data structure as defined in claim 24, wherein said descriptive media content is further expressed in Document Style Semantics and Specification Language.

27. The data structure as defined in claim 23 and further including means for creating a second concept structure for at least one product realm wherein said second concept structure represents an industry standard for classification of product groupings, said second concept structure having nodes that are cross-referenced to said concept frames of said first concept structure.

28. The data structure as defined in claim 23 and further including means for creating product options representing differences between products that exist in a common generic product class.

29. The data structure as defined in claim 28, wherein said means for creating product options includes means for relating said product options to said concept nodes.

30. The data structure as defined in claim 29, wherein when said product options are numeric values, said means for creating product options automatically summarizes the numeric values for specific products within a common generic product class as maximum and minimum values for the products within the common generic product class.

31. The data structure as defined in claim 29, means for automatically summarizing product options possessed by specific products within a common generic product class as optional characteristics of products within the common generic product class.

32. The data structure as defined in claim 23, wherein said media base includes numeric media content associated with at least one product and links associating a portion of the numeric media content to a numeric characteristic of a product.

33. An electronic catalog containing information on a plurality of products, comprising:

a concept structure for at least one product realm wherein said concept structure includes at least one concept frame for defining classes of product groupings, said concept frames including a plurality of concept nodes having relationships based upon characteristics of the products within the product realm;

a product database including an object representation of products, said object representation including for each product an identification of each concept node in which the associated product can be located, said product database further includes a media base as part of said product database wherein said media base includes descriptive media content associated with at least one product and content tags linking a portion of the descriptive media content to characteristics of a product linked to characteristics identified for each product in said object representation of products;

a glossary to be used for searching for a particular product or group of products having desired characteristics, said glossary including a plurality of phrases, at least one of said phrases being a definer that links said at least one phrase to one of said concept nodes; and means for locating specific portions of the descriptive media content based upon identified product characteristics and for selecting a specific product possessing such identified product characteristics.

34. An electronic catalog as defined in claim 33, wherein at least one of said phrases is a synonym and having a predetermined relationship to at least one definer.

35. An electronic catalog as defined in claim 33, wherein said means for locating specific portions of the descriptive media content locates the identified product characteristics by navigating through said at least one concept frame.

36. An electronic catalog as defined in claim 33, wherein said means for locating specific portions of the descriptive media content locates the identified product characteristics by selecting amongst search phrases that are morphologically similar.

37. An electronic catalog as defined in claim 33, wherein said products listed in said table of said product database include products manufactured by a plurality of manufacturers.

38. An electronic catalog as defined in claim 37, wherein said specific portions of the descriptive media content are located in a catalog including a listing of product SKUs available from a single manufacturer.

39. An electronic catalog containing information on a plurality of products, comprising:

a concept structure for at least one product realm wherein said concept structure includes at least one concept frame for defining classes of product groupings, said concept flames including a plurality of concept nodes having relationships based upon characteristics of the products within the product realm;

a product database including an object representation of products, said object representation including for each product an identification of each concept node in which the associated product can be located, said product database further includes a media base as part of said product database wherein said media base includes descriptive media content associated with at least one product and content tags linking a portion of the descriptive media content to characteristics of a product linked to characteristics identified for each product in said object representation of products; and means for locating products having characteristics associated with a specific identified portion of the descriptive media content.

40. A method for publishing an electronic catalog and for publishing multiple renditions of printed catalogs using a data structure, the electronic and printed catalogs containing information on a plurality of products, the method comprising the steps of:

creating a concept structure or at least one product realm wherein said concept structure includes at least one concept frame for defining classes of product groupings, said concept frames including a plurality of concept nodes having relationships based upon characteristics of the products within the product realm;

creating a product database including an object representation of products, said object representation including for each product an identification of each concept node in which the associated product can be located;

creating a media base as part of said product database wherein said media base includes descriptive media content associated with at least one product and content tags linking a portion of the descriptive media content to characteristics of a product linked to characteristics identified for each product in said object representation of products;

creating a glossary to be used for searching for a particular product or group of products having desired characteristics, said glossary including a plurality of phrases, at least one of said phrases being a definer that links said at least one phrase to one of said concept nodes;

selecting portions of the descriptive media content in said media base for specific products in order to compile information from said product database and said media base to generate a desired rendition of a printed catalog; and distributing portions of the data structure for adding and updating data within the concept structure and the product database amongst a plurality of workstations of parties responsible for creating and maintaining such data.

41. An electronic catalog containing information on a plurality of products, comprising:

a concept structure for at least one product realm wherein said concept structure includes at least one concept frame for defining classes of product groupings, said concept frames including a plurality of concept nodes having relationships based upon characteristics of the products within the product realm;

a product database including a listing of SKUs, each SKU corresponding to a product or a component of a product, said product database further including product information for each associated SKU, and an identification of each concept node in which each SKU can be located; and a glossary to be used for searching for a particular product or group of products having desired characteristics, said glossary including a plurality of phrases, at least one of said phrases being a definer that links said at least one phrase to one of said concept nodes.

* * * * *

UNITED STATES PATENT AND TRADEMARK OFFICE
CERTIFICATE OF CORRECTION

PATENT NO. : 5,740,425
DATED : April 14, 1998
INVENTOR(S) : David S. Povilus

It is certified that error appears in the above-identified patent and that said Letters Patent is hereby corrected as shown below:

Column 8, lines 18-21, the "bullets" are missing.

Column 8, line 40, "and" should be --an--.

Column 10, line 15, "a" should be --an--.

Column 10, line 47, "anytime" should be --any time--.

Column 10, line 53, "views" should be --view--.

Column 11, line 8, before "while" delete "the".

Column 12, line 29, "manufacturer Y" should be --Manufacturer Y's--.

Column 12, line 43, "distributors" should be --distributor's--.

Column 13, line 63, "in" should be --is--.

Column 14, line 5, "in" should be --is--.

Column 16, line 18, "Knowledgebase" should be --KnowledgeBase--.

Column 18, line 40, "Knowledgebase" should be --KnowledgeBase--.

Column 19, line 61, delete "this is".

Column 20, line 23, "a SKU" should be --an SKU--.

Column 20, line 41, "A SKU" should be --An SKU--.

Column 20, line 44, "A SKU" should be --An SKU--.

Column 20, line 55, "a SKU" should be --an SKU--.

UNITED STATES PATENT AND TRADEMARK OFFICE
CERTIFICATE OF CORRECTION

PATENT NO. : 5,740,425
DATED : April 14, 1998
INVENTOR(S) : David S. Povilus

It is certified that error appears in the above-identified patent and that said Letters Patent is hereby corrected as shown below:

Column 21, line 21, "a SKU" should be --an SKU--.

Column 23, line 50, "flames" should be --frames--.

Column 24, line 16, "flames" should be --frames--.

Column 25, line 4, "Knowledgebase" should be --KnowledgeBase--.

Column 25, line 26, "Knowledgebase" should be --KnowledgeBase--.

Column 25, line 49, "become" should be --becomes--.

Column 26, line 55, after "use" insert --of--.

Column 28, line 13, "(steps 605)." should be --(step 605).--.

Column 28, line 39, "TOG" should be --TOC--.

Column 28, line 45, "potion" should be --portion--.

Column 28, line 48, "processes" should be --process--.

Column 30, line 45, "though" should be --through--.

Column 30, line 54, "Preferrably" should be --Preferably--.

Column 31, line 27, "flames" should be --frame--.

Column 31, line 59, "additioinal" should be --additional--.

UNITED STATES PATENT AND TRADEMARK OFFICE
CERTIFICATE OF CORRECTION

PATENT NO. : 5,740,425
DATED : April 14, 1998
INVENTOR(S) : David S. Povilus

It is certified that error appears in the above-identified patent and that said Letters Patent is hereby corrected as shown below:

Column 32, line 66, "steed" should be --steel)--.

Column 36, line 5, "Knowledegebase" should be --KnowledgeBase--.

Column 37, lines 22-27, the "bullets" are missing.

Column 38, line 19, "weld" should be --well)--.

Column 39, line 4, "number a" should be --number of--.

Column 40, line 26, "leaf(s)" should be --leaf/leaves--.

Column 40, line 34, "leafs" should be --leaves--.

Column 40, line 43, "to made" should be --to be made--.

Column 40, line 48, "and" should be --an--.

Column 40, line 52, "users" should be --user's--.

Column 41, line 16, "in (step 869)" should be --in step 869--.

Column 41, line 34, "flames" should be --frames--.

Column 41, line 47, "flames" should be --frames--.

UNITED STATES PATENT AND TRADEMARK OFFICE
CERTIFICATE OF CORRECTION

PATENT NO. : 5,740,425
DATED : April 14, 1998
INVENTOR(S) : David S. Povilus

It is certified that error appears in the above-identified patent and that said Letters Patent is hereby corrected as shown below:

Column 44, line 12, "example" should be --examples--.

Column 44, line 17, "manufacturer Q" should be --Manufacturer Q--.

Column 44, line 33, "manufacturer Q" should be --Manufacturer Q--.

Column 45, line 14, "Knowledgebase" should be --KnowledgeBase--.

Column 48, line 28, "theft" should be --their--.

Column 48, line 38, delete "there are" (2nd occurrence).

Column 49, line 66, "proudct" should be --product--.

Column 49, line 67, "proudcts" should be --products--.

Column 49, line 68, "may" should be --many--.

UNITED STATES PATENT AND TRADEMARK OFFICE
CERTIFICATE OF CORRECTION

PATENT NO. : 5,740,425
DATED : April 14, 1998
INVENTOR(S) : David S. Povilus

It is certified that error appears in the above-identified patent and that said Letters Patent is hereby corrected as shown below:

Column 50, line 56, "a SKU" should be --an SKU--.

Column 51, line 46, "13" should be --14--.

Column 52, line 60, before "means" insert --wherein--.

Column 53, line 61, "flames" should be --frames--.

Column 54, line 1 5, "or" should be --for--.

Signed and Sealed this

Twentieth Day of October, 1998

Attest:

Attesting Officer

BRUCE LEHMAN

Commissioner of Patents and Trademarks